United States Patent [19]
Dye

[11] Patent Number: 5,995,120
[45] Date of Patent: *Nov. 30, 1999

[54] GRAPHICS SYSTEM INCLUDING A VIRTUAL FRAME BUFFER WHICH STORES VIDEO/PIXEL DATA IN A PLURALITY OF MEMORY AREAS

[75] Inventor: Thomas A. Dye, Austin, Tex.

[73] Assignee: Interactive Silicon, Inc., Austin, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/604,670

[22] Filed: Feb. 21, 1996

Related U.S. Application Data

[62] Division of application No. 08/565,103, Nov. 30, 1995, Pat. No. 5,838,334, which is a continuation of application No. 08/522,129, Aug. 31, 1995, abandoned, which is a continuation-in-part of application No. 08/340,667, Nov. 16, 1994.

[51] Int. Cl.[6] .................................................. G09G 5/36
[52] U.S. Cl. ............................................ 345/509; 345/501
[58] Field of Search ..................................... 395/501, 503, 395/507, 509, 515, 516, 520, 521, 522, 339, 340, 341, 342–345, 357; 345/112–114, 119–121, 186, 187, 189, 190, 200, 203, 501–526, 339–345, 357

[56] References Cited

U.S. PATENT DOCUMENTS

| | | | |
|---|---|---|---|
| 4,542,376 | 9/1985 | Bass et al. | 345/340 |
| 4,679,038 | 7/1987 | Bantz et al. | 345/516 |
| 4,868,557 | 9/1989 | Perlman | 345/508 |

(List continued on next page.)

FOREIGN PATENT DOCUMENTS

| | | |
|---|---|---|
| 0 314 440 A2 | 5/1989 | European Pat. Off. . |
| 2 191 666 | 12/1987 | United Kingdom . |
| 2 245 129 | 12/1991 | United Kingdom . |

OTHER PUBLICATIONS

XP–002088244 "Un circuit vidéo de mémorisation et de visualisation d'objets", Electonique Industrielle, (1985) Apr., No. 87, Paris, France, pp. 51–59.

(List continued on next page.)

*Primary Examiner*—U. Chauhan
*Attorney, Agent, or Firm*—Conley, Rose & Tayon; Jeffrey C. Hood

[57] ABSTRACT

A graphics controller (IMC) which performs pointer-based and/or display list-based video refresh operations that enable screen refresh data to be assembled on a per window basis, thereby greatly increasing the performance of the graphical display. The graphics controller maintains pointers to various buffers in system memory comprising video or graphics display information. The graphics controller manipulates respective object information workspace memory areas corresponding to each object or window, wherein the workspace areas specify data types, color depths, 3D depth values, alpha blending information, screen position, etc. for the respective window or object on the screen. Each workspace area also includes static and dynamic pointers which point to the location in system memory where the pixel data for the respective window or object is stored. The graphics controller utilizes this information, as well as information received from the software driver regarding screen changes, to assemble a display refresh list in system memory. This information is used during the screen refresh to display the various windows or objects on the screen very quickly and efficiently. Thus, the video display can be updated with new video data without requiring any system bus data transfers, which are required in prior art computer system architectures. The graphics controller dynamically adjusts the display refresh list for movement of objects and changes in relative depth priority which appear on the display. Thus the video data for the various windows and objects is stored in respective memory areas in the system memory, and pointers assembled in the display refresh list are used to reference this data during screen updates. Therefore, data is not required to be moved in or out of a frame buffer to reflect screen changes. Rather, in many instances, either the video data for a respective window or object is changed, or only the pointers in the display refresh list are manipulated, to affect a screen change.

54 Claims, 41 Drawing Sheets

U.S. PATENT DOCUMENTS

| | | | |
|---|---|---|---|
| 4,945,499 | 7/1990 | Asari et al. | 395/522 |
| 4,967,375 | 10/1990 | Pelham et al. | 395/515 |
| 5,043,714 | 8/1991 | Perlman | 345/196 |
| 5,097,411 | 3/1992 | Doyle et al. | 395/522 |
| 5,113,180 | 5/1992 | Gupta et al. | 345/515 |
| 5,142,615 | 8/1992 | Levesque et al. | 345/431 |
| 5,175,813 | 12/1992 | Golding et al. | 345/340 |
| 5,258,750 | 11/1993 | Malcom, Jr. et al. | 345/115 |
| 5,265,218 | 11/1993 | Testa et al. | 710/100 |
| 5,315,696 | 5/1994 | Case et al. | 345/232.7 |
| 5,321,805 | 6/1994 | Hayman et al. | 395/502 |
| 5,369,617 | 11/1994 | Munson | 365/219 |
| 5,388,207 | 2/1995 | Chia et al. | 345/513 |
| 5,392,407 | 2/1995 | Heil et al. | 710/113 |
| 5,402,147 | 3/1995 | Chen et al. | 345/115 |
| 5,412,776 | 5/1995 | Bloomfield et al. | 345/346 |
| 5,432,900 | 7/1995 | Rhodes et al. | 345/302 |
| 5,502,462 | 3/1996 | Mical et al. | 345/185 |
| 5,506,604 | 4/1996 | Nally et al. | 345/154 |
| 5,522,025 | 5/1996 | Rosenstein | 345/344 |
| 5,528,764 | 6/1996 | Heil | 710/113 |
| 5,559,954 | 9/1996 | Sakoda et al. | 345/507 |
| 5,590,287 | 12/1996 | Zeller et al. | 710/127 |
| 5,596,345 | 1/1997 | Goodfellow | 345/340 |
| 5,596,693 | 1/1997 | Needle et al. | 345/474 |
| 5,608,864 | 3/1997 | Bindlish et al. | 345/507 |
| 5,617,529 | 4/1997 | Dao | 345/515 |
| 5,659,715 | 8/1997 | Wu et al. | 395/497.01 |
| 5,666,521 | 9/1997 | Marisetty | 345/525 |
| 5,668,997 | 9/1997 | Lynch-Freshner et al. | 395/683 |
| 5,719,598 | 2/1998 | Latham | 345/419 |
| 5,724,560 | 3/1998 | Johns et al. | 345/510 |
| 5,734,387 | 3/1998 | Patrick et al. | 345/441 |
| 5,742,797 | 4/1998 | Celi, Jr. et al. | 345/507 |

OTHER PUBLICATIONS

"Buffer Mechanism For PEL Position of Multiple Video Images, Including Overlapping, on a Raster–Scan CRT," IBM Technical Disclosure Bulletin, vol. 29, No. 11, Apr. 1987, pp. 4714–4717.

International Search Report for PCT/US 98/13113 dated Jan. 12, 1999.

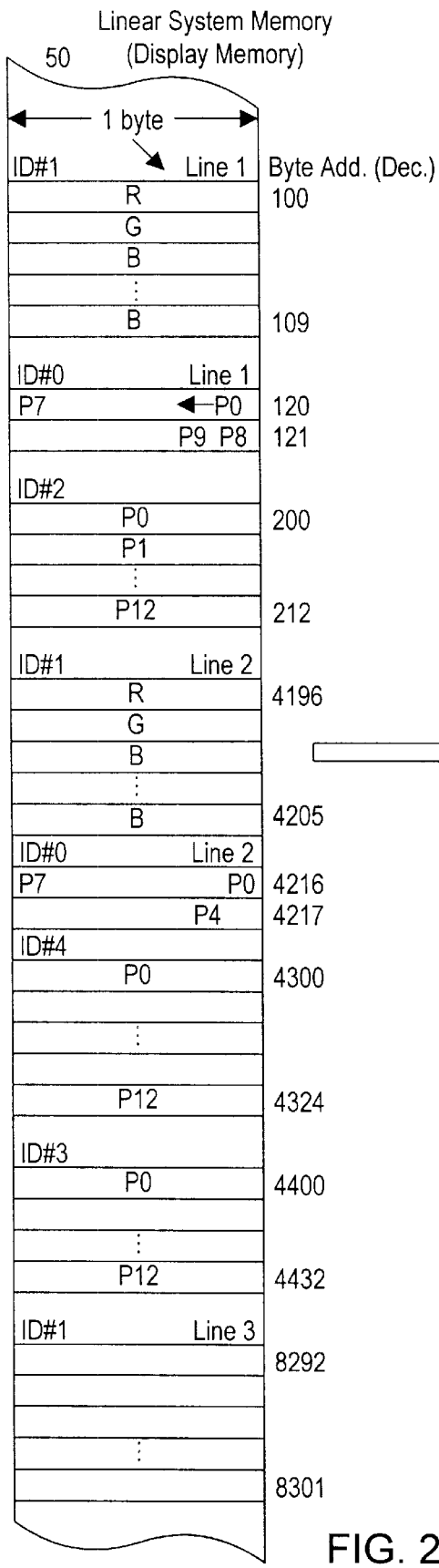
FIG. 26C
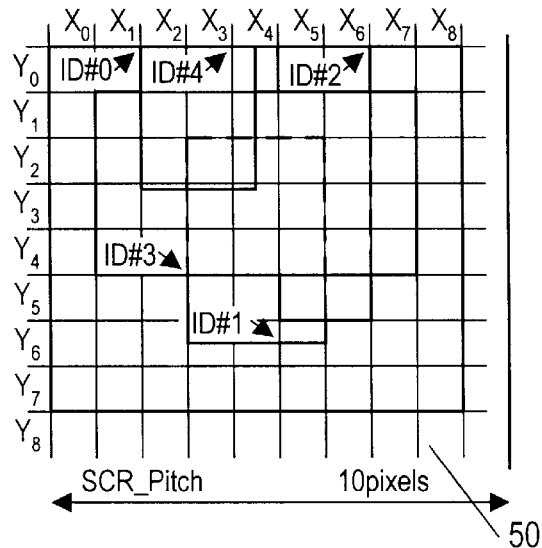
FIG. 26D
Win_ID#0 → 1bpp    x/y address
Win_ID#1 → 32bpp   x/y address
Win_ID#2 → 8bpp    Linear address
Win_ID#3 → 8bpp    Linear address
Win_ID#4 → 16bpp   Linear address
[DST_Pitch_Reg=4096]
FIG. 26E

GRAPHICS SYSTEM INCLUDING A VIRTUAL FRAME BUFFER WHICH STORES VIDEO/PIXEL DATA IN A PLURALITY OF MEMORY AREAS

CONTINUATION DATA

This is a divisional of application Ser. No. 08/565,103 titled "Memory and Graphics Controller Which Performs Pointer-Based Display List Video Refresh Operations" and filed on Nov. 30, 1995, now U.S. Pat. No. 5,838,334, which is a continuation of application Ser. No. 08/522,129 titled "Memory and Graphics Controller Which Performs Pointer-Based Display List Video Refresh Operations" and filed Aug. 31, 1995, now abandoned, which is a continuation-in-part of co-pending application Ser. No. 08/340,667 titled "Integrated Video and Memory Controller with Data Processing and Graphical Processing Capabilities" and filed Nov. 16, 1994 pending.

FIELD OF THE INVENTION

The present invention relates to computer system graphics architectures, and more particularly to a graphics controller which performs pointer-based display list video operations to transfer video data from a memory to a video monitor.

DESCRIPTION OF THE RELATED ART

Since their introduction in 1981, the architecture of personal computer systems has remained substantially unchanged. The current state of the art in computer system architectures includes a central processing unit (CPU) which couples to a memory controller interface that in turn couples to system memory. The computer system also includes a separate graphical interface for coupling to the video display. In addition, the computer system includes input/output (I/O) control logic for various I/O devices, including a keyboard, mouse, floppy drive, hard drive, etc.

In general, the operation of a modern computer architecture is as follows. Programs and data are read from a respective I/O device such as a floppy disk or hard drive by the operating system, and the programs and data are temporarily stored in system memory. Once a user program has been transferred into the system memory, the CPU begins execution of the program by reading code and data from the system memory through the memory controller. The application code and data are presumed to produce a specified result when manipulated by the system CPU. The code and data are processed by the CPU and data is provided to one or more of the various output devices. The computer system may include several output devices, including a video display, audio (speakers), printer, etc. In most systems, the video display is the primary output device.

Graphical output data generated by the CPU is written to a graphical interface device for presentation on the display monitor. The graphical interface device may simply be a video graphics array (VGA) card, or the system may include a dedicated video processor or video acceleration card including separate video RAM (VRAM). In a computer system including a separate, dedicated video processor, the video processor includes graphics capabilities to reduce the workload of the main CPU. Modem prior art personal computer systems typically include a local bus video system based on either the peripheral component interconnect (PCI) bus or the VESA (Video Electronics Standards Association) VL bus, or perhaps a proprietary local bus standard. The video subsystem is generally positioned on a local bus near the CPU to provide increased performance.

Therefore, in summary, program code and data are first read from the hard disk to the system memory. The program code and data are then read by the CPU from system memory, the data is processed by the CPU, and graphical data is written to the video RAM in the graphical interface device for presentation on the display monitor. The CPU typically reads data from system memory across the system bus and then writes the processed data or graphical data back across the system bus to the I/O bus or local bus where the graphical interface device is situated. The graphical interface device in turn generates the appropriate video signals to drive the display monitor. It is noted that this operation requires data to make two passes across the system bus and/or the I/O subsystem bus. In addition, the program which manipulates the data must also be transferred across the system bus from the main memory. Further, two separate memory subsystems are required, the system memory and the dedicated video memory, and video data is constantly being transferred from the system memory to the video memory frame buffer. FIG. 1 illustrates the data transfer paths in a typical computer system using prior art technology.

One recent trend in computer system architecture and design is referred to as a shared or unified memory, also referred to as a unified memory architecture. In this architecture, the main or system memory is used for operating system and applications software as well as for the video frame buffer. However, one problem with the unified memory approach is the perceived need for additional bandwidth to perform video functions such as bit block transfers and video refresh, as well as CPU manipulation of programs and data within the same memory subsystem.

Computer systems are being called upon to perform larger and more complex tasks that require increased computing power. In addition, modern software applications require computer systems with increased graphics capabilities. Modem software applications typically include graphical user interfaces (GUIs) which place increased burdens on the graphics capabilities of the computer system. Further, the increased prevalence of multimedia applications also demands computer systems with more powerful graphics capabilities. Therefore, a new computer system and method is desired which provides increased system performance and in particular, increased video and/or graphics performance, than that possible using prior art computer system architectures.

SUMMARY OF THE INVENTION

The present invention comprises a graphics controller which includes a novel display refresh list system and method for presenting data on a video monitor. The graphics controller of the present invention minimizes data movement and video data manipulation for video display updates and thus greatly increases system performance.

The graphics controller of the present invention is preferably comprised in an integrated memory controller (IMC) which includes advanced memory, graphics, and audio processing capabilities and performs pointer-based display list video operations according to the present invention. The IMC includes numerous significant advances which provide greatly increased performance over prior art systems. The memory controller (IMC) of the present invention preferably sits on the main CPU bus or a high speed system peripheral bus such as the PCI bus. The IMC includes one or more symmetric memory ports for connecting to system memory. The IMC also includes video outputs, preferably RGB (red, green, blue) outputs as well as horizontal and vertical synchronization signal outputs, to directly drive the video display monitor. The IMC also preferably includes an audio interface for digital audio delivery to an external stereo digital-to-analog converter (DAC).

The IMC transfers data between the system bus and system memory and also transfers data between the system memory and the video display output. Therefore, the IMC architecture of the present invention eliminates the need for a separate graphics subsystem. The IMC also improves overall system performance and response using main system memory for graphical information and storage. The IMC system level architecture reduces data bandwidth requirements for graphical display since the host CPU is not required to move data between main memory and the graphics subsystem as in conventional computers, but rather the graphical data resides in the same subsystem as the main memory. Therefore, for graphical output, the host CPU or DMA master is not limited by the available bus bandwidth, thus improving overall system throughput.

The integrated memory controller of the preferred embodiment includes a bus interface unit which couples through FIFO buffers to an Execution Engine. The Execution Engine preferably includes a digital signal processor (DSP) core which performs compression and decompression operations, as well as texture mapping, and which also assembles display refresh lists according to the present invention. The Execution Engine in turn couples to a Graphics Engine which couples through FIFO buffers to one or more symmetrical memory control units. The Graphics Engine is similar in function to graphics processors in conventional computer systems and includes line and triangle rendering operations as well as span line interpolators. An instruction storage/decode block is coupled to the bus interface logic which stores instructions for the Graphics Engine and the Execution Engine.

A Display Refresh List Engine is coupled to the Graphics Engine and the one or more memory control units. The Display Refresh List Engine in turn couples to a display storage buffer and then to a display memory shifter. The display memory shifter couples to separate digital to analog converters (DACs) which provide the RGB signals and the synchronization signal outputs to the video monitor. The Display Refresh List Engine includes a novel display list-based method of transferring video data or pixel data from the memory to the video monitor during screen refresh according to the present invention, thereby improving system performance. In one embodiment, the Display Refresh List Engine, referred to in this embodiment as a Window Assembler, both assembles and executes the display refresh list.

An anti-aliasing method is applied to the video data as the data is transferred from system memory to the display screen. An overlay method may also be applied to the video data for rendering overlayed objects. The internal graphics pipeline of the IMC is optimized for high end 2D and 3D graphical display operations, as well as audio operations, and all data is subject to operation within the execution engine and/or the graphics engine as the data travels through the data path of the IMC.

Video screen changes or screen updates are preferably performed using the following operations. First, in response to software executing on the host CPU, such as applications software, the video driver executing on the CPU generates a video driver instruction list which includes screen update and/or graphics information for displaying video data on the screen. The video driver instruction list is provided to the Execution Engine in the graphics controller or IMC. The Execution Engine examines the video driver instruction list and generates a list of graphics and/or memory commands to the Graphics Engine. Thus the Execution Engine constructs a complete list of graphics or memory operations to be performed in response to desired screen change information.

If the Execution Engine receives an Assemble Display Refresh List command from the video driver, the Execution Engine assemble a display refresh list comprising a plurality of pointers which reference video data in the system memory that is to be refreshed to the video monitor. The plurality of pointers reference memory areas in the system memory which store video or pixel data for respective objects that appear on the display screen. The pointers reference portions of the data on a scan line basis, and the pointers are used to read out the data on a scan line basis during screen refresh. The use of a display refresh list for screen refresh operations greatly reduces data traffic as compared to prior art computer architectures and thus provides significantly improved performance.

The Display Refresh List Engine of the present invention uses the display refresh list constructed by the Execution Engine to perform pointer-based or display list-based video refresh operations according to the present invention. The display refresh list operations enable screen refresh data to be assembled on a per window or per object basis, thereby greatly increasing the performance of the graphical display. The Display Refresh List Engine includes memory mapped I/O registers storing values which point to various buffers or object information memory areas in system memory comprising video or graphics display information. The IMC includes an ID pointer register which points to a Windows ID list. The Windows ID list comprises a list of pointers for each of the windows or objects appearing on the display screen. Each respective pointer in the Windows ID list points to respective windows workspace memory areas corresponding to the window. The windows workspace areas specify data types, color depths, 3D depth values, alpha blending information, screen position, window attributes, etc. for the respective window or object on the screen. Each windows workspace area also includes static and dynamic pointers which point to the location in system memory where the pixel data for the respective window or object is stored. Each windows workspace area also optionally includes a pointer to a color composition matrix for color indexing on a per object or per window basis, a secondary workspace pointer for rendering overlayed objects, and optionally slope information for rendering non-rectangular objects.

The Execution Engine utilizes the information in the Window Workspace buffer, as well as information received from the software driver regarding screen changes, to assemble a display refresh list in system memory. When a screen change occurs, such as a new window displayed on the screen, the Display Refresh List Engine uses the display refresh list to determine where in the linear or xy memory space the data resides as well as how many bits per pixel the window requires, how to map the color space, and the necessary xy rectangle extents and window priority. This information is used during the screen refresh to display the various windows or objects on the screen very quickly and efficiently. Thus, the video display can be updated with new video data without requiring any system bus data transfers, or the movement of data from offscreen to onscreen memory locations, which are required in prior art computer system architectures.

The Execution Engine dynamically adjusts the display refresh list or assembles a new display refresh list for movement of objects and changes in relative depth priority which appear on the display. Thus when an object or window is moved to a new position in the screen, or is popped or pushed relative to another window, the data comprising the object is not transferred to another location in memory, but rather only the display pointer address is changed in an object information area or in a new display refresh list. This provides the effect of moving data from a source to a destination, i.e., a bit block transfer or bit blit (bit block transfer), without ever moving the object in memory. This provides a tremendous performance increase over conventional bit blit operations commonly used in graphical subsystems. This also greatly reduces memory bandwidth requirements in a unified memory environment.

The video data stored in system memory is preferably stored in a plurality of memory areas, which may or may not be contiguous. The plurality of display memory areas each preferably store video data corresponding to video objects or windows, at least a subset of which are displayed on the video monitor. Thus the present invention is not required to maintain, and preferably does not maintain, a single frame buffer which contains all of the video data for display on the video screen. Rather the video data for the various windows and objects is stored in respective memory areas in the system memory, and pointers assembled in the display refresh list are used to reference this data during screen updates. Thus, data is not required to be moved in or out of a frame buffer to reflect screen changes, but rather in many instances either the video data for a respective window or object is changed, or only the pointers in the display refresh list are manipulated, to affect a screen change.

The IMC of the present invention uses a virtual color depth technique which optimizes the use of system memory, i.e., uses only the amount of system memory required for each application and each window on the display. Low end applications may only require a minimum amount of memory, such as one bit per pixel, whereas high end applications may require more memory per pixel. In the IMC architecture, memory is used on a "per application basis" where only the memory that is actually required is used for each application or window. For example, a simple text application may only use a single bit per pixel while a complex 3D application may require as much as 128 bits per pixel. According to the present invention, both applications reside on the same display simultaneously and each uses only the memory required for its respective window size and pixel depth. This virtual color depth method also reduces the memory bandwidth requirements in a unified memory environment.

The present invention further includes a novel method for presentation of a specific object or window overlayed on top of another object or window without destruction or off-screen copy requirements used by prior art methods of object overlay. This overlay method animates objects with transparency in a very efficient manner. The method used multiple windows workspace areas for the objects and also includes multiple pointers in the display refresh list to retrieve data for the two objects (foreground and background) involved in the overlay. The method then performs a color comparison as the video traverses through the IMC during screen refresh.

The pointer-based display list method of the present invention also allows screen refresh rate edge anti-aliasing and filtering method to be applied to video data on the fly as data is being refreshed on the screen. As discussed above, data is read from the system memory according to the current display refresh list, which is continually updated as screen changes occur. As the data traverses the serial FIFO shift registers in the IMC, the edge anti-aliasing process occurs. The edge anti-aliasing method is enabled by attribute bits located in the window workplace flags in system memory for each window. Each window workspace includes an enable flag which indicates whether smoothing is desired. If the flag is set, filtering is performed using the edge anti-aliasing filter method. The screen refresh display input data which is being provided to the display FIFO buffers is compared against predetermined threshold values which represent the delta change in intensity or color. If the method detects a large change, the method performs automatic blending and smoothing of the area around the abrupt change in intensity. This anti-aliasing method can be used in conjunction with the secondary window overlay method. Thus the edges of overlayed objects can be smoothed during the video refresh operation.

The pointer-based display list video refresh system and method of the present invention removes system bottlenecks and greatly increases performance. The system and method of the present invention uses a high level graphical protocol between the CPU and the IMC which reduces bus traffic and greatly increases bus bandwidth. Thus many changes to video data in the system memory are accomplished by pointer manipulation, not by the transfer of video data across the system bus. This is a significant advance over the operation of current computer architectures and their associated graphic display subsystems.

Therefore, the present invention comprises an integrated memory and graphics controller including a novel pointer-based display list refresh system and method which provides greatly increased performance over prior art designs.

BRIEF DESCRIPTION OF THE DRAWINGS

A better understanding of the present invention can be obtained when the following detailed description of the preferred embodiment is considered in conjunction with the following drawings, in which:

FIGS. 26, 26A–26E illustrates examples of a display refresh list, windows workspace, and display memory;

DETAILED DESCRIPTION OF THE PREFERRED EMBODIMENT

Prior Art Computer System Architecture

Figure 1:
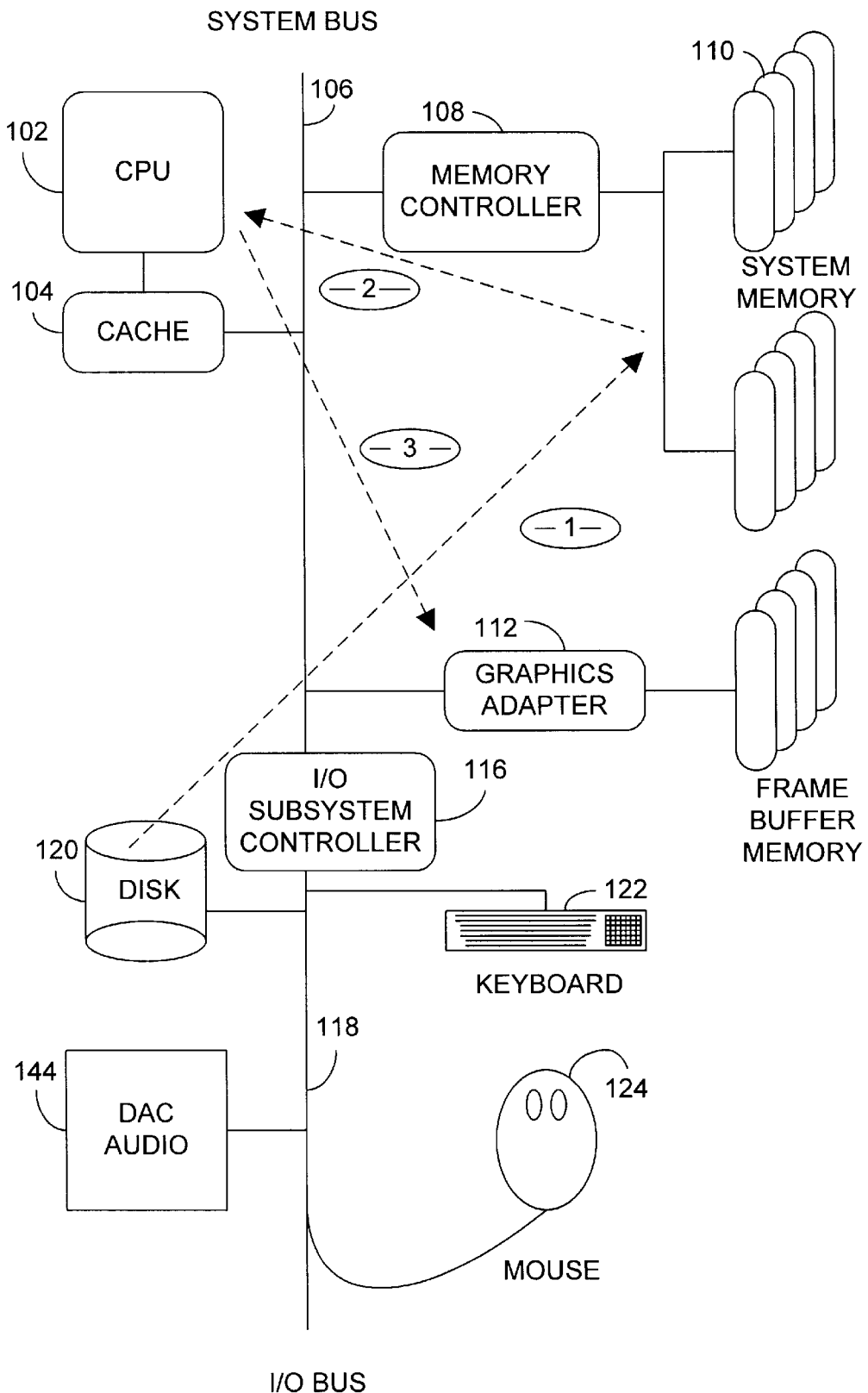
FIG. 1 is a prior art diagram illustrating data flow in a prior art computer system.

FIG. 1 illustrates a block diagram of a prior art computer system architecture. As shown, prior art computer architectures typically include a CPU 102 coupled to a cache system 104. The CPU 102 and cache system 104 are coupled to the system bus 106. A memory controller 108 is coupled to the system bus 106 and the memory controller 108 in turn couples to system memory 110. In FIG. 1, graphics adapter 112 is shown coupled to the system bus 106. However, it is noted that in modern computer systems the graphics adapter 112 is typically coupled to a separate local expansion bus such as the peripheral component interface (PCI) bus or the VESA VL bus. Prior art computer systems also typically include bridge logic coupled between the CPU 102 and the memory controller 108 wherein the bridge logic couples to the local expansion bus where the graphics adapter 112 is situated. For example, in systems which include a PCI bus, the system typically includes a host/PCI/cache bridge which integrates the cache logic 104, host interface logic, and PCI interface logic. The graphics adapter 112 couples to frame buffer memory 114 which stores the video data that is actually displayed on the display monitor. Modern prior art computer systems typically include between 1 to 4 Megabytes of video memory. An I/O subsystem controller 116 is shown coupled to the system bus 106. The I/O subsystem controller 116 couples to an input/output (I/O) bus 118. In computer systems which include a PCI bus, the I/O subsystem controller 116 typically is coupled to the PCI bus. Various peripheral I/O devices are generally coupled to the I/O bus 18, including a hard disk 120, keyboard 122, mouse 124, and audio digital-to-analog converter (DAC) 144.

Prior art computer system architectures generally operate as follows. First, programs and data are generally stored on the hard disk 120. At the direction of the CPU 102, the programs and data are transferred from the hard disk 120 through the I/O subsystem controller 116 to system memory 110 via the memory controller 108. The CPU 102 accesses programs and data stored in the system memory 110 through the memory controller 108 and the system bus 106. In processing the program code and data, the CPU 102 generates graphical data or graphical instructions that are then provided over the system bus 106 and generally the PCI bus (not shown) to the graphics adapter 112. The graphics adapter 112 receives graphical instructions or pixel data from the CPU 102 and generates pixel data that is stored in the frame buffer memory 114. The graphics adapter 112 generates the necessary video signals to drive the video display monitor (not shown) to display the pixel data that is stored in the frame buffer memory 114. When a window on the screen is updated or changed, the above process repeats whereby the CPU 102 reads data across the system bus 106 from the system memory 110 and then transfers data back across the system bus 106 and local expansion bus to the graphics adapter 112 and frame buffer memory 114.

Thus, the CPU 102 typically reads data from system memory 110 across the system bus 106 and then writes the processed data back across the system bus 106 and typically to a local expansion bus to the graphics adapter 112 for display output. This action requires that the data make two passes across the system bus 106. In addition, the program code which manipulates the data must also be read across the system bus 106 from system memory 110. Since the video pixel data that is displayed on the screen is stored in frame buffer memory 114 which is separate from the system memory 110, increased data traffic is required on the system bus 106, thereby reducing system performance. In addition, the requirement of two separate memory subsystems increases the cost of the system.

Computer Architecture of the Present Invention

Figure 2:
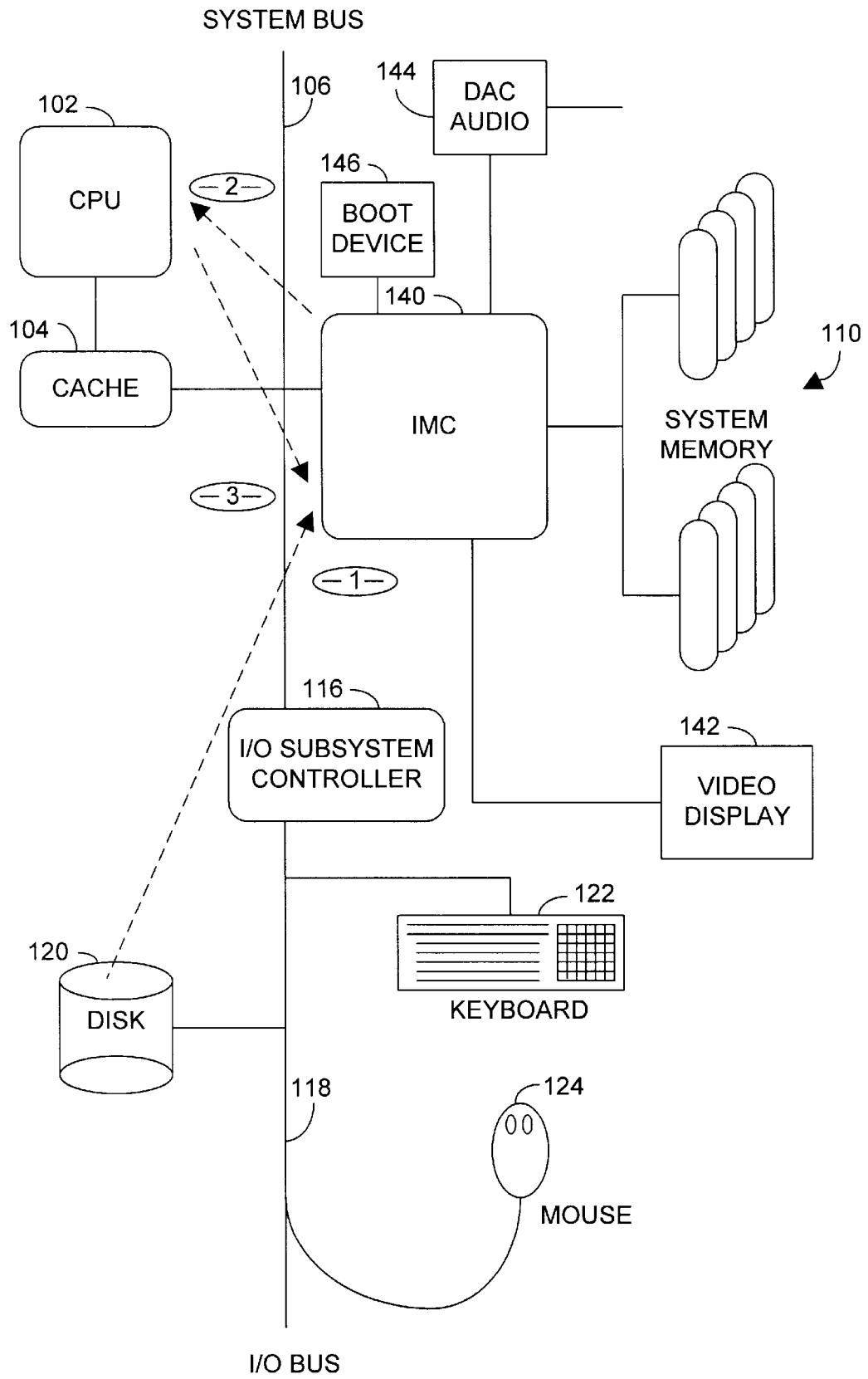
FIG. 2 is a block diagram illustrating data flow in a computer system including an integrated memory controller (IMC) according to the present invention.

Referring now to FIG. 2, a block diagram illustrating one embodiment of the computer architecture of a system incorporating the present invention is shown. Elements in FIG. 2 that are similar or identical to those in FIG. 1 include the same reference numerals for convenience. As shown, the computer system of the present invention includes a CPU 102 preferably coupled to a cache system 104. The CPU 102 may include a first level cache system and the cache 104 may comprise a second level cache. Alternatively, the cache system 104 may be a first level cache system or may be omitted as desired. The CPU 102 and cache system 104 are coupled to a system bus 106. The CPU 102 and cache system 104 are also directly coupled through the system bus 106 to an integrated memory controller (IMC) 140 according to the present invention. The integrated memory controller (IMC) 140 includes numerous novel system elements for greatly increasing the performance of the computer system. It is noted that the IMC 140 can be used as the controller for main system memory 110 or can be used to control other memory subsystems as desired. The IMC 140 may also be used as the graphics controller in computer systems using prior art architectures having separate memory and video subsystems.

The IMC 140 couples to system memory 110, wherein the system memory 110 comprises one or more banks of memory. In the preferred embodiment, the system memory 110 comprises two banks of memory, and the IMC 140 preferably includes two symmetric memory ports for coupling to the two banks in system memory 110. In the preferred embodiment, the IMC 140 couples to the system memory 110 through a RAMBUS implementation. For more information on the RAMBUS memory architecture, please see "RAMBUS Architectural Overview," version 2.0, published July 1993 by RAMBUS, Inc., and "Applying RAMBUS Technology to Desktop Computer Main Memory Subsystems," version 1.0, published March 1992 by RAMBUS, Inc., which are both hereby incorporated by reference.

The IMC 140 of the present invention may couple to any of various types of memory, as desired. In the preferred embodiment, the system or main memory 110 comprises conventional DRAM (dynamic random access memory) or EDO (extended data out) memory. In an alternate embodiment, the system memory 110 comprises SGRAM or single in-line memory modules (SIMMs). As noted above, the IMC 140 of the present invention may couple to any of various types of memory, as desired.

The IMC 140 also generates appropriate video signals for driving video display monitor 142. The IMC 140 preferably generates red, green, blue (RGB) signals as well as vertical and horizontal synchronization signals for generating images on the video display 142. Therefore, the integrated memory controller 140 of the present invention integrates memory controller and video and graphics controller capabilities into a single logical unit. This greatly reduces bus traffic and increases system performance. In one embodiment, the IMC 140 also generates appropriate data signals that are provided to Audio DAC 144 for audio presentation. Alternatively, the IMC 140 integrates audio processing capabilities and provides audio signal outputs that are provided directly to speakers. A boot device 146 is also coupled to the IMC 140 to configure or boot the IMC 140, as described further below.

Figure 3:
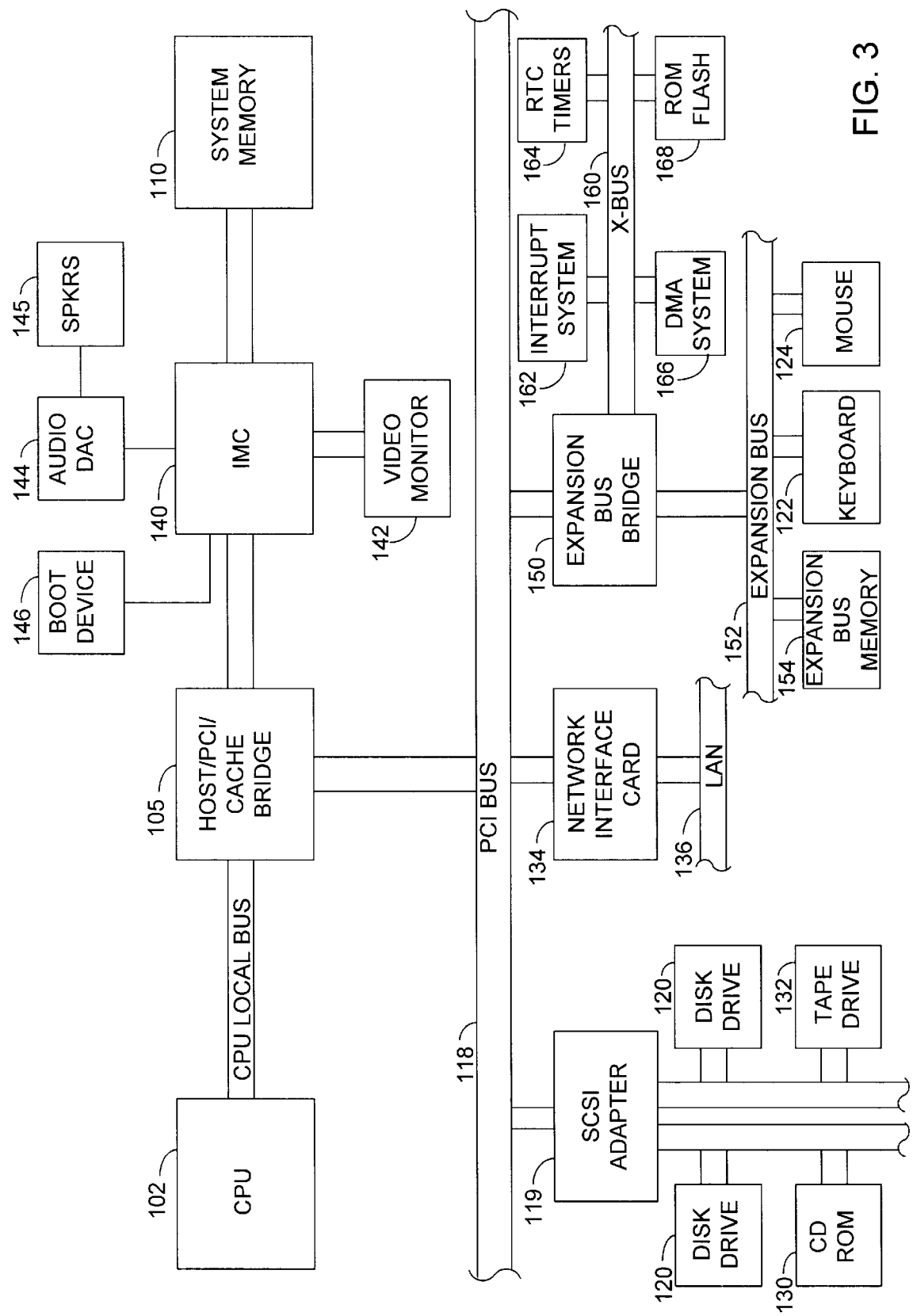
FIG. 3 illustrates a block diagram of a computer system including an IMC according to the present invention.

The IMC 140 of the present invention is preferably situated either on the main CPU bus or a high speed system peripheral bus. In the preferred embodiment, as shown in FIGS. 2 and 3, the IMC 140 is coupled directly to the system bus 106 or CPU bus, wherein the IMC 140 interfaces through a cache system 104 to the CPU 102. In an alternate embodiment, the IMC 140 is situated on the peripheral component interconnect (PCI) bus, which is a high speed peripheral local bus standard developed by Intel Corporation. For more information on the PCI bus, please see "PCI System Architecture" by Tom Shanley and Don Anderson, copyright 1993 by MindShare Inc., which is hereby incorporated by reference. Please also see PCI documentation available from Intel Corporation. In this embodiment, the cache 104 preferably comprises a PCI/cache bridge, and the system bus 106 is preferably a PCI bus. However, it is noted that the IMC 140 can sit on any various types of buses as desired.

An I/O subsystem controller 116 is coupled to the system bus 106. The I/O subsystem controller 116 in turn is coupled to an I/O bus 118. Various I/O devices are coupled to the I/O bus including a hard disk 120, keyboard 122, and mouse 124, as shown. In an embodiment including a PCI bus, the I/O subsystem Controller 116 is coupled to the PCI bus.

Typical computer programs require more system bus bandwidth for the transfer of application data than the transfer of program code executed by the CPU. Examples of application data include a bit mapped image, font tables for text output, information defined as constants, such as table or initialization information, etc. Graphical and/or video data, for example, is processed by the CPU 102 for display before the video data is written to the graphical output device. Therefore, in virtually all cases, the actual program code executed by the CPU 102 which manipulates the application data consumes considerably less system memory 110 for storage than the application data itself.

The IMC 140 includes a novel system architecture which helps to eliminate system bandwidth bottlenecks and removes extra operations required by the CPU 102 to move and manipulate application data. The IMC 140 includes a high level protocol for the manipulation of graphical data or video data according to the present invention which greatly reduces the amount of bus traffic required for video operations and thus greatly increases system performance. This high level protocol includes a display list based video refresh system and method whereby the movement of objects on the video display screen 142 does not require movement of pixel data in the system memory 110, but rather only requires the manipulation of display address pointers in a display refresh list, thus greatly increasing the performance of pixel bit block transfers, animation, and manipulation of 2D and 3D objects.

It is noted that the term "graphical data" is commonly used to refer to data written to the parallel side of VRAM or the data stored to/from the frame buffer. The term graphical data is also used to refer to graphical objects or pixel data rendered to memory. The term video data is typically used to refer to data that is provided to the RAMDAC during refresh for monitor output or to live action video data. In the present disclosure, the term video data is used to mean both graphical data and video data (or pixel data).

FIG. 2 illustrates the data transfer path of data within a computer system including the IMC 140 according to the present invention. As mentioned above, in typical computer systems, the program code and data is initially stored on the hard disk drive 120. First, the IMC 140 reads program code and data stored on the disk 120 using a direct memory access (DMA) and burst control methods where the IMC 140 acts as a master on the system bus 106. The program code and data are read from the disk 120 by the IMC 140 and stored in the system memory 110. In an alternative embodiment, the program code and data are transferred from the disk 120 to the IMC 140 under CPU control. The data is transferred from the hard disk 120 to the system memory 110 preferably in a compressed format, and thus the data requires less disk storage and reduced system bus bandwidth. As the data is transferred from the disk 120 to the IMC 140, the data is preferably decompressed by a decompression engine within the IMC 140 and stored in the system memory bank 110. In general, disk I/O transfer rates are sufficiently slow to allow decompression and storage of the data as the compressed data is received from the disk 120.

The CPU 102 begins program execution by reading the recently decompressed program code from the system memory 110. Portions of the program code contain information necessary to write data and/or instructions back to the IMC 140 using a special graphical protocol according to the present invention to direct the IMC 140 to control the display output on the video display 142. In many cases, the graphical data is not required to leave the system memory 110 and is not required to move to another location in system memory 110, but rather the display list-based operation and high level graphical protocol of the IMC 140 of the present invention enables the CPU 102 to instruct the IMC 104 how window and other graphical data is presented on the screen. This provides a tremendous improvement over prior art systems.

The high level graphical protocol used by the IMC 140 of the present invention eliminates many of the CPU reads and writes of graphical information across the system bus 106 that are required in prior art systems. Instead, a computer system incorporating an IMC 140 according to the present invention includes a high level graphical protocol whereby the CPU 102 instructs the IMC 140 to manipulate the data stored in the system memory 110. For example, when text which appears in a window on the display screen is manipulated, the text is not required to leave the system memory 110 for processing by the CPU 102. Rather, the IMC 140 reads the text data into the system memory 110, preferably in ASCII format, and the IMC 140 processes the text data for display output. This operation is performed under the direction of the CPU 102 through the high level graphical protocol used by the IMC 140, as described further below. Another example is a back store of window information when windows are occluded or moved to the background of the display screen. In current prior art computer system, this operation requires either extra cost for memory in the graphical subsystem, i.e., additional video memory or VRAM, or the CPU 102 is required to move the occluded information from the graphical subsystem back into the system memory for temporary storage. In the IMC architecture of the present invention, the data remains in the same location in system memory 110 and is easily recalled when required. No data movement or backstore of data within system memory is required, but rather the only change required is an update of window assembly pointers in system memory. As another example, the movement of windows on the screen does not require any movement of video data in system memory, but rather only requires change to X and Y position pointers for the respective window.

The IMC 140 of the present invention includes a novel Window Assembler system and method which performs pointer-based window assembly for the display output during screen refresh with greater efficiency. This allows for windows and/or objects to remain in their original form and location without modification during many types of video manipulation.

Therefore, pointer-based display list video refresh system and method of the present invention reduces the amount of data required to be moved within the system for processing, thus reducing the overall cost while improving the performance of the computer system. The high level graphical communication protocol between the CPU 102 and the IMC 140 reduces bus traffic and increases performance since the CPU 102 spends much less time moving data between the various subsystems. This frees up the CPU 102 and allows the CPU 102 greater time to work on the application program rather than moving data around the system.

Computer System Block Diagram

Referring now to FIG. 3, a block diagram illustrating the preferred embodiment of a computer system incorporating the graphics controller according to the present invention is shown. As shown, the graphics controller is preferably comprised in an integrated memory controller IMC 140. It is noted that the present invention may be incorporated into any of various types of computer systems having various system architectures. As shown, the computer system includes a central processing unit (CPU) 102 which is coupled through a CPU local bus to a host/PCI/cache bridge 105. The bridge 105 incorporates the cache 104 and I/O subsystem controller 116 of FIG. 2.

The IMC 140 of the present invention couples to the bridge 105. In the preferred embodiment, the IMC 140 comprises a single chip, as shown. However, it is noted that the IMC 140 may comprise two or more separate chips or controllers, as desired. Main memory or system memory 110 couples to the IMC 140. The IMC 140 provides video outputs to video monitor 142 and audio outputs to Audio DAC 144. Speakers 145 are connected to the Audio DAC 144. A boot device 146 is preferably coupled to the IMC 140. The host/PCI/cache bridge 105 also interfaces to a peripheral component interconnect (PCI) bus 118. In the preferred embodiment, a PCI local bus is used. However, it is noted that other local buses may be used, such as the VESA (Video Electronics Standards Association) VL bus or a proprietary bus. In an alternate embodiment, the IMC 140 is coupled directly to the PCI bus 118 as a PCI device. Alternatively, the IMC 140 is adapted to the P6.0 bus, which is a high-speed interconnect for Intel P6 processors and related devices. In one embodiment, the IMC 140 includes a pin-strappable interface which can couple either to the PCI bus or to an address/data CPU bus.

Various types of devices may be connected to the PCI bus 118. It is noted that, in prior art computer systems, a video adapter and video frame buffer would be coupled to the PCI bus 118 for controlling video functions. However, in the computer system of the present invention, video functions are performed by the IMC 140. Also, video data is stored in system memory 110, and thus a separate video memory or video frame buffer is not required.

As shown in FIG. 3, a SCSI (small computer systems interface) adapter 119 is coupled to the PCI bus 118. In the embodiment shown in FIG. 3, the SCSI adapter connects to two disk drive units 120, a CD-ROM 130, and a tape drive 132. Various other devices may be connected to the PCI bus 118, such as a network interface card 134. As shown, the network interface card 134 interfaces to a local area network (LAN) 136.

In the embodiment shown, expansion bus bridge logic 150 is coupled to the PCI bus 118. The expansion bus bridge logic 150 interfaces to an expansion bus 152. The expansion bus 152 may be any of varying types, including the industry standard architecture (ISA) bus, also referred to as the AT bus, the extended industry standard architecture (EISA) bus, or the MicroChannel architecture (MCA) bus. Various devices may be coupled to the expansion bus 152, including expansion bus memory 154, a keyboard 122 and a mouse 124. The expansion bus bridge logic 150 also couples to a peripheral expansion bus referred to as the X-bus 160. The X-bus 160 is used for connecting various peripherals to the computer system, such as an interrupt system 162, a real time clock (RTC) and timers 164, a direct memory access (DMA) system 166, and ROM/Flash memory 168, among others.

Alternate Computer System Embodiments

Figure 3A:
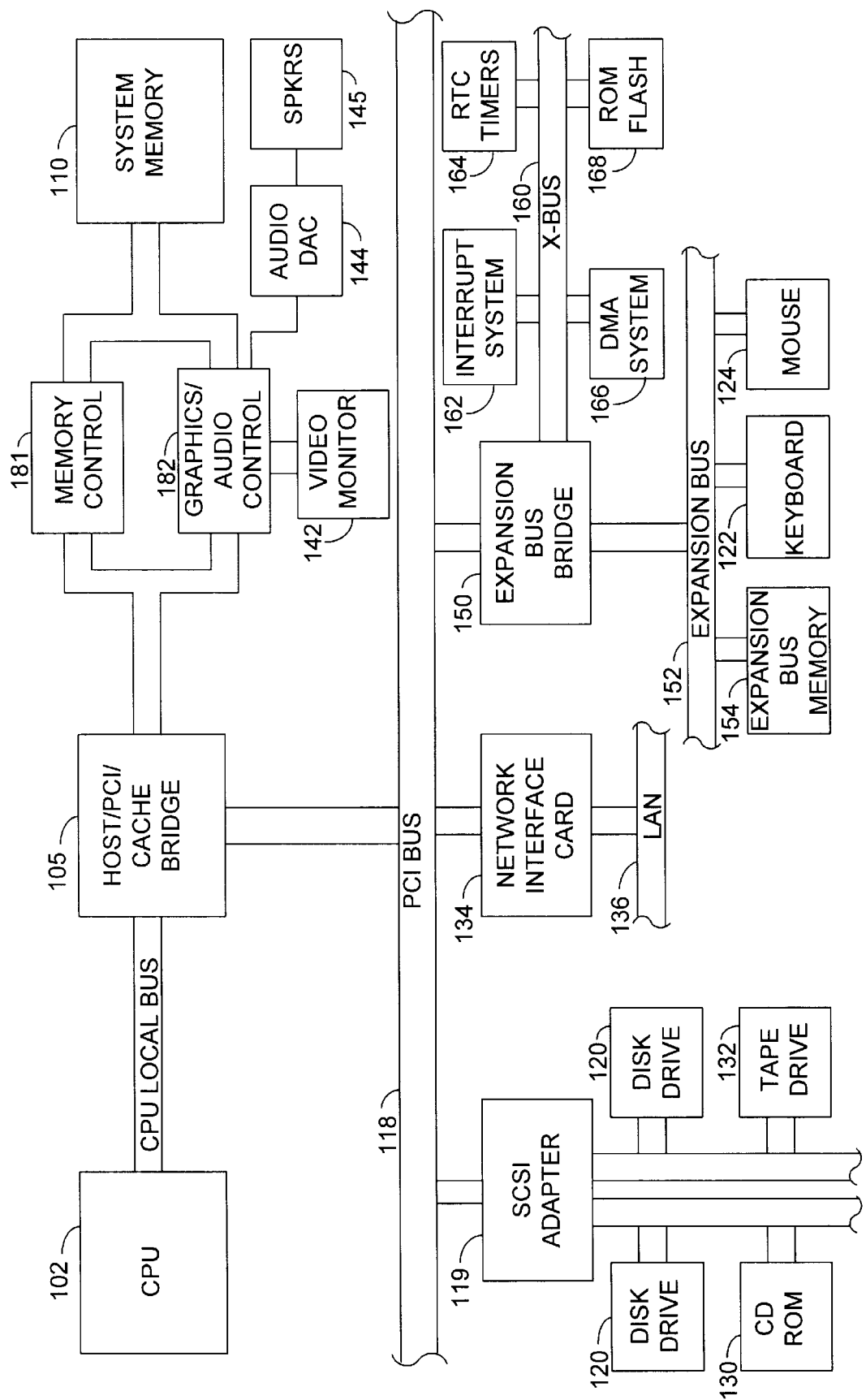
FIG. 3A illustrates an alternate embodiment of the computer system of FIG. 3 including memory control and graphics/audio blocks coupled to the system memory.

FIG. 3A illustrates an alternate embodiment of the computer system of FIG. 3 including memory control and graphics/audio blocks coupled to the system memory 110. In this embodiment, the host/PCI/cache bridge 105 couples to a memory control block 181 which couples to system memory 110. The host/PCI/cache bridge 105 also couples to a graphics/audio control block 182 which couples to system memory 110. Video monitor 142 and audio DAC 144 are coupled to the graphics/audio block 182. In this embodiment, the graphics/audio control block 182 performs the novel pointer-based display refresh list operations of the present invention. Speakers 145 connect to the Audio DAC 144.

Thus, in this embodiment, the internal logic of the IMC 140 is split into two chips 181 and 182, one comprising the memory control logic 181 and the other comprising the graphics/audio control logic 182. This embodiment is preferably used where it is impractical to include both the memory and graphical capabilities of the IMC 140 of the present invention on a single chip.

Figure 3B:
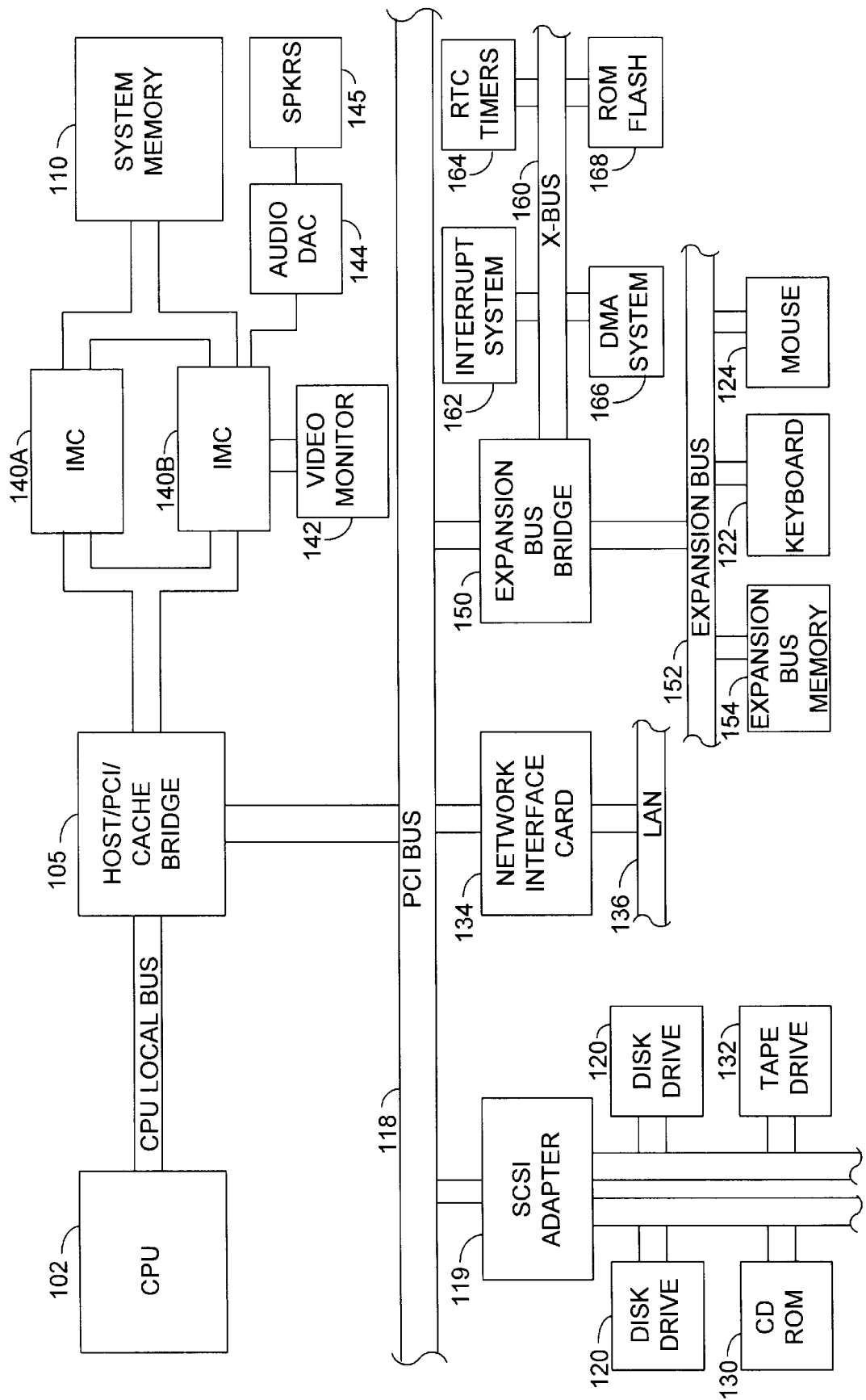
FIG. 3B illustrates an alternate embodiment of the computer system of FIG. 3 including two IMCs coupled to the system memory.

FIG. 3B illustrates an alternate embodiment of the computer system of FIG. 3 including two IMCs 140a and 140b coupled between the host/PCI/cache bridge 105 and the system memory 110. In one embodiment the IMC 140a is used solely for memory control functions and the IMC 140b is used solely for graphical and audio functions. Alternatively, the IMCs 140a and 140b each perform both memory and graphics/audio functions for increased performance. For example, the video monitor 142 may optionally be coupled to both IMCs 140a and 140b.

Figure 3C:
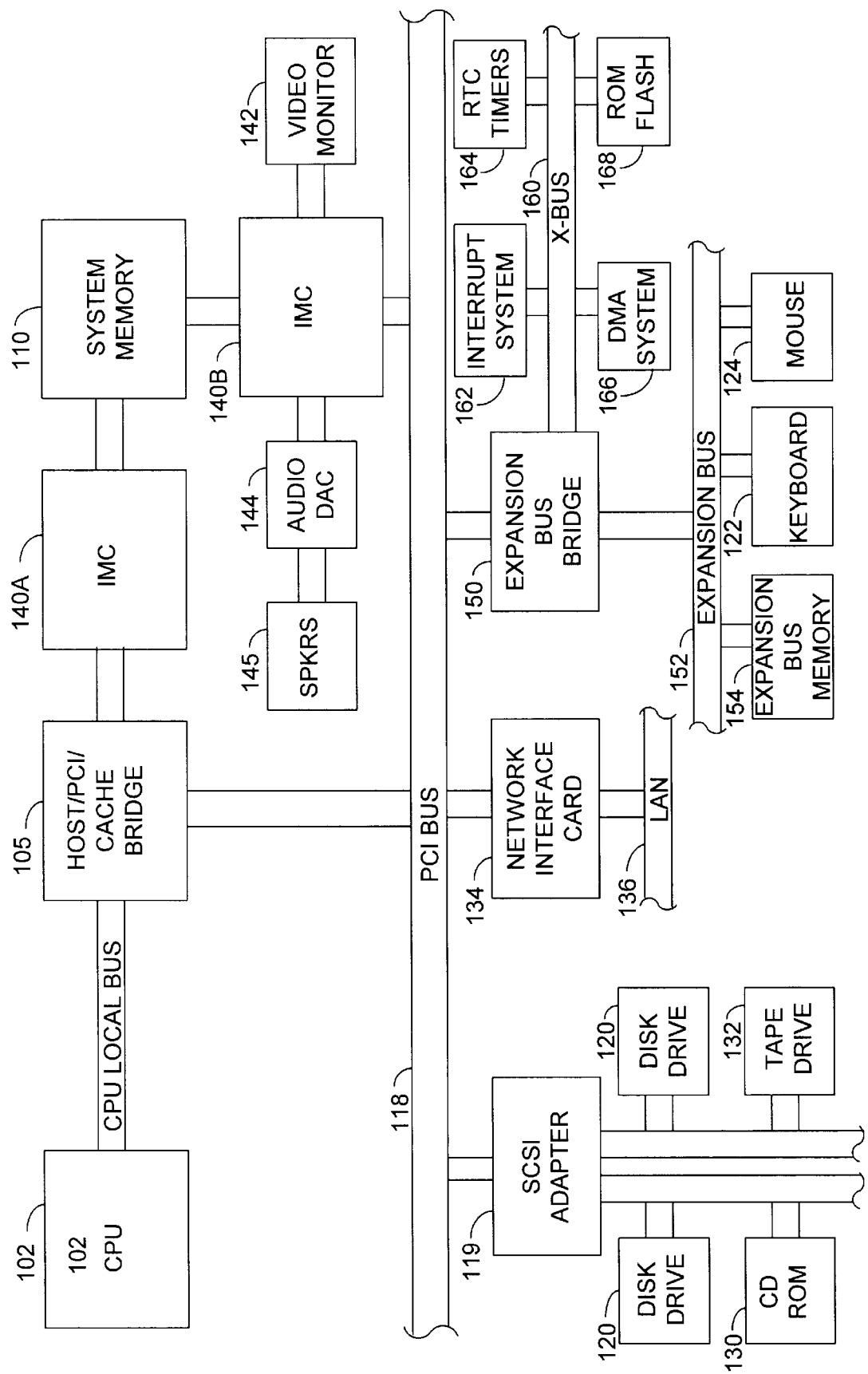
FIG. 3C illustrates an alternate embodiment of the computer system of FIG. 3 including a first IMC coupled to the cache bridge which couples to system memory and a second IMC coupled to the PCI bus which couples to system memory.

FIG. 3C illustrates an alternate embodiment of the computer system of FIG. 3 including a first IMC or memory controller 140a coupled between the host/PCI/cache bridge 105 and the system memory 110. A second IMC or dedicated graphics controller 140b is coupled to the PCI bus 118, and the second IMC or dedicated graphics controller 140b also couples to the system memory 110. Video monitor 142 and Audio DAC 144 are coupled to the IMC 140b and speakers 145 connect to the Audio DAC 145. In this embodiment, logic block 140a can simply be a memory controller without graphical or audio capabilities. Also, logic block 140b may be a dedicated graphics controller.

Figure 3D:
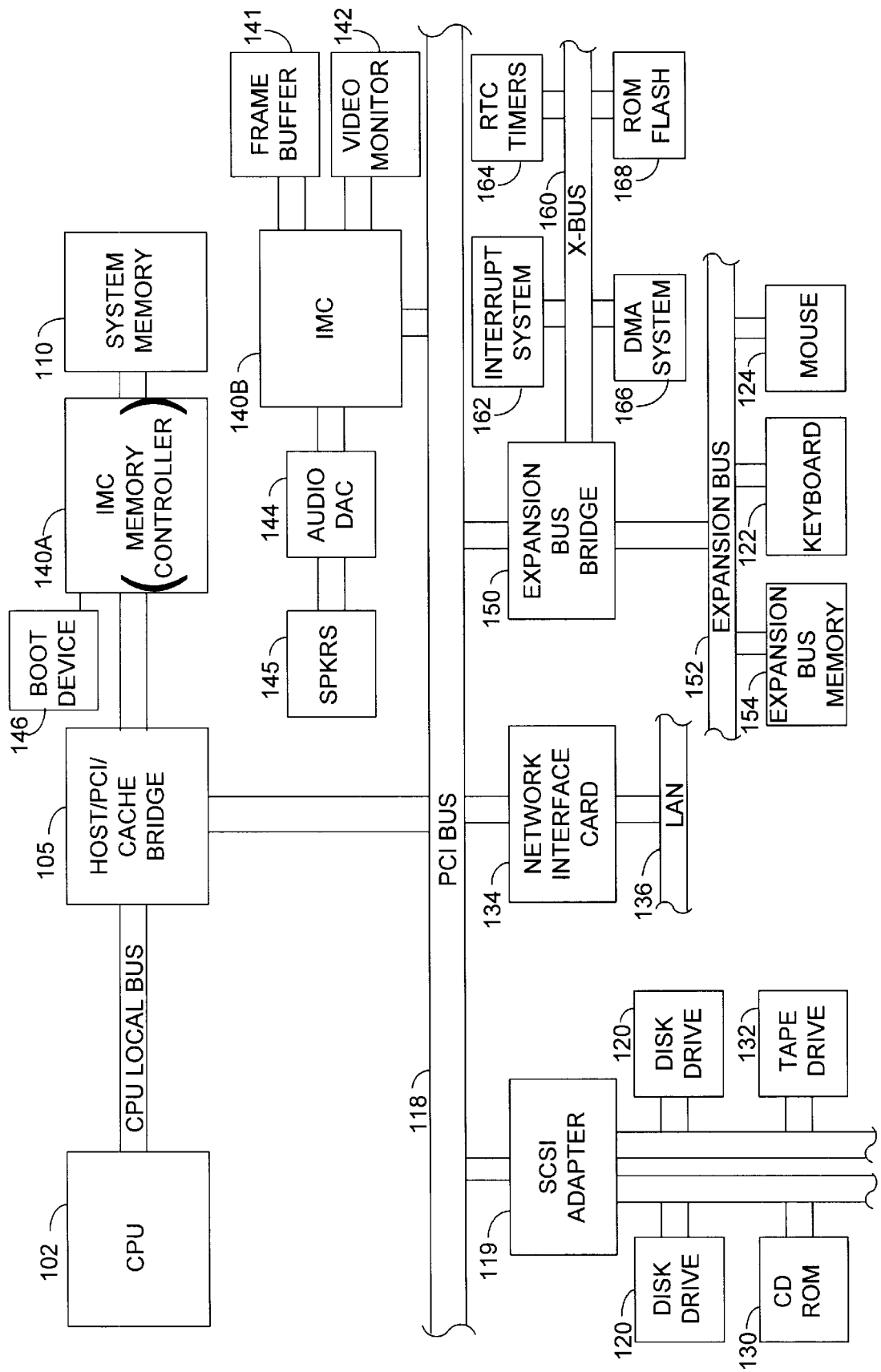
FIG. 3D illustrates a computer system including the IMC and using a prior art architecture where the IMC couples to the PCI bus and uses a separate video memory for video data.

FIG. 3D illustrates a computer system including the IMC and using a prior art architecture. A memory controller or first IMC 140a is coupled between the host/PCI/cache bridge 105 and the system memory 110. A dedicated graphics controller or second IMC 140b couples to the PCI bus 118. A video memory 141 separate from system memory 110 is coupled to the IMC 140b. Video monitor 142 and Audio DAC 144 are coupled to the IMC 140b and speakers 145 connect to the Audio DAC 145. This embodiment does not have certain of the same advantages as the embodiments described above because a separate video memory 141 is used. Also, this system requires graphical data or pixel data transfers between the system memory 110 and the video memory 141, which are not required in the above systems.

In an alternate embodiment, the IMC 140 is included in a system having an architecture similar to that of FIG. 1. In this embodiment, the computer system includes a dedicated (non-IMC) memory controller, and the IMC 140 is used as the graphics accelerator in the graphics adapter 112. This is similar to the embodiment of FIG. 3D except that the IMC 140 is replaced with a dedicated memory controller without graphical or audio processing capabilities. Alternatively, the computer system includes two IMCs, one as the memory controller 108 and one as the graphics controller 112.

IMC as a Bus Master

In the preferred embodiment, the IMC 140 is a system bus master, thus providing a better cost/performance ratio. In the preferred embodiment of FIG. 3, the IMC 140 can act as a master on the PCI bus 118 in a similar manner that the CPU 102 acts as a master on the PCI bus 118. In one embodiment, the PCI/cache bridge 105 includes arbitration logic, and the CPU 102 and the IMC 140 arbitrate for control of the PCI bus 118. As is well known, a PCI master is able to initiate burst mode or DMA data transfers onto or off-of the system bus, and such transfers minimize the amount of work the CPU 102 and IMC 140 must perform to move data around the system. Since the IMC 140 is a PCI master, memory acquisition or data transfers of certain data-types which are stored in permanent storage (disks) or across the network (LAN) do not consume CPU resources. It is noted that the subsystem, i.e., PCI arbitration logic in the bridge logic, must service the request to transfer, (IMC register initialization for the transfer). However, the CPU 102 is not required to actually perform the data transfer once the link has been established, and thus CPU processing time is saved. In the preferred embodiment where the IMC 140 is a bus master, once the subsystem has set up the data transfer, data movement is controlled by the IMC 140. In this case the IMC 140 may be tasked with decompression of data coming off of the system hard drive. Another example is an external MPEG decoder for live video. Once initialized, the IMC 140 moves and prepares the data for display without CPU intervention. With the IMC's ability to control transfer, decompression and display, the CPU 102 is not required to use processing power in order to transfer data between the subsystem and the system main memory.

IMC Interface

Figure 4:
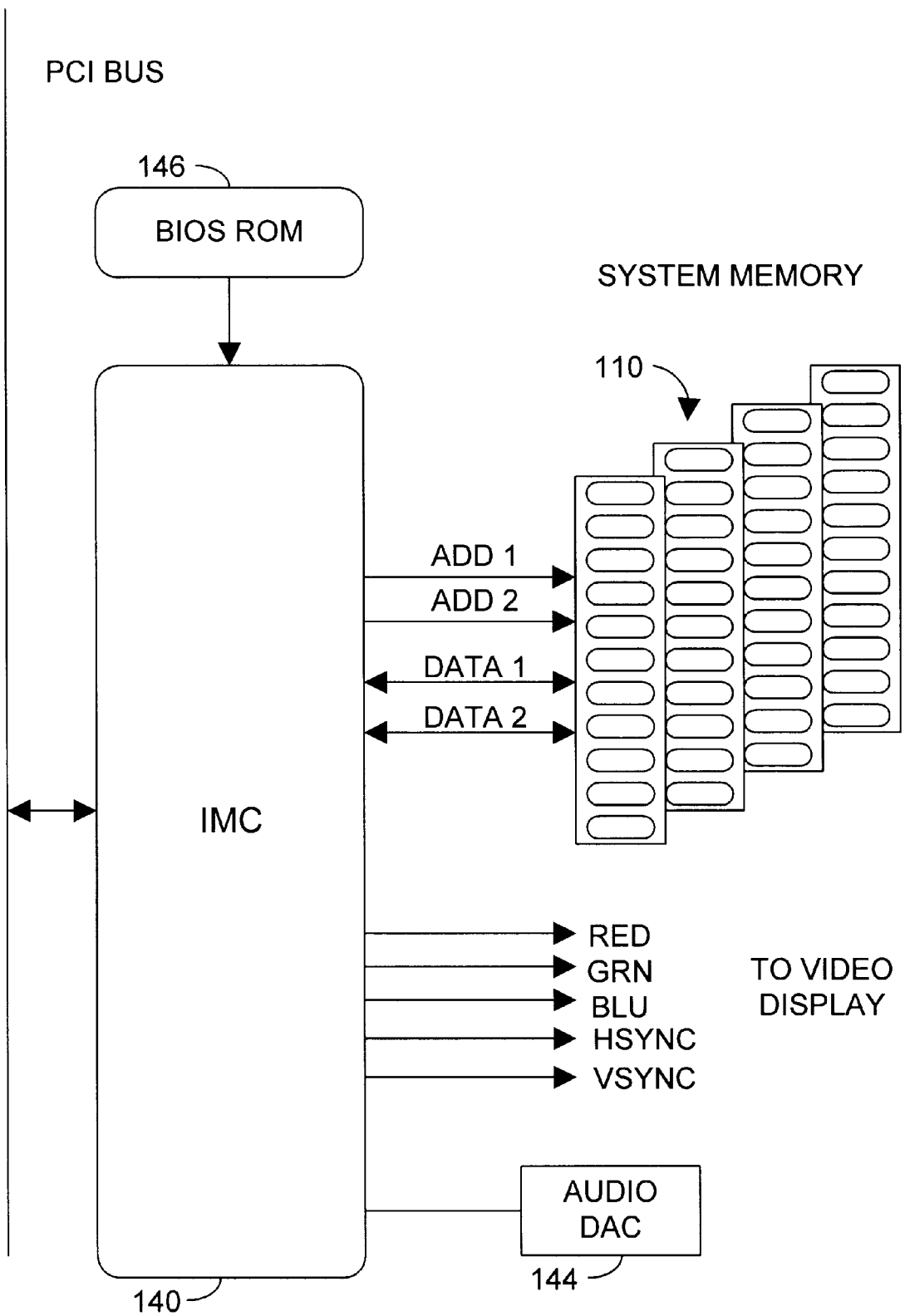
FIG. 4 is a block diagram illustrating the IMC interfacing to system memory and a video display monitor.

Referring now to FIG. 4, a block diagram illustrating how the IMC 140 interfaces to various devices is shown. In the embodiment shown in FIG. 4, the IMC 140 is coupled to a PCI bus wherein the PCI bus is the system bus 106. However, in the preferred embodiment, the IMC 140 is coupled to an expansion bus/cache bridge 105, as shown in FIG. 3. An external BIOS ROM 146 is coupled to the IMC 140 for boot and initialization of the computer system. As mentioned above, in the preferred embodiment the IMC 140 includes dual memory control units for connection of up to 512 Megabytes of system memory. Each memory control unit generates respective address and data signals as shown. For example, a first memory control unit generates address and data signals (Add1 and Data1) and a second memory control unit also generates address and data signals (Add2 and Data2). In an alternate embodiment, the IMC 140 includes a single memory control unit. The IMC 140 also generates the appropriate video signals for driving the video display monitor 142. As shown, the IMC 140 generates red, green and blue signals referred to as red, grn and blu, for driving the video display monitor 142 and generates horizontal and vertical synchronization signals referred to as HSYNC and VSYNC, respectively. The IMC 140 further generates audio signals to an Audio DAC 144, which in turn provides analog audio signals to one or more speakers (not shown).

IMC System Boot Procedure

The BIOS ROM 146 stores boot data, preferably in a compressed format. At power-up, the IMC 140 reads and decompresses the BIOS data from the BIOS ROM 146 into a normal format and loads the data into the system memory 110. In the preferred embodiment, all memory accesses are suspended until the boot code has been transferred to the system memory 110 and is ready to be read. All internal IMC mapping registers default to point to the boot code for power on operation. Once the boot code has been loaded into system memory 110, the CPU 102 traps the starting address of the boot code to begin boot operations.

The boot code is responsible for a number of configuration options of the IMC 140. When a reset input to the IMC 140 referred to as nRESET goes inactive high, configuration resistors tied to non-varying or inactive signals determine the start up procedures. If the configuration is set to boot from the IMC boot code, the data is read by the IMC 140, optionally decompressed, and transferred into the system memory 110. Before this operation can take place, the IMC 140 must also be programmed. When the boot device 146 is connected to the IMC 140, the first portion of the boot code is specific to the IMC 140. This code is read from the boot device 146 into the IMC instruction register FIFO. IMC instructions such as load and store registers set up the initialization of the IMC. These operations include but are not limited to: set refresh, map PCI memory bounds, initialize display timing, and read main CPU boot code to specific system memory address. In addition, if the boot code is in a compressed format, the IMC initialization routine sets up the IMC for decompression of such code. It is noted that all boot code for the IMC is in a "non-compressed" format. Once the system boot and driver have been initialized, the IMC protocol for instruction processing can be in a compressed format Once the boot code is transferred to the system memory 110 by the IMC 140, an NMI or high level interrupt is generated from the IMC interrupt output pin. Optionally, the IMC can communicate a "NOT READY" status to the CPU 102 to prevent access until the boot memory 146 is in place. After the IMC 140 has set the memory bounds and configured the PCI interface configuration, set display and memory refresh timings, decompressed and/or loaded host CPU boot code into system memory, an interrupt out instruction from the IMC 140 directs the host CPU 102 to begin instruction execution for completion of system initialization.

Non-IMC System Boot Procedure

In an alternate embodiment, the computer system does not include a boot device coupled to the IMC boot device port. In this embodiment, the IMC 140 resides in the system as a coprocessor. Another device within the subsystem is preferably responsible for register loads into the IMC 140 to enable system access to the main memory 110. In an embodiment where the IMC 140 is coupled to the PCI bus, the IMC 140 contains the correct configuration information in order for the system to recognize the IMC 140 as a PCI peripheral device. In this architecture the host CPU 102 is responsible for register loads to initialize the IMC 140. Such initialization sets up the decode memory map for non-compressed and compressed data storage, as well as the display for output and any other set-up required to boot the operating system.

IMC Block Diagram

Figure 5:
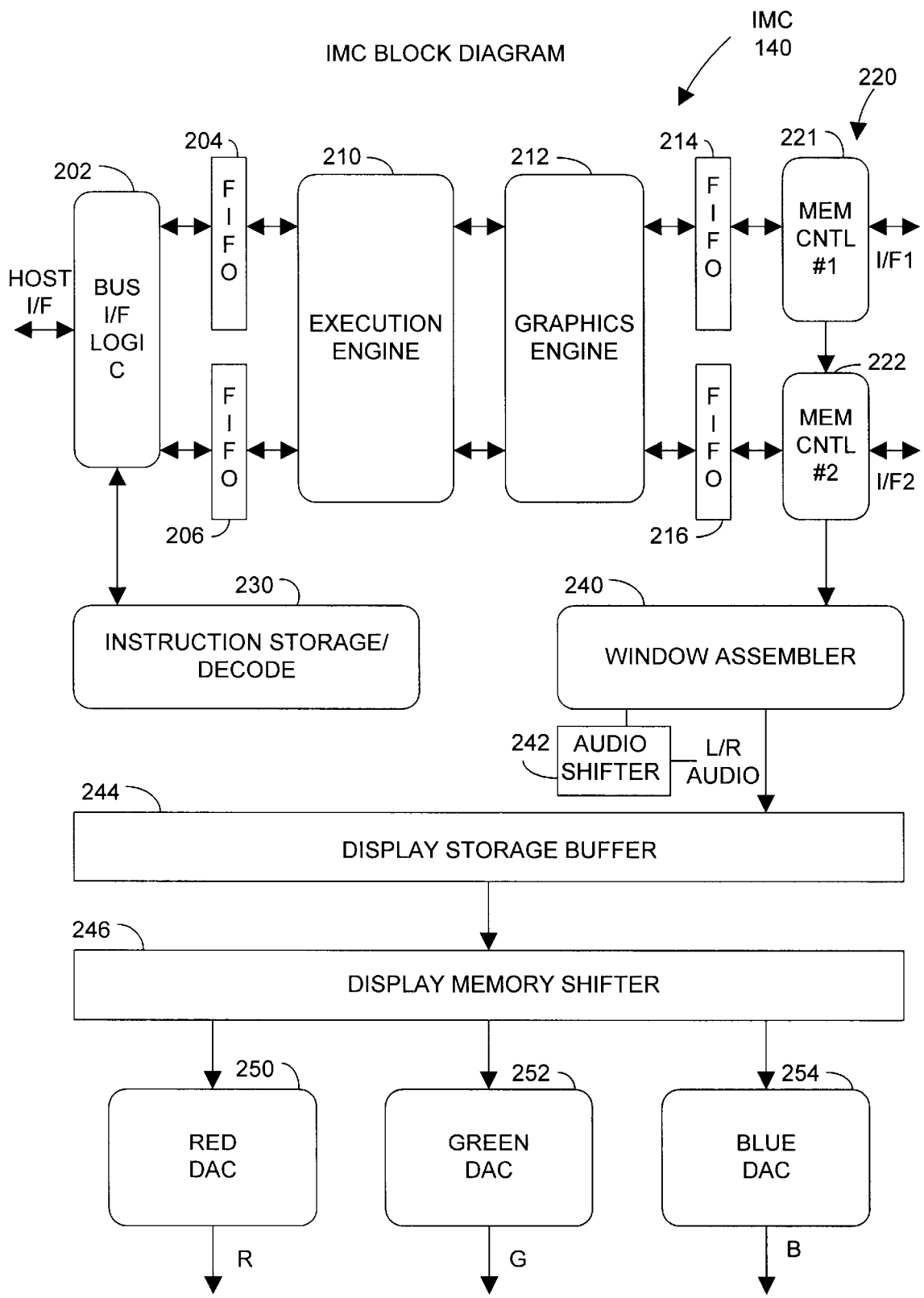
FIG. 5 is a block diagram illustrating the internal architecture of the integrated memory controller (IMC) of the present invention.

FIG. 5 illustrates a block diagram of the internal components comprising the IMC 140 of the present invention. It is noted that various of the elements in FIG. 5 are interconnected with each other, wherein many of the various interconnections are not illustrated in FIG. 5 for simplicity.

As shown, the IMC 140 includes bus interface logic 202 for coupling to the host computer system, i.e., for coupling to the system bus 106. In the preferred embodiment, the system bus 106 is the CPU bus or host bus. Alternatively, the system bus 106 is the PCI bus, and the bus interface logic 202 couples to the PCI bus. Instruction storage/decode logic 230 is coupled to the bus interface logic 202.

The bus interface logic 202 couples to an Execution Engine 210 through two first in first out (FIFO) buffers 204 and 206. In other words, the two FIFO buffers 204 and 206 are coupled between the bus interface logic 202 and the Execution Engine 210. The FIFO buffers 204 and 206 decouple data transfers between the external asynchronous computer system and the synchronous logic comprised within the IMC 140. The Execution Engine 210 preferably includes a digital signal processing (DSP) core which perform various operations, including data compression and decompression operations as well as texture mapping operations. Alternatively, the Execution Engine includes dedicated compression and decompression engines as well as a texture mapping engine for performing texture mapping on pixel data.

For more information on the compression and decompression operations of the Execution Engine, please see related co-pending application Ser. No. 08/463,106 titled "Memory Controller Including Embedded Data Compression and Decompression Engines", filed Jun. 5, 1995, whose inventor is Thomas A. Dye, and which is hereby incorporated by reference in its entirety as though fully and completely set forth herein.

The Execution Engine 210 couples to a Graphics Engine 212. The Graphics Engine 212 essentially serves as the graphical adapter or graphics processor and includes various graphical control logic for manipulating graphical pixel data and rendering objects. The Graphics Engine 212 includes polygon rendering logic for drawing lines, triangles, etc., i.e., for interpolating objects on the display screen 142. The Graphics Engine 212 also includes other graphical logic, including ASCII to font conversion logic, among others. The instruction storage/decode logic 230 stores instructions for execution by the Graphics Engine 212.

The Graphics Engine 212 couples through respective FIFO buffers 214 and 216 to a memory control unit 220, wherein the memory control unit 220 comprises respective memory control units referred to as memory control unit #1 221 and memory control unit #2 222. The FIFO buffers 214 and 216 couple to the memory control units 221 and 222, respectively. Memory control unit #1 221 and memory control #2 222 provide interface signals to communicate with respective banks of system memory 110. In an alternate embodiment, the IMC 140 includes a single memory control unit. The Graphics Engine 212 reads graphical data from system memory 110, performs various graphical operations on the data, such as formatting the data to the correct x,y addressing, and writes the data back to system memory 110.

The Graphics Engine 212 performs operations on data in the system memory 110 under CPU control using the high level graphical protocol of the present invention. In many instances, the Graphics Engine 212 manipulates or resets pointers and manipulates data in windows workspace areas in system memory 110, rather than transferring the pixel data to a new location in system memory 110.

The two memory control units 221 and 222 can each preferably address up to 256 Megabytes of system memory 110. Each memory control unit 221 and 222 comprises a complete address and data interface for coupling to system memory 110. Each memory control unit 221 and 222 also includes internal collision logic for tracking of operations to avoid data coherency problems. The memory control units 221 and 222 are coupled internally and include a complete display list of memory operations to be performed. Multiple display lists are used for memory transfers as well as screen refresh operations. Both memory control units 221 and 222 span the entire memory interface address space and are capable of reading any data comprised within the system memory 110.

In this embodiment of FIG. 5, a Window Assembler or Object Assembler 240, is coupled to each of the memory control units 221 and 222. The Window Assembler 240 includes logic according to the present invention which assembles video refresh data on a per window or per object basis using a novel pointer-based display refresh list method. This considerably improves system and video performance. In the embodiment of FIG. 5, the Window Assembler 240 also executes the display refresh list to transfer video data from system memory 110 to the video monitor 142. In the preferred embodiment of FIG. 6, as described below, the Execution Engine 210 assembles the display refresh list, and a Display Refresh List Engine 270 executes the display refresh list to transfer video data from system memory 110 to the video monitor 142.

The Window Assembler 240 maintains respective Object Information areas located in system memory 110 for each window or object on the display screen 142. The Object Information areas include a window workspace area and a Windows ID list area. In other words, the Window Assembler 240 includes memory mapped I/O registers which point to applications-specific memory areas within the system memory 110, i.e., areas of system memory 110 which are mapped as object information memory or windows workspace memory. Each window workspace contains important information pertaining to the respective window or application, including the position of the window on the display, the number of bits per pixel or color composition matrix, depth and alpha blending values, and respective address pointers for each function. Thus each window or object on the display screen includes an independent number of colors, depth, and alpha planes. The information in each respective window workspace is used by the Window Assembler 240 during screen refresh to draw the respective window information on the display screen 142. Therefore, the system memory 110 includes workspace areas which specify data types, color depths, 3D depth values, screen position, etc. for each window on the screen.

A display refresh list or queue is located in system memory 110, and the Window Assembler 240 dynamically adjusts and/or constructs the display refresh list according to the movement of or changes to data objects which appear on the video display screen 142. The Window Assembler 240 also executes the display refresh list to transfer data from system memory 110 to the video monitor 142.

The display refresh list comprises a plurality of pointers which reference video data in the system memory 110 that is to be refreshed to the video monitor 142. The plurality of pointers reference display memory areas in the system memory 110 which store video or pixel data for respective objects that appear on the display screen. The pointers reference portions of the data on a scan line basis, and the pointers are used to read out the data on a scan line basis during screen refresh. The use of a display refresh list for screen refresh operations greatly reduces data traffic as compared to prior art computer architectures and thus provides significantly improved performance.

In an alternate embodiment, as mentioned above, the Execution Engine 210 assembles or constructs (or manipulates) the display refresh list, and the Display Refresh List Engine 270 executes the display refresh list to present data on the screen 142.

Thus, when an object or window is moved to a new position on the display screen, the data comprising the object does not transfer to another location in system memory 110. Rather, only the display pointer address is changed in the system memory 110, and this change is reflected in the display refresh list. This provides the effect of moving data from a source address to a destination address, i.e., a bit block transfer (bit blit), without ever having to move data comprising the object to a new location in system memory 110. This provides greatly increased performance over conventional bit blit operations commonly used in graphical systems.

The Window Assembler 240 is coupled to a display storage buffer 244 where the screen refresh pixel data is stored. The display storage buffer 244 is coupled to a display memory shifter 246 which in turn is coupled to respective red, green and blue digital to analog converters (DACs) 250–254 which provide the respective red, green and blue signals to the display unit 142. It is noted that the IMC 140 may process and provide video output signals in any of various formats, including RGB and YUV, among others.

The IMC 140 also provides horizontal and vertical synchronization signals (not shown in FIG. 4). In one embodiment, the Window Assembler 240 also provides audio signal outputs to an Audio Shifter 242 which provides audio output signals, as shown.

The IMC 140 includes a bursting architecture designed to preferably burst 8 bytes or 64 bits of data during single transfers, and can also burst 32 bit (4 byte) transfers for PCI bus transfers. The IMC 140 also includes logic for single byte and multiple byte operations using either big or little endian formats. The IMC 140 transfers data between the system bus and main memory 110 and also transfers data between the system memory 110 and the internal shift registers 244 and 246 for graphical display output. All data transferred within the IMC 140 is subject to operation within the execution engine 210 and/or the graphics engine 212 as the data traverses through the data path of the IMC 140.

Window Assembler Block Diagram

Figure 5A:
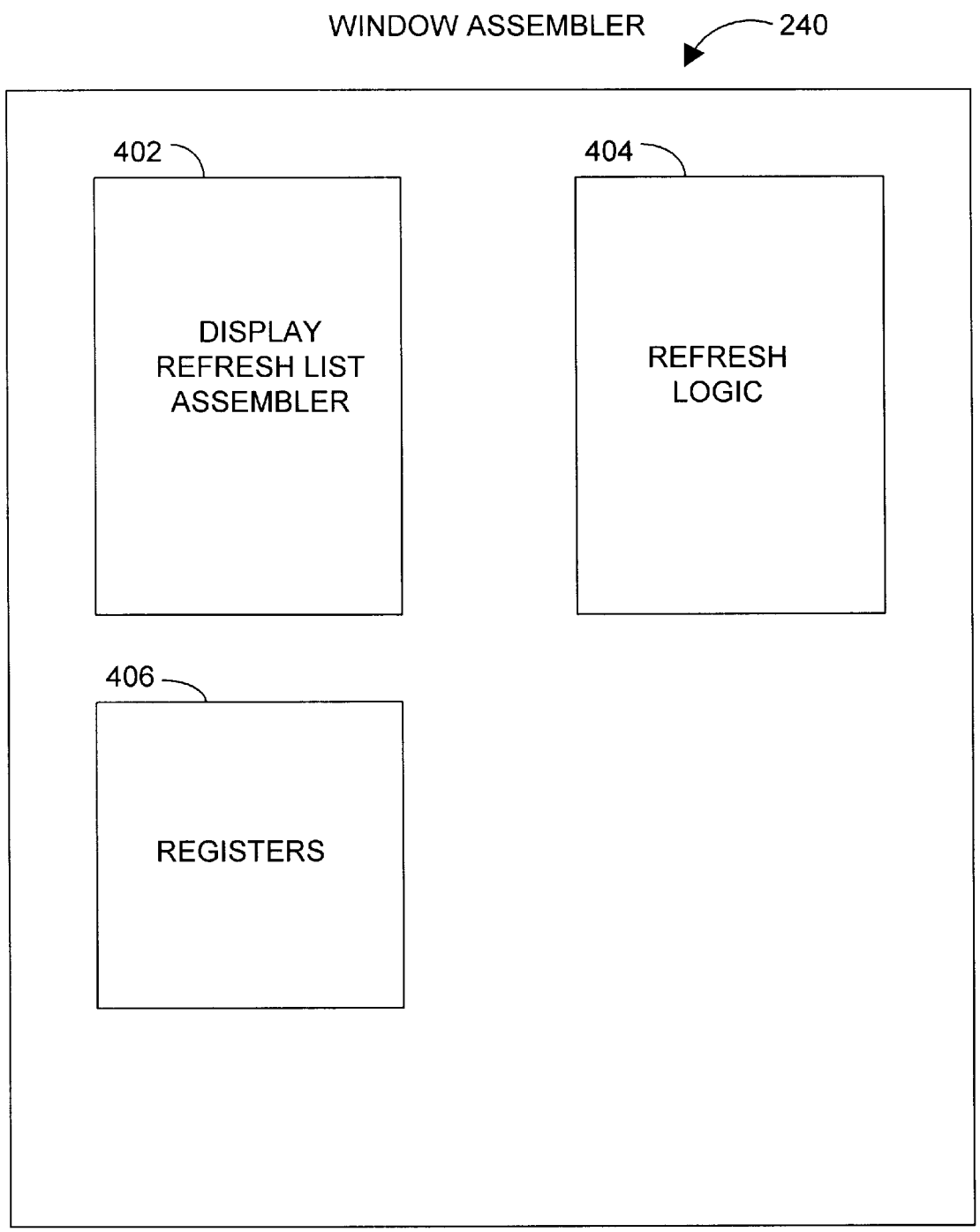
FIG. 5A is a block diagram illustrating internal components of the Window Assembler of FIG. 5.

FIG. 5A is a block diagram illustrating the components of the Window Assembler 240 of the present invention. As shown, the Windows Assembler 240 includes a Display Refresh List Assembly block 402 and Refresh logic 404. The Window Assembler 240 also includes a number of registers 406 storing pointers and other information used by the Display Refresh List Assembly block 402 and Refresh Logic 404. The Display Refresh List Assembly block 402 assembles display refresh lists in system memory 110 which indicate the video data that is to be output to the screen 142 on the next refresh. The Refresh Logic 404 comprises a Display Refresh List Execution unit which executes an assembled display refresh list during screen refresh to present the correct video data on the display screen 142.

IMC Block Diagram—Preferred Embodiment

Figure 6:
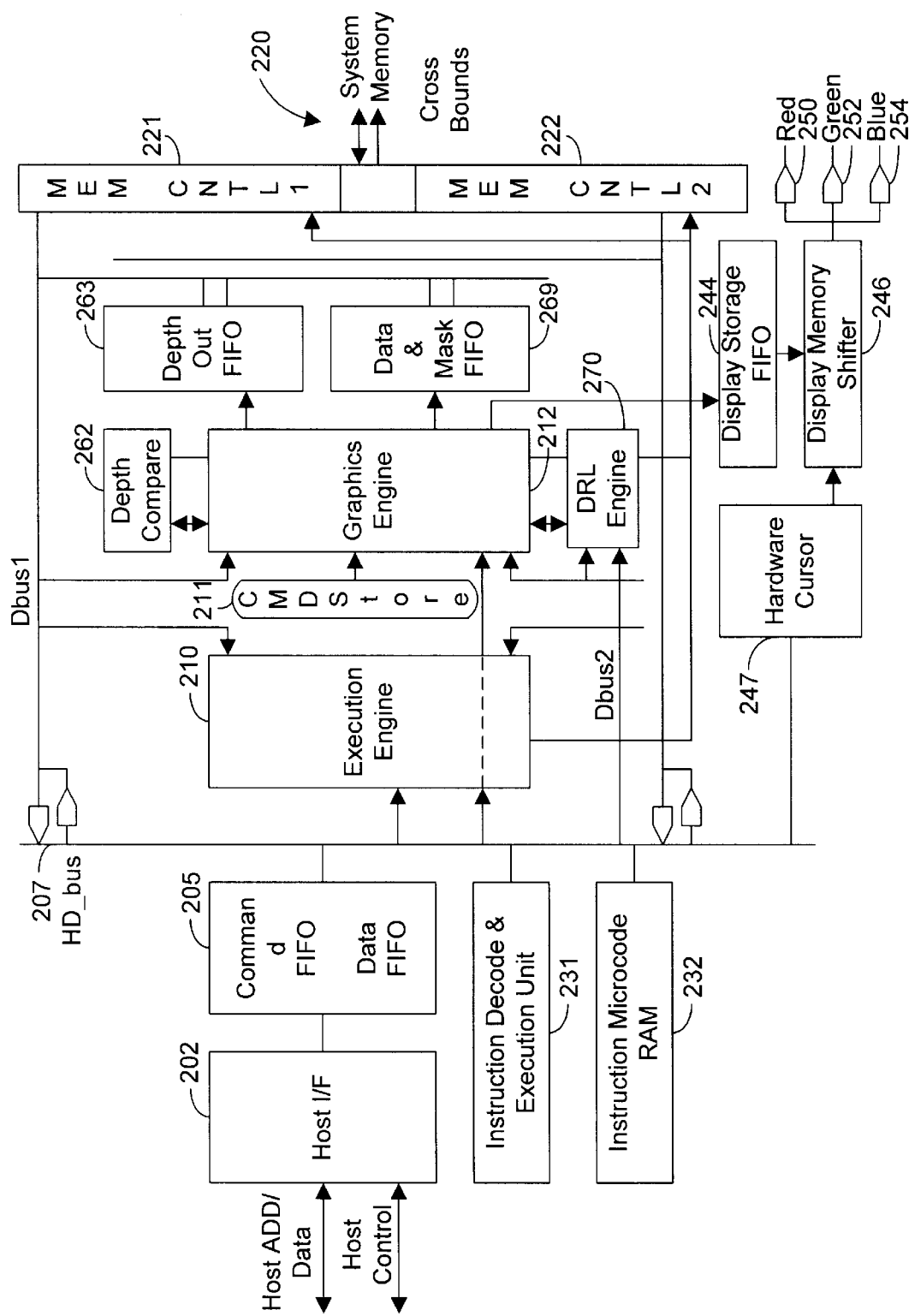
FIG. 6 is a more detailed block diagram of the integrated memory controller (IMC) acceding to an alternate and preferred embodiment of the present invention.

Referring now to FIG. 6, a more detailed block diagram of the IMC of the present invention is shown. As shown, the Host Interface 202 connects either to the system CPU or peripheral core logic. An input Command and Data FIFO 205 is connected to the Host Interface 202. The Command and Data FIFO 205 stores the display list instructions for the Execution Engine 210 and the Graphics Engine 212, and also stores the data which is transferred between the system CPU 102 and the system memory 110. The Command and Data FIFO 205 may comprise one FIFO or a plurality of FIFOs, and only one FIFO is shown in FIG. 6 for convenience.

As shown, a bus referred to as the HD bus 207 is coupled between the Command and Data FIFO 205 and the Execution Engine 210. Instruction Decode and Execution Unit 231 is coupled to the HD Bus 207. The Instruction Decode and Execution Unit 231 receives command data from the Command FIFO 205 and manipulates that data for proper execution by both the Execution Engine 210 and the Graphics Engine 212.

Instruction Microcode RAM 232 is also coupled to the HD bus 207. The Instruction Microcode RAM 232 stores a microcoded sequence for the Execution Engine 210. In the preferred embodiment, microcode instructions are downloaded from the system memory 110 to the Instruction Microcode RAM 232, depending on the operation of the Execution Engine 210. For example, when the Execution Engine 210 is required to compress or decompress data coming from the system or from the memory 110, the Instruction Microcode RAM 232 is loaded with the operation and/or instruction codes to actually perform the decode or encode of data as the data flows through the system. Thus one example where different microcode is loaded in the Instruction Microcode RAM 232 is compression and decompression operations. Other examples where different microcode is loaded in the Instruction Microcode RAM 232 include generation of slope information for the Graphics Engine 212, and generation of the display refresh list, as discussed below.

In the preferred embodiment shown in FIG. 6, the Execution Engine 210 generates or assembles the display refresh list, and Display Refresh List Engine 270 executes the display refresh list to present data on the display screen. In an alternate embodiment shown in FIG. 5 and discussed above, the Window Assembler 240 performs both operations of assembling and executing the display refresh list.

As described below, a display refresh list is generated in response to receiving a Display Refresh List Assembly command. In other words, in response to receiving a Display Refresh List Assembly command, the Execution Engine 210 generates a display refresh list. The display refresh list comprises a series of pointers and other information which reference video data in the main memory 110 for display on the display screen. Generation of the display refresh list requires a set of microcode, which is loaded from system memory 110 or from the CPU 102 into the Instruction Microcode RAM 232. Therefore, the Instruction Microcode RAM 232 is modified depending on the type of operation to be executed within the Execution Engine 210.

The Execution Engine 210 is coupled to the HD Bus 207 as shown. The Execution Engine 210 is responsible for various operations as described above, such as compression/decompression, slope cancellations, texture map preparation, such as filtering, and other operations which offload work from the CPU 102. Also in the architecture of the preferred embodiment of the invention, the Execution Engine 210 generates the display refresh list, and Display Refresh List Engine 270 executes the display refresh list to present data on the display screen as mentioned above.

A Command Store 211 is coupled between the Execution Engine 210 and the Graphics Engine 212. The Command Store 211 stores commands provided from the Execution Engine 210 to the Graphics Engine 212. As described above, the Graphics Engine 212 performs various graphical operations on data.

Referring again to the IMC block diagram of FIG. 6, Depth Compare block 262, also referred to as the Z-buffer Compare Block, is coupled to the Graphics Engine 212. The Depth Compare block 262 performs the trivial rejection of objects that are behind other objects. The Z-buffer data is fed from the system memory 110 where the Z-buffer is located and compared to the output of a Poly Engine (FIG. 22) located inside the Graphics Engine block 212. The results of this comparison are then provided to a Depth Output FIFO. The results of the Graphics Engine 212 for color operations are provided to Data and Mask FIFO 269, as shown.

As also shown on FIG. 6 of the IMC block diagram, the IMC 140 includes memory control units 221 and 222. A First data bus referred to as Dbus1 is connected between the Memory Controller 220 and the HD bus, and a second data bus referred to as Dbus 2 is connected between the Memory Controller 222 and the HD bus, as shown. The memory control units 221 and 222 are responsible for interfacing data and addresses with the system memory 110. The memory control units include Cross Bounds logic, also referred to as the Cross Bounds memory circuit. For more information on the Cross Bounds Memory logic, please see U.S. patent application Ser. No. 08/340,667, referenced above.

Display Storage FIFO 244 is coupled to the Graphics Engine 212 and receives graphical data from the Graphics Engine 212. Display memory shifter 246 is coupled to the Display Storage FIFO 244. Hardware Cursor logic 247 is coupled to the HD Bus as shown and provides an output to the Display Memory Shifter 246. The Display Memory Shifter 246 provides outputs to three digital to analog (D/A) converters 250, 252, and 254 which correspond to red, green, and blue signals.

The Display Storage FIFO 244 is preferably a multiple usage FIFO which stores 8-bit indexed data and which also stores 24-bit RGB data. The Display Storage FIFO 244 also includes a color look-up table as well as other logic. The Display Memory Shifter 246 multiplexes parallel data from the storage FIFO 244 in order to format the RGB components for serial input to the DACs. The Display Storage FIFO 244 and Display Memory Shifter 246 are discussed in greater detail with reference to FIG. 26. The Hardware Cursor logic 247 performs an overlay process in conjunction with the Display Memory Shifter 246, and this overlay process allows a hardware cursor to reside over any other data which then flows to the red, green and blue D/A converters 250–254.

Pointer-Based Display List Video Refresh System and Method

As mentioned above, the IMC 140 of the present invention includes a novel pointer-based display refresh system and method which assembles and displays video data on the screen on a per-window or per object basis during screen refresh. In the present disclosure, the term "window" is used to mean any type of object or window which appears on the display screen. Also, the following description corresponds to the preferred embodiment of FIG. 6, where the Execution Engine 210 assembles the display refresh list and the Display Refresh List Engine 270 executes the display refresh list. However, the description below also applies to the embodiment shown in FIG. 5, wherein the Window Assembler 240 both assembles the display refresh list and executes the display refresh list.

Figure 7:
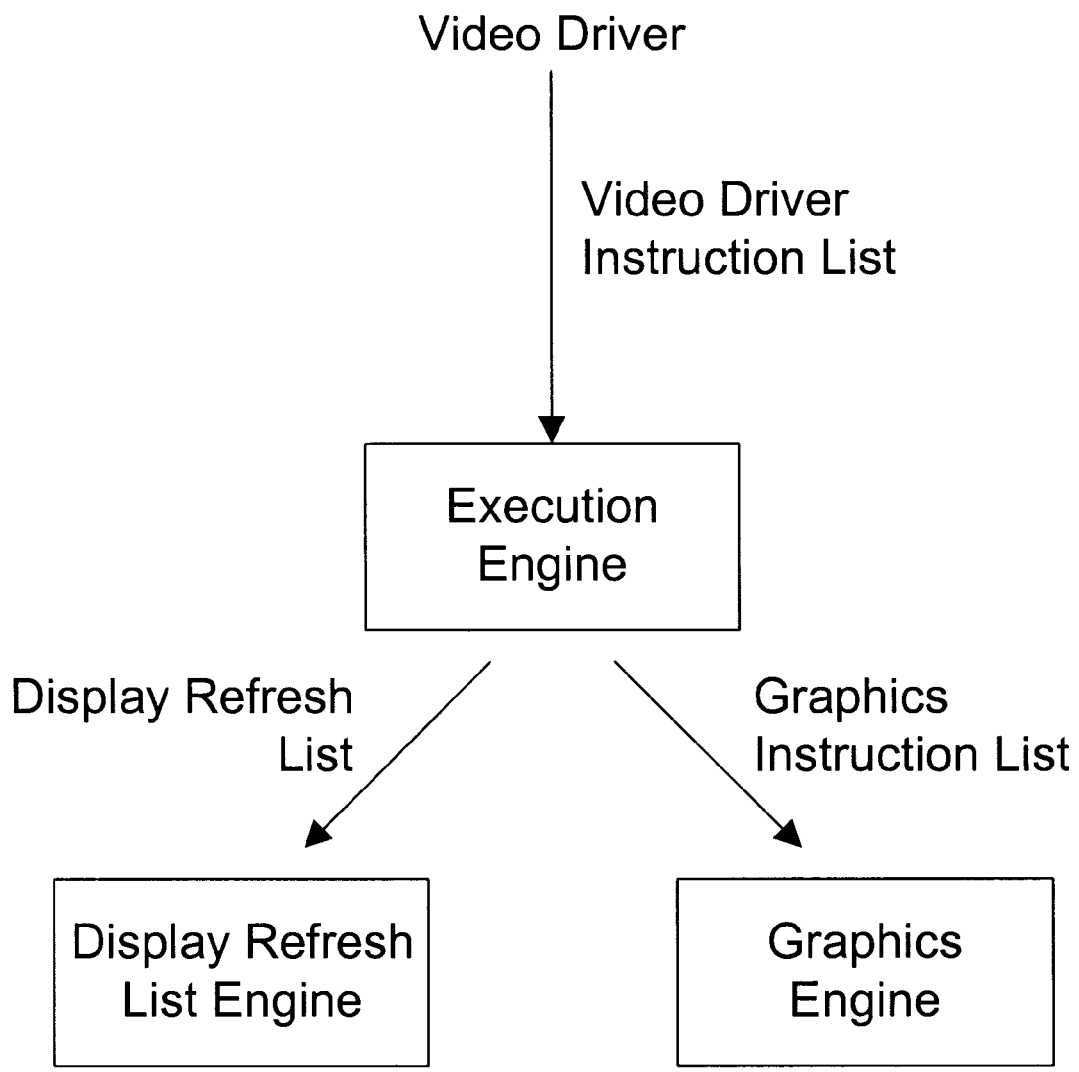
FIGS. 7 and 7A illustrate operation of software drivers for the IMC of the present invention.

FIG. 7—Video Driver Operation

A video driver executes on the CPU 102 and generates a video driver instruction list which includes video display information regarding desired changes to the video output of the video monitor 142. The video display information includes screen update and/or graphics information for displaying video data on the display screen of the video monitor 142. For example, the video display information may include commands to draw a 3D texture map, or to bit blit pixel data from a first xy memory location to a second xy memory location, to render a polygon, or to assemble a display refresh list.

The video driver instruction list is provided to the Execution Engine 210 in the graphics controller or IMC. The Execution Engine 210 examines the video driver instruction list and generates a list of graphics and/or memory commands to the Graphics Engine 212. Thus the Execution Engine 210 constructs a complete list of graphics or memory operations to be performed in response to desired screen change information. In response to an Assemble Display Refresh List command, the Execution Engine 210 assembles or constructs a display refresh list.

Figure 7A:
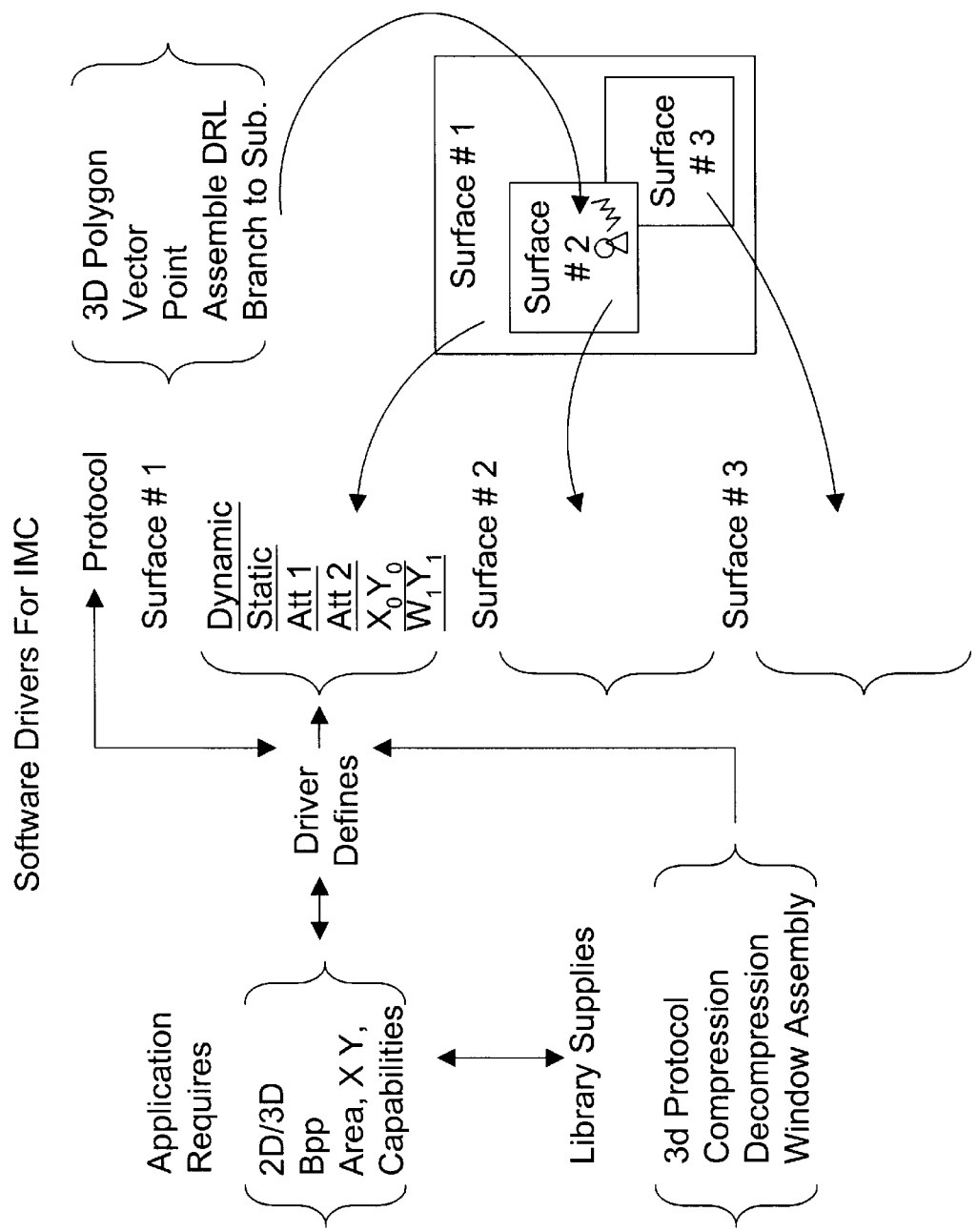

FIG. 7A illustrates operation of the software drivers which interface to the IMC 140. Essentially, each application requires a different set of constraints, such as whether the application is a 2-D or a 3-D application, the number of bits per pixel, the area in which the window works, and the capabilities of the subsystem. Based on the requirements of the application, the drivers make calls to supplemental libraries, such as 3-D protocols, compression and/or decompression libraries, and possibly a window assembly library, among others, to perform desired operations.

Display List Video Refresh

The display list video refresh system and method of the present invention uses multiple registers and memory queues to perform video display operations. The IMC 140 includes two versions of each register and maintains two versions of the memory queues in system memory 110 to allow one display refresh list to be used for screen refresh while the other is being assembled to reflect recent updates to the display screen. This double buffering allows clean context switches from frame to frame.

The IMC 140 includes first and second or foreground and background versions of each of the registers and buffers. The term "foreground" is used for the registers and buffers that are for active display to display data on the display screen of the video monitor 142 during screen refresh. The term "background" is used for the registers and buffers that are used to assemble a new display refresh list for a subsequent screen refresh. When one or more of the windows or objects are changed or updated and an "Assemble Display Refresh List" command has completed, then on the next VSYNC or next refresh, the background registers and buffers become the foreground registers and buffers, and vice-versa.

The Display Refresh List Engine 270 in the IMC 140 includes a number of registers for performing its operations. The IMC 140 includes foreground and background window count registers, foreground and background Window ID list pointer registers and foreground and background display refresh list Pointers. The window count registers hold a value for the total number of windows or objects to be assembled onto the display. The Window ID list pointer registers contain an address which points to the top of a buffer referred to as the Window ID list contained in the system memory 110. The display refresh list Pointers hold a pointer to a respective display refresh list in system memory 110.

Display List Memory Buffers

Figure 8:
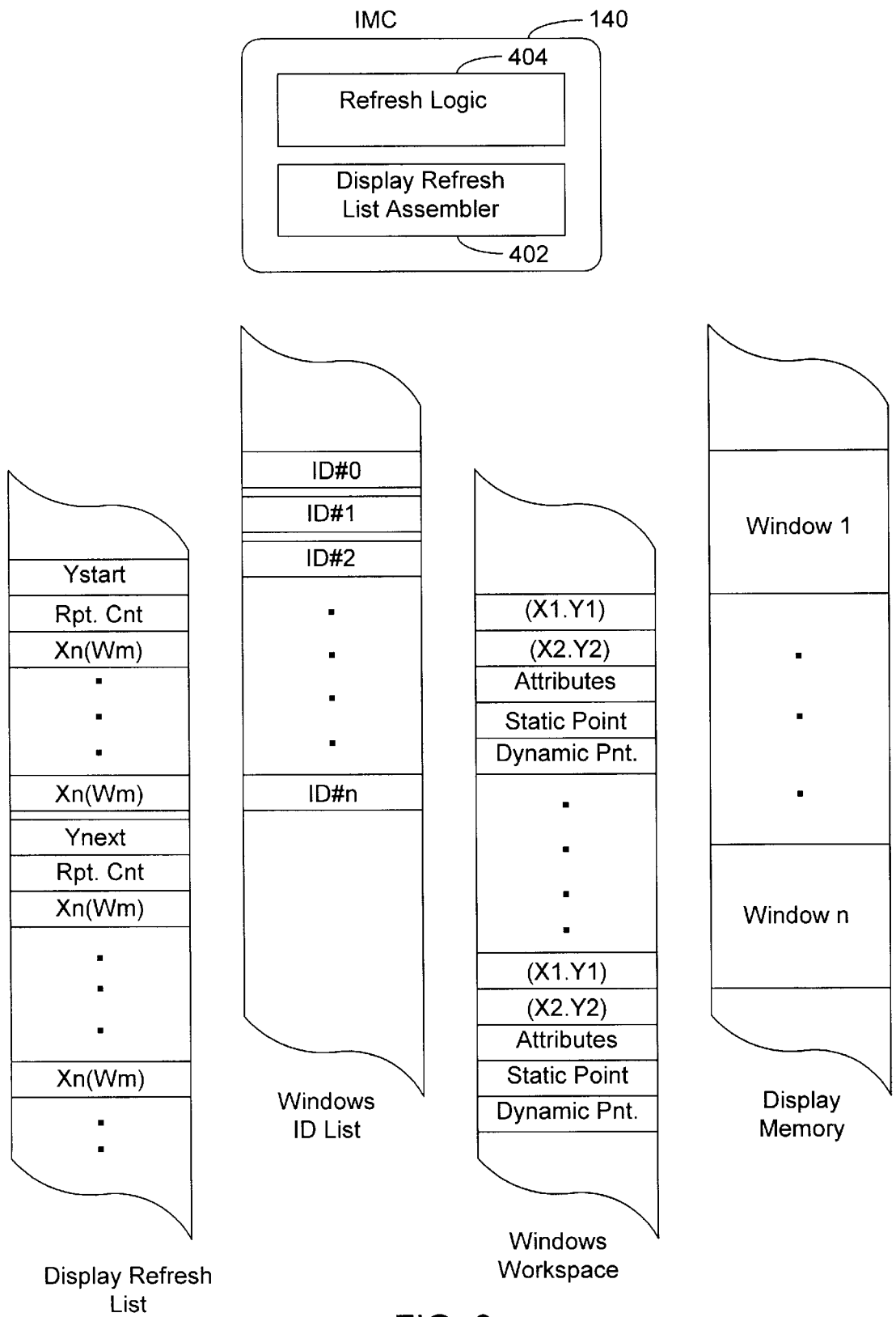
FIG. 8 illustrates the memory organization of system memory as seen by the IMC, including the buffers or queues in system memory used by the IMC to access, manipulate and display graphical data stored in the system memory according to the present invention.

FIG. 8 illustrates the memory organization of system memory 110 as seen by the Execution Engine 210, the Graphics Engine 212, video driver software executing on the CPU 102, and the Display Refresh List Engine 270. The Execution Engine 210, Graphics Engine 212 and/or video driver software executing on the CPU 102 create and manipulate various buffers or queues in system memory 110, and these buffers are used by the Display Refresh List Engine 270 to access, manipulate and display video data stored in the system memory 110 according to the present invention.

As shown, the system memory 110 includes a Windows ID list, a Windows Workspace buffer, and a display memory section for storing video data, and a display refresh list. The Windows ID list and the Windows Workspace buffer comprise as memory areas as in the system memory 110 used for maintaining information about the windows or objects stored in memory 110, at least a subset of which are displayed on the video monitor.

The display memory section or buffer includes a plurality of memory areas, which may or may not be contiguous. The plurality of display memory areas store video data corresponding to video objects or windows, at least a subset of which are displayed on the video monitor. Thus it is noted that the present invention is not required to maintain, and preferably does not maintain, a single frame buffer which contains all of the video data for display on the video screen. Rather the video data for the various windows and objects is stored in respective memory areas in the system memory 110, and pointers assembled in the display refresh list are used to reference this data during screen updates. Thus, data is not required to be moved in or out of a frame buffer to reflect screen changes, but rather in many instances either the video data for a respective window or object is changed, or only the pointers in the display refresh list are manipulated, to affect a screen change.

It is noted that the present disclosure uses the term "display memory" to refer to system memory areas, which may or may not be contiguous, storing video data corresponding to windows or objects, at least a subset of which are displayed on the video monitor. The term "display memory" as used herein is not intended to connote a single frame buffer memory area as used in the prior art. As noted above, the preferred embodiment of the invention does not use a single frame buffer memory, but rather stores video data for windows or objects in a plurality of respective memory areas.

The IMC 140 maintains two versions of the Windows ID List memory queue and the display refresh list memory queue. This allows one set of buffers, the foreground buffers to be used for screen refresh, while the other set of buffers, the background buffers, are used to assemble a new display refresh list to reflect recent screen changes. The Graphics Engine 212 and/or video driver software preferably allocate additional windows workspace areas on an as needed basis. For graphics animation applications, the system memory 110 preferably double buffers the video display memory where the video data is stored. In one embodiment, the present invention only requires double-buffering of the video data corresponding to the object or window being animated or changed from frame to frame. In this embodiment the video data corresponding to objects or frames that do not change from frame to frame do not require double-buffering.

Overview of IMC Display List Operation

The following is an overview of operation of the IMC 140 according to the present invention. First, video data or pixel data is presumed to reside in the system memory 110 which is to be output onto the screen, this portion of system memory 110 being referred to as display memory. This graphical or video data is written into the system memory 110 by the CPU 102 under the direction of a software program, such as an application program. Here it is assumed that there are multiple windows or objects comprising pixel data stored in system memory 110, such as that shown in FIG. 16. These windows are located in system memory 110 as linear data, i.e., the linear data has not yet been formed into XY data. Alternatively, the windows are located in system memory 110 as XY addressable data. It is also assumed that the foreground registers and buffers are being used to execute the current foreground display refresh list. If a screen update recently occurred and an Assemble Display Refresh List command has been issued, then the current background display refresh list is being assembled using the background registers and buffers.

The manipulation of pointers and windows workspace data in the system memory 110 is preferably performed using a high level protocol between the video driver executing on the CPU 102 and the Graphics Engine 212. When an application executing on the CPU 102 desires to change the video display 142 such as move or occlude a window or display a user frame in a video animation sequence, video driver software executing on the CPU 102 communicates with the Graphics Engine 212 which in turn manipulates display pointers and/or windows workspace data in the system memory 110. Alternatively, the video driver software directly manipulates the display pointers and/or windows workspace data in the system memory 110. In the preferred embodiment described below, the driver software directly manipulates the display pointers and windows workspace data.

Figure 24:
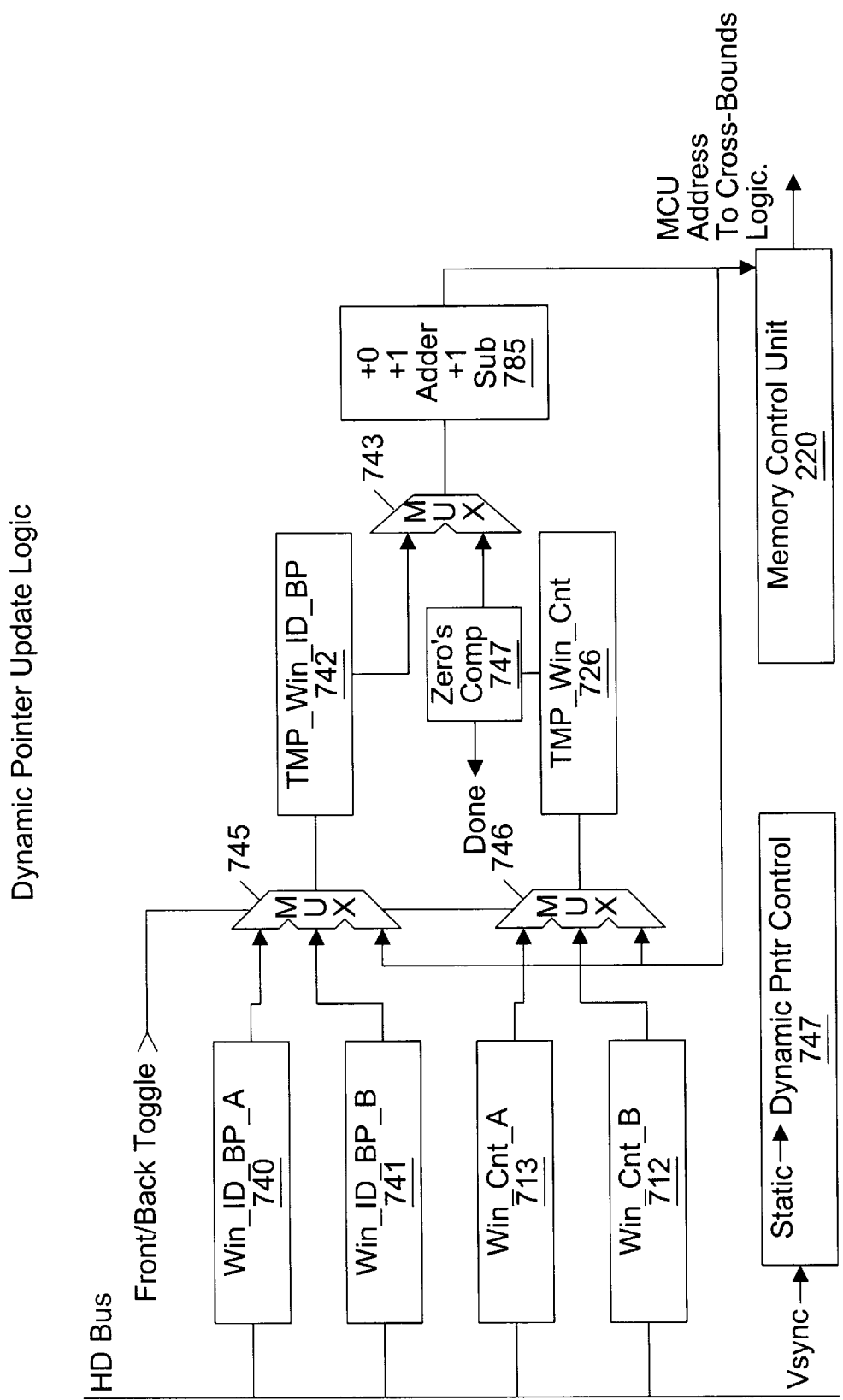
FIG. 24 is a block diagram of the Dynamic Pointer Update logic in the Display Refresh List engine of FIG. 23.

When a change is needed on the video display 142, driver software executing on the host CPU 102 assembles and/or updates pointers in the Windows ID list, which includes a pointer for each window or object on the screen. The driver software also determines and/or updates basic information about each window or object that is new or has changed, including information about the respective window's position, i.e., where the window is to reside on the screen, certain video or attribute information about the window, window depth information, and the values of pointers to the system memory 110 where the video data for the respective window resides. The driver also assembles and/or updates a Windows Workspace list or buffer in the system memory 110 through the IMC 140 which includes a windows workspace area comprising this information for each window. The information in each windows workspace area is shown in FIG. 24. Thus, the driver software assembles a new Windows ID list pointer and a new windows workspace area for new windows that appear on the screen, and the software updates either the Windows ID list or the windows workspace area to correspond to changes in existing windows, i.e., windows that have been moved and/or have changed in depth relative to other windows, etc.

In assembling a windows workspace area for a respective window, the driver software first determines the X1, Y1 position, which is the top left corner of the window, and the X2, Y2 position, which is the bottom right corner of the window, and stores this data in the windows workspace area. For non-rectangular objects, different location information is preferably stored.

The windows or objects are presented on the screen according to software control, and the windows appear on the monitor according to these X,Y addresses. The driver software also generates an attributes section for each window that is stored in the windows workspace area. The attributes section includes values for the depth of the window, the number of bits per pixel, the dither pallet, if necessary, alpha bending information, and other information. The contents of the attribute field and the manner in which the attributes are used within the engine to display video data are described further below.

The driver also stores a static pointer and a dynamic pointer in the window workspace area for each window. The static pointer is a linear pointer to the actual display memory where the video data resides, i.e., to the first word of video data in the system memory 110 for that window. The dynamic pointer changes on each horizontal scan line or span line to point to the video data for the respective span line for that window. In the present disclosure, the terms "scan line" and "span line" are used interchangeably. Depending on the number of windows, the Windows Workspace buffer can be fairly lengthy. However, in general, only a few words of system memory per window are required to describe the characteristics and position of the window or object.

Once the host software driver has assembled the Windows Workspace buffer, the Execution Engine 210 uses this information to assemble a display refresh list. As discussed above, the present invention utilizes a double-buffering method whereby the background display refresh list is assembled while the foreground display refresh list is being executed to display data on the screen 142. The two display refresh list buffers alternate as foreground and background buffers when the screen needs to be refreshed due to a change, such as a positional or attribute change.

When the software driver issues an Assemble Display Refresh List command, the Execution Engine 210 executes a method (FIG. 14) which utilizes the information in the windows workspace areas to create or update the background display refresh list. The display refresh list is created or updated automatically by the Execution Engine 210 in the TMC 140, first by sorting the respective Y position values from top to bottom and then, for each Y position, sorting the X position values from left to right. The display refresh list is built with a number of pointers that point back into dynamic pointer addresses in the windows work space area for the respective window(s) being drawn for each span line. The dynamic pointers are then used during execution of the display refresh list to actually read the video data corresponding to the window being drawn from the system memory 110 for the respective span line into the IMC 140, where the video data is assembled for video output. As discussed further below, the data is read and assembled according to the attributes per window and the position on the screen. In one embodiment, the Assemble Display Refresh List command is issued on a per window or per object basis when less than all of the windows or objects change on the screen.

When the current foreground display refresh list has completed execution, then after another screen change occurs and a new Assemble Display Refresh List command has been issued and completed, the Display Refresh List Engine 270 executes a new display refresh list.

When a new Assemble Display Refresh List command has been issued and completed, then on the next screen refresh or VSYNC, the background display refresh list assembled as described above becomes the foreground display refresh list for execution. Likewise, the other background registers and buffers become the foreground registers and buffers for execution.

Conversely, the foreground display refresh list which has just been executed as well as other foreground buffers and registers are switched to the background, and if new screen changes occur, the "new" background display refresh list is the subject of an "Assemble Display Refresh List" command and is assembled as described above, based on the recent screen changes. Thus, on screen refresh or VSYNC after an Assemble Display Refresh List command has completed, the background display refresh list that has been assembled becomes the "new" foreground display refresh list and is executed.

Figure 15:
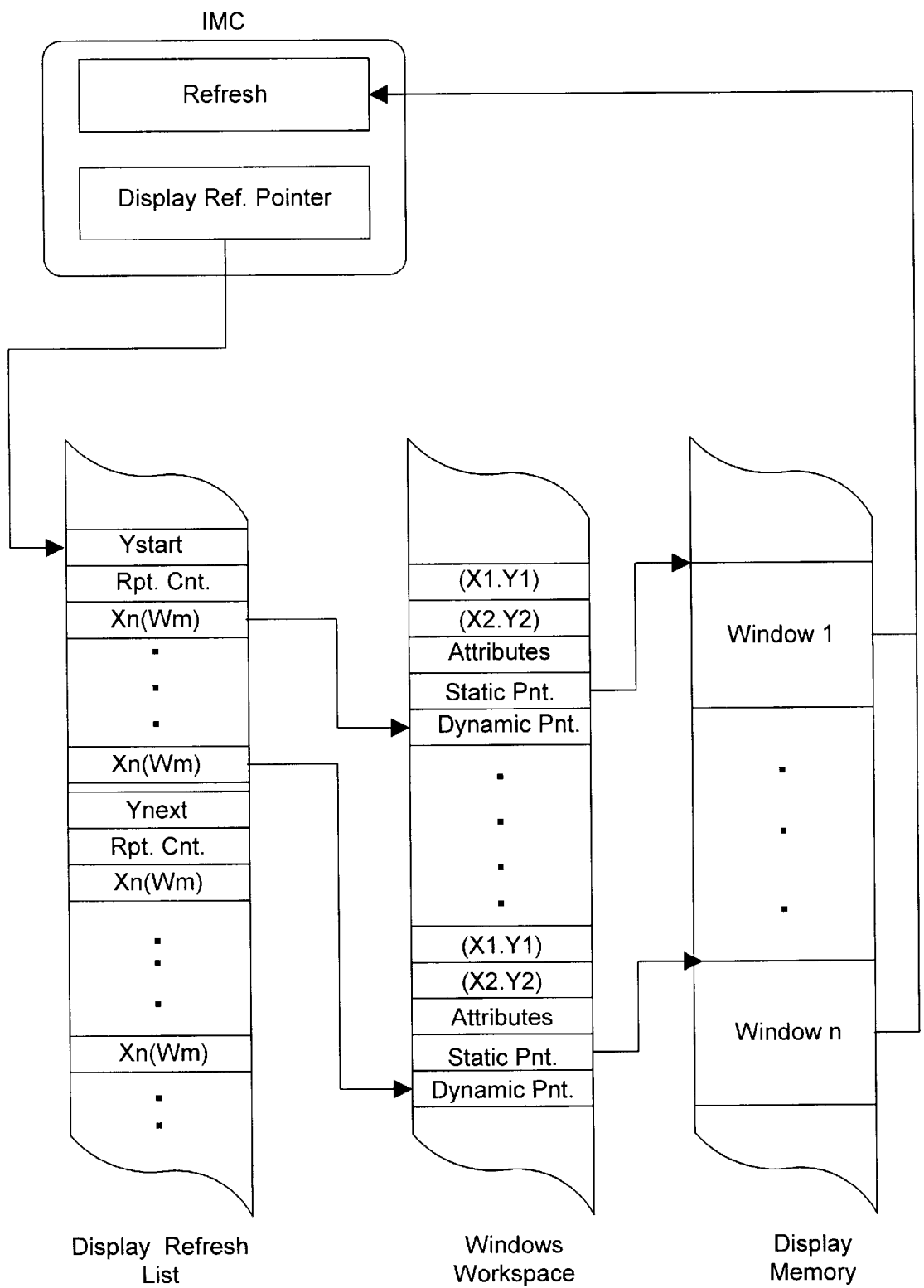
FIG. 15 illustrates how the display refresh list is used to reference video data for display on the display screen during screen refresh.

For each scan line or span line the Display Refresh List Engine 270 of the IMC 140 reads the foreground display refresh list to determine how many windows are present on that line. As shown in FIG. 15, the Xn(Wm) value in the display refresh list is used to read the Windows Workspace dynamic pointer which then points to the windows display memory where the pixel data is located. The pixel data is then read for display on the video monitor 142. The display refresh list also includes information for dynamically adjusting the video data path according to various attributes, including the number of bits per pixel required for the object begin drawn, as well as others. At the end of each window span the IMC 140 updates the dynamic pointer value to point to the next line for the respective window. This allows the IMC 140 to read the correct display memory for the next line during the refresh. Therefore, when the IMC 140 refreshes the screen, the IMC 140 reads the video data from memory, wherein the data is preferably stored in either a linear memory format or XY format, and displays the respective XY windows of varying order, wherein the order is determined by the relative placement or depth of the windows relative to each other.

Memory Buffer Organization

Figure 9:
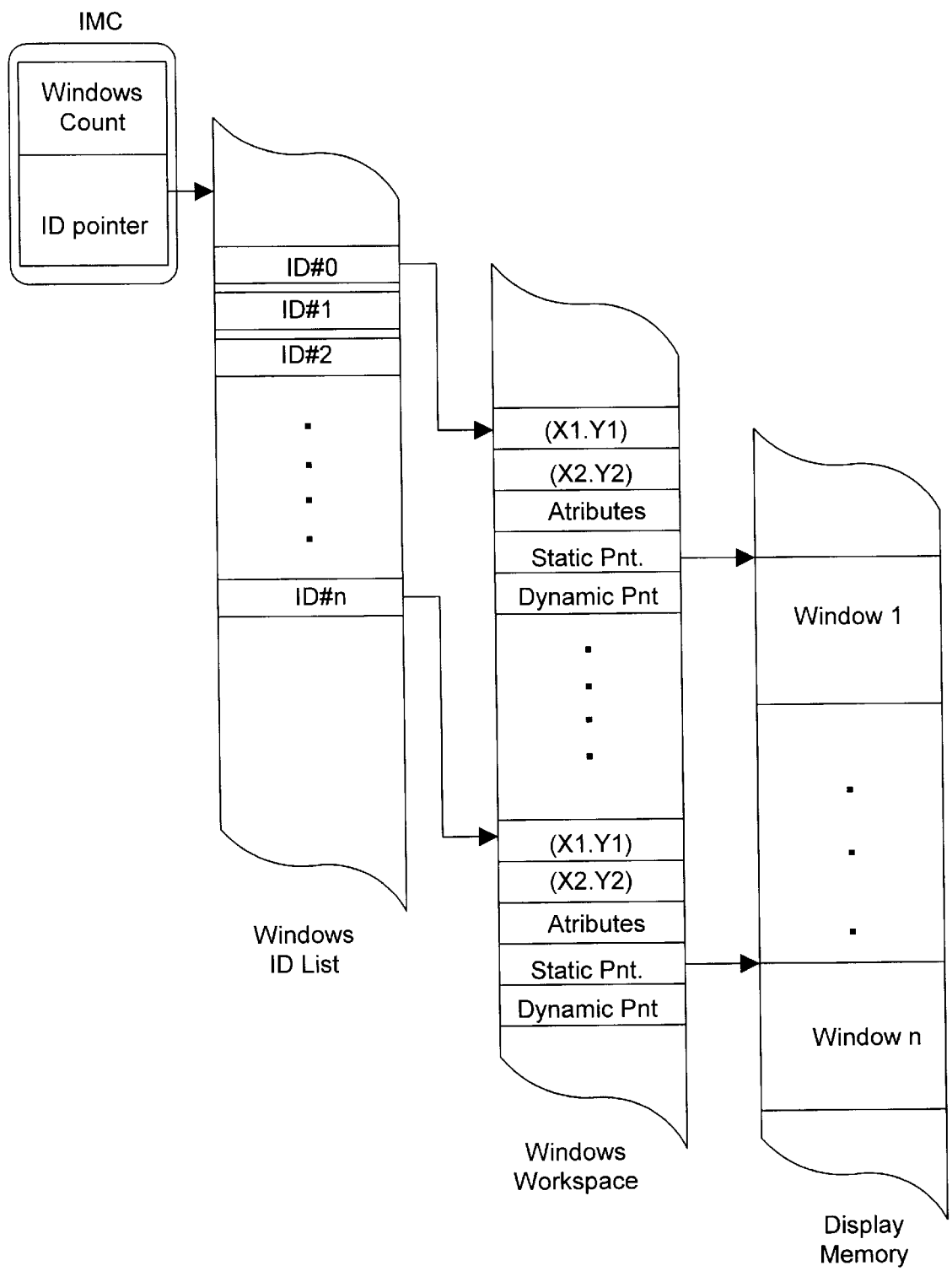
FIG. 9 illustrates the relationship of pointer values in the memory buffers or queues in system memory used by the IMC to access and manipulate graphical data stored in the system memory according to the present invention.

Referring now to FIG. 9, the organization of one set of memory buffers is shown. As mentioned above, the IMC 140 includes a Windows Count register and a Window ID List Pointer register. The Windows Count register stores the number of windows or objects on the screen. The Windows ID List Pointer register includes a value which points to the top of the respective Windows ID list. The Windows ID list comprises a list of pointers wherein the list includes a pointer entry for each window or object appearing on the screen. Similarly, the Window Workspace buffer includes a window workspace area for each window or object appearing on the screen. The pointers in the Window ID list, which each correspond to a respective window, each point to a corresponding window workspace area for that window in the Window Workspace buffer also located in the system memory 110.

The Windows ID list is preferably order dependent, i.e., all pointers comprised in the Windows ID list have a relative window priority or depth corresponding to the position of the respective pointer in the Windows ID list. The first pointer in the list corresponds to the background window or the window at the greatest relative Z-depth, and the last pointer corresponds to the foreground window or the window at the least relative Z-depth. The pointers in between the first and last pointer also have a relative window depth priority with respect to their position. It is noted that all windows or objects have a depth priority, and thus a different ID number or pointer in the Windows ID List, even if multiple whole windows appear on the screen at the same time. During the assembly of the display refresh list, the pointer position within the Windows ID list allows the IMC 140 to determine which windows are on top and which are obscured by other windows.

It is noted that, in an alternate embodiment, the Windows ID list includes two values or entries for each window, one being the address pointer to the respective window workspace area and the other a depth value for a relative position of the window from background to foreground. In this embodiment, the entries in the Windows ID list are no longer required to be organized in position relative to their respective depth, but rather the depth value stores the relative position of the window. This results in less work for the software video driver when windows are popped or pushed relative to each other, i.e., when the window display or depth priority is changed.

In one embodiment, the IMC 140 includes a software programmable control bit that determines the mode of the IMC 140. According to the control bit, the IMC 140 uses either the attribute #2 bits [15:0] in the windows workspace for window depth information or uses a depth sorted Windows ID list.

Each window workspace area contains important information pertaining to the window position on the display, the number of bits per pixel, a color composition matrix, the number of depth and alpha blending bits, and static and dynamic linear address pointers for each function. Thus, each window on the screen has a separate and independent number of colors, depth and alpha planes. In addition, each window includes a separate dither decode matrix for optimal color density dispersion using a minimum number of memory bits.

In one embodiment, the windows workspace area also includes slope information for each boundary of non-rectangular objects as well as interpolation flags used to enable slope information. This enables the Refresh Logic 404 in the IMC 140 to draw objects such as polygons, for example, triangles, using the display refresh list. It is noted that use of the display refresh list to draw non-rectangular objects is not included in the preferred embodiment.

All refresh address values which point to the actual video data are contained within the static and dynamic address pointers within the windows workspace memory. The static linear address pointer contains the memory address for the "top" of the respective window for each of the color, depth and alpha values. The dynamic linear address pointer is updated on a scan line basis to hold the current pointer information for each window being displayed, i.e., to point to the pixel data for the respective window being displayed for the respective span line. The dynamic address pointer, once read by the Refresh Logic 404, is updated for the next line of data to be displayed. Thus, the video refresh fetch for the next span line is pointed to by the updated dynamic refresh pointer.

The static linear address pointer is used to initialize the dynamic linear address pointer during the vertical retrace period for each window or at the Y2 coordinate of each window. In other words, at the end of each frame or window bottom, the IMC 140 reloads the dynamic address pointers with the static pointer values so that, after the vertical sync pulse, the static pointer is equal to the dynamic pointer and thus the dynamic pointer again points to the top of the window or object. Therefore, the dynamic pointer is exactly equal to the static pointer at the time that the frame is on line zero.

Video driver software executing on the CPU 102 keeps track of the window priority, the window placement and the window attributes for each window on the display. It is noted that each window may be generated by a separate application program which requires a different color space and depth. The video driver directs the IMC 140 to update pointer values based on screen changes that occur.

As noted above, the IMC 140 actually maintains both foreground and background memory queues, including foreground and background Windows ID Lists and foreground and background display refresh lists. In the preferred embodiment, additional workspace areas are constructed as needed. Since the addressing of the windows workspace areas are relative, based on pointer entries in the Windows ID list, the software driver preferably adjusts new entries in the background Windows ID list to point to newly created windows workspace areas.

Video Driver Operation—Screen Changes

1. Window Position Change

Figure 10:
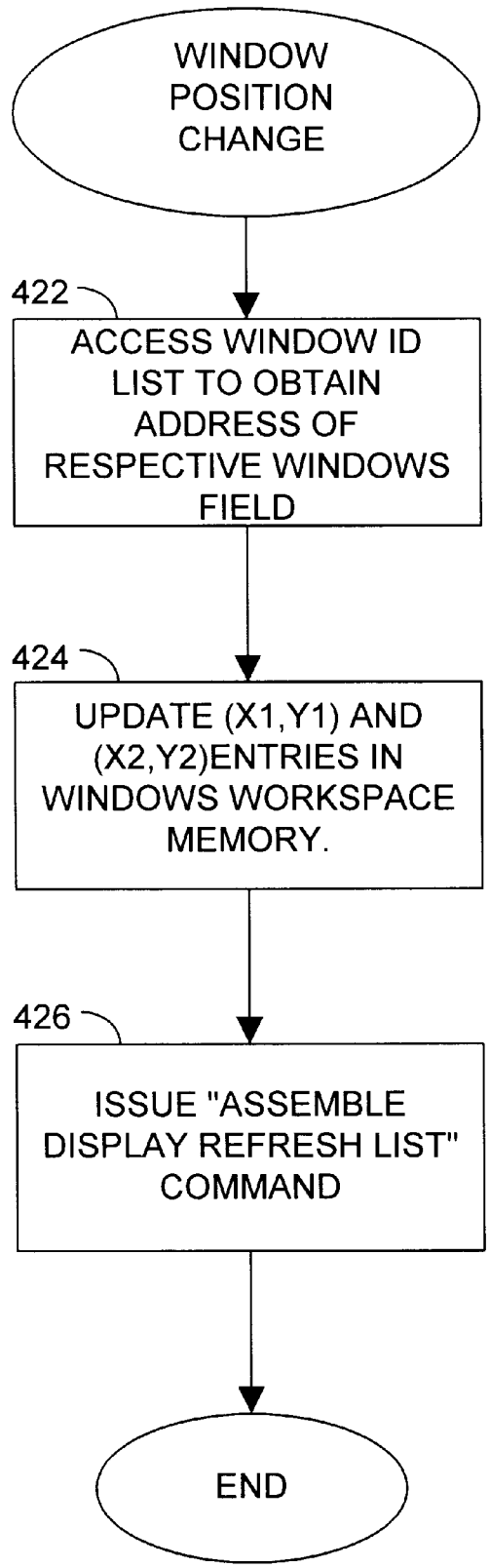
FIG. 10 is a flowchart diagram illustrating operations performed by video driver software when a window position change occurs.

FIG. 10 is a flowchart diagram illustrating operations performed by video driver software when a window position change occurs. Here, assume that the IMC 140 is currently drawing a frame using the foreground display refresh list and other foreground buffers and registers and that, in response to software executing on the CPU 102, the driver informs the IMC 140 to move one of the windows on the screen shown in FIG. 16 to a new position. First, in step 422 the driver accesses the background Windows ID list to obtain the address of the respective windows workspace field of the window to be moved. In step 424 the driver updates the windows workspace area or creates a new windows workspace area for the respective window with the new XY coordinates, i.e., the new X1, Y1 and X2, Y2 coordinates, to indicate the new position. It is noted that, if a new windows workspace is created, then the Window ID list must be updated with a new address which points to the new windows workspace.

In step 426, the driver then directs the IMC 140 to update the display refresh list by writing an "Assemble Display Refresh List" command into a command register. When the "Assemble" command is received, the background display refresh list is rebuilt or updated using the updated entries in the Windows Workspace memory. Once the background display refresh list has been assembled, on the next vertical retrace, the background display refresh list becomes the foreground display refresh list, and the IMC 140 reads the new foreground display refresh list which now references the updated window position. Thus, the new foreground display refresh list is used during the next screen refresh to draw the screen with the window moved to the new position. It is noted that, since the window has only been moved in position, and if the same windows workspace is used, the Windows ID list is not changed or adjusted.

An alternate method for processing a window position change comprises the driver copying the windows workspace area for the window to the bottom of the Windows Workspace buffer and then changing the XY coordinates in the new windows workspace area appropriately. The driver also changes the Windows ID list pointer for this window to point to the new windows workspace area, and the "old" windows workspace area is marked invalid.

2. Window Display Priority Charge

Figure 11:
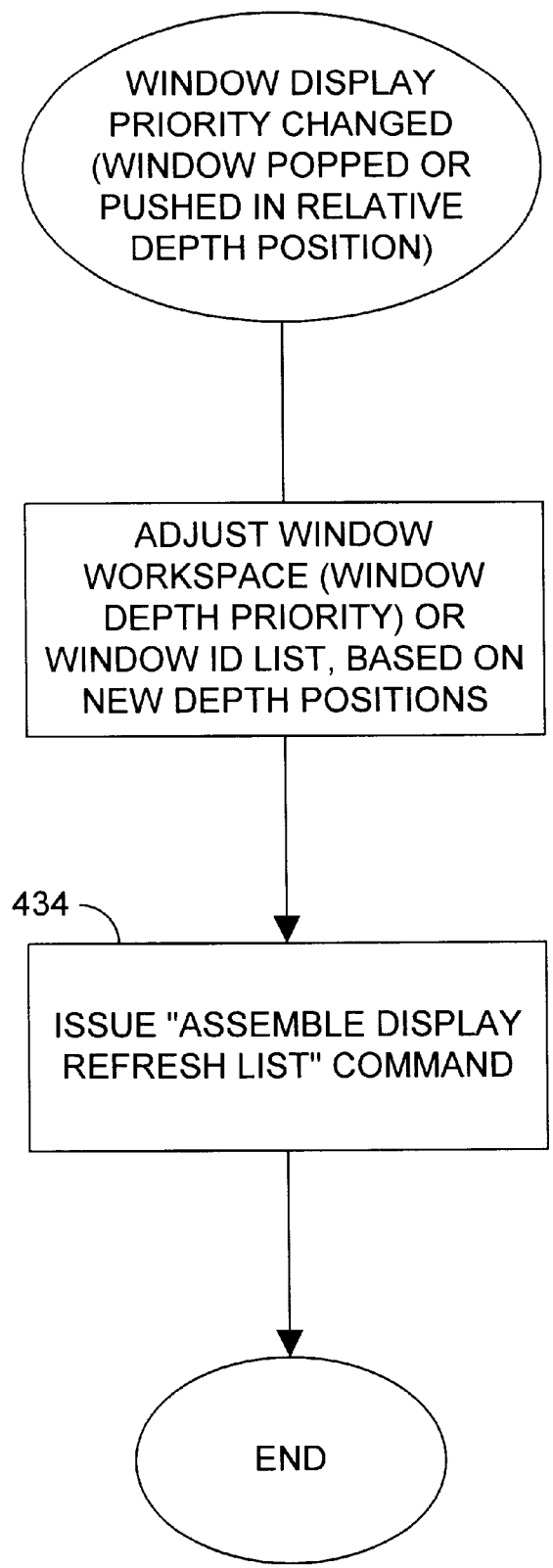
FIG. 11 is a flowchart diagram illustrating operations performed by video driver software when a change in window display priority occurs.

FIG. 11 is a flowchart diagram illustrating operations performed by video driver software when a change in window display priority occurs. Here, assume that the IMC 140 is currently drawing a frame and, in response to software executing on the CPU 102, the driver informs the IMC 140 to pop or push one of the windows on the screen shown in FIG. 32, i.e., to change the relative depth priority of a window relative to other windows. First, in step 432 the driver adjusts the window depth priority in the background windows workspace area based on the new depth priorities. Alternatively, the driver adjusts the background Windows ID list based on the new depth priorities. This involves reordering the contents of the background Windows ID list so that the window that has been popped or pushed is placed in a new, correct position in the background Windows ID list relative to its changed depth priority. In an embodiment where the Windows ID list includes two values, a window workspace pointer value and a depth priority value, the driver simply updates the depth priority values of the respective windows workspace to reflect the new priority.

In step 434, the driver then directs the IMC 140 to update the background display refresh list by writing an "Assemble Display Refresh List" command into a command register. On the next vertical retrace period, the background display refresh list becomes the new foreground display refresh list, and the IMC 140 executes the new foreground display refresh list starting at that new display refresh pointer. When the new foreground display refresh list is used to refresh the screen, the respective window is popped or pushed. For example, if the user clicked on a window to pop the window to the foreground, on the subsequent screen refresh after display list assembly has completed, the respective window is popped to the top of the screen.

It is noted that if a user changes the position of a window wherein this change in position also results in a change in depth priority among the various windows on the screen, the flowcharts in FIGS. 10 and 11 are combined and both performed. Accordingly, the Windows ID list would be reorganized to reflect the new depth priority in the XY coordinates and the respective window workspace area for the window that was moved would be changed or updated according to the new position of the window.

Therefore, the Execution Engine 210 dynamically adjusts the display refresh list for movement of objects and changes in relative depth priority which appear on the display. Thus, when an object or window is moved to a new position in the screen, or is popped or pushed relative to another window, the data comprising the object is not transferred to another location in memory, but rather only pointer values are changed in the respective display refresh list. This provides the effect of moving data from a source to a destination, i.e., a bit block transfer or bit blit, without ever moving the object in memory. This provides a tremendous performance increase over conventional bit blit operations commonly used in graphical subsystems.

3. Window Scrolling

The present invention also provides a simplified method for scrolling text or data in windows. Instead of copying new data to the frame buffer as in the prior art, when data in a window is scrolled upward or downward, the driver simply changes the static pointers in the respective windows workspace area to point to the data that should be presented in the window.

4. Secondary Window Overlay

The IMC 140 or graphics controller of the present invention also preferably includes a secondary window overlay feature which has the ability to read data for one window and then parallel to that during the refresh, read data from another space in screen memory. When the window overlay feature is desired, the video display list that is built includes a flag for the respective window or object that indicates a dual secondary overlay. The secondary overlay flag indicates that that the next display window in the refresh list is a secondary address of another work space. Thus the DRL Engine 270 uses two windows work space areas that define two windows or objects. The video data for the two windows or objects are read in basically at the same time during the refresh. The IMC 140 performs a color compare on one or the other of the windows, and the color that it sees becomes transparent to the other window.

Display Refresh List Assembly

1. Memory Buffer Operation Sequence

Figure 12:
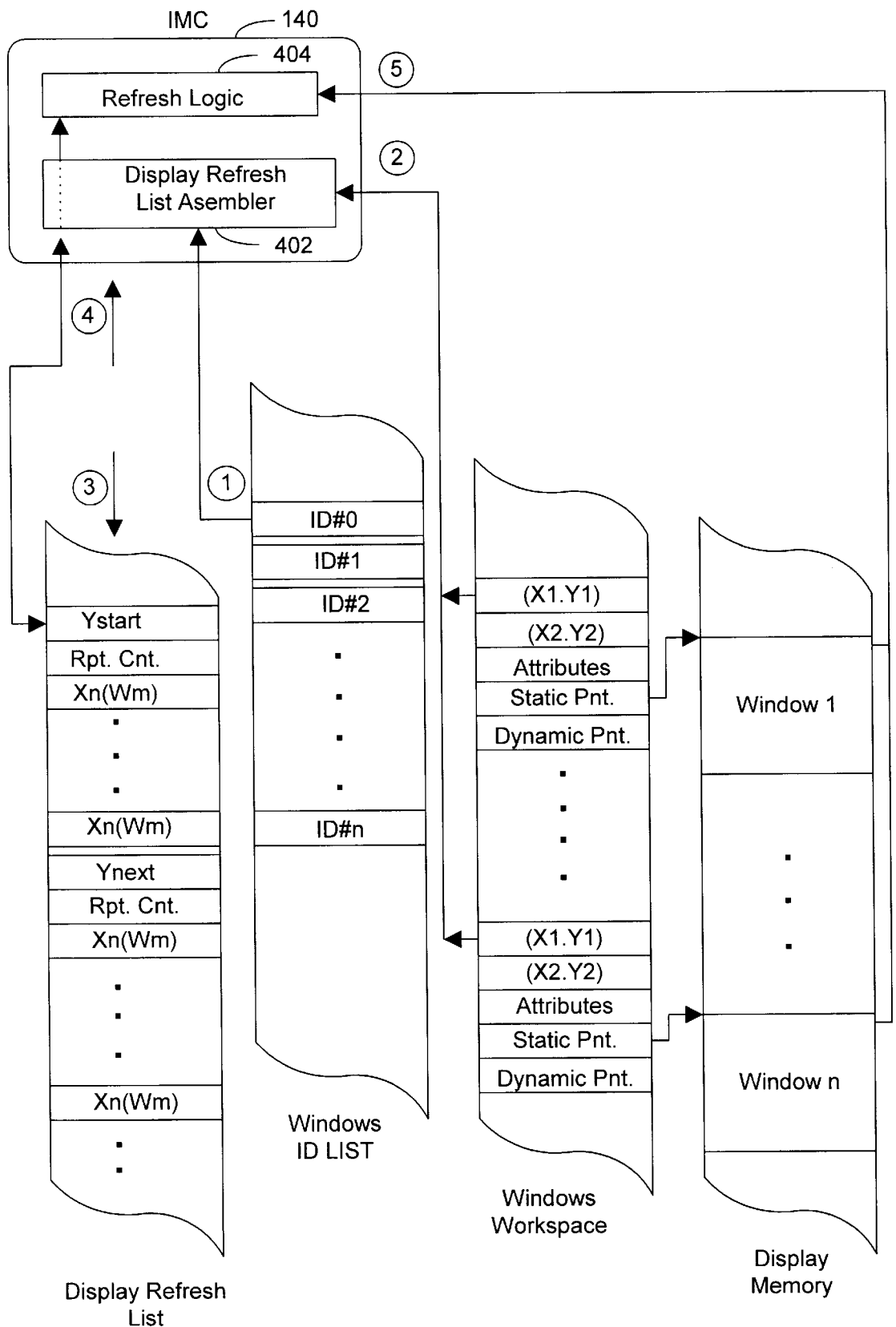
FIG. 12 illustrates the sequence of operations performed by the DRL Engine on the respective memory queues to display video data during screen refresh.
Figure 13:
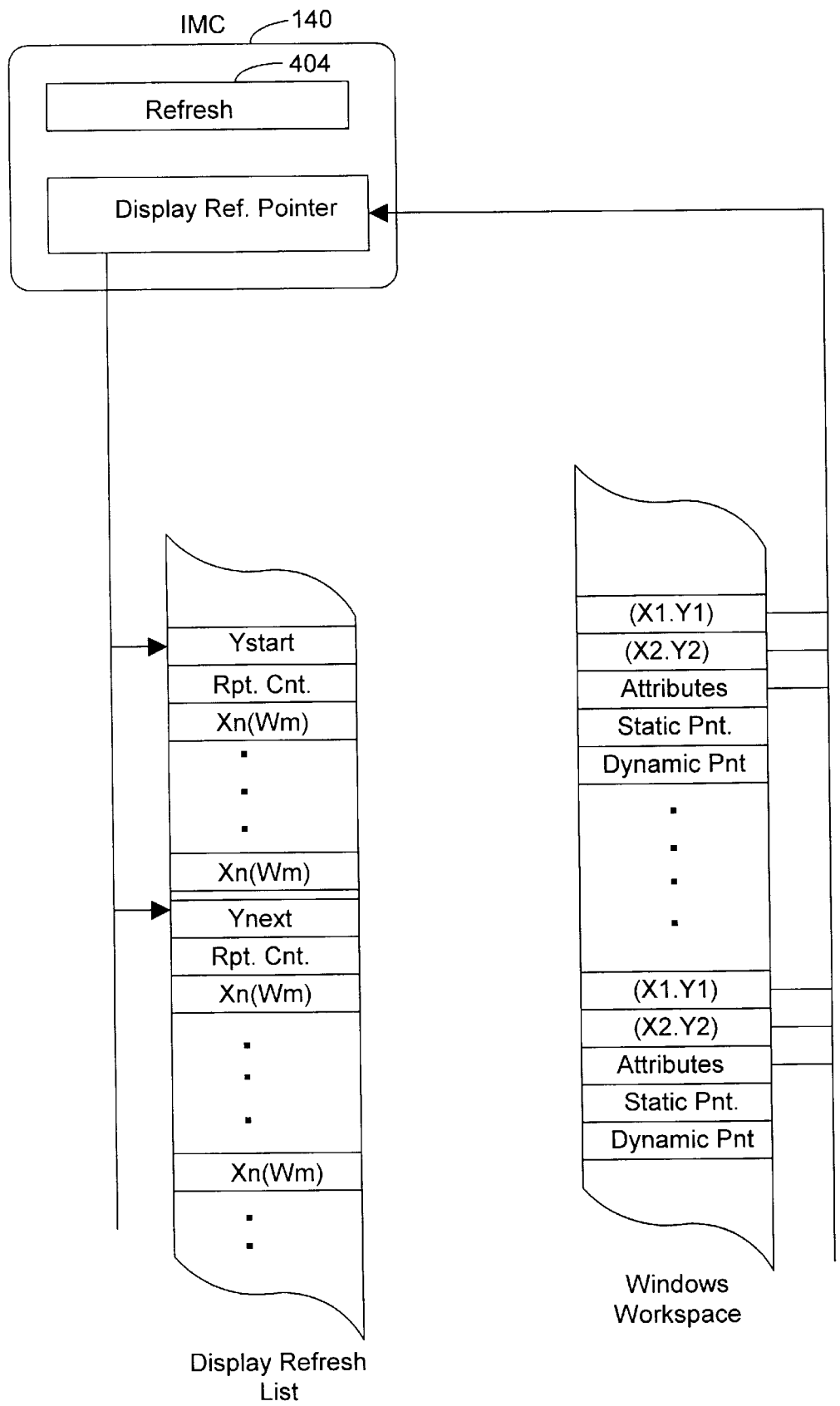
FIG. 13 illustrates how the Windows Workspace queue is used to build the display refresh list for display of video data.

FIG. 12 illustrates the memory organization of system memory 110 as seen by the Execution Engine 210, including arrows and numbers indicating the sequence of operations performed by the Execution Engine 210 on the respective memory buffers or queues to assemble a display refresh list and display video data during a screen refresh. As shown at 1, the first step involves the Execution Engine 210 accessing the Windows ID list to determine the address of the respective windows workspace areas in the Windows Workspace buffer. FIG. 9 illustrates how the pointers in the Windows ID list point to the respective windows workspace areas. At time 2, the Execution Engine 210 uses the data in each respective windows workspace area in constructing the display refresh list at time 3. FIG. 13 illustrates the IMC 140 accessing data in the windows workspace areas to construct the display refresh list. The manner in which the display refresh list is constructed from information in the windows workspace areas is described in the flowchart of FIG. 14.

Once the display refresh list has been constructed at time 3, the Display Refresh List Engine 270 reads the pointer values in the display refresh list at time 4 to transfer the correct pixel or video data at time 5 in the display memory into the IMC 140 for display on the display screen. FIG. 15 illustrates how pointer values in the display refresh list are used to access dynamic pointers in the windows workspace areas which in turn point to the respective areas in the system memory 110 where the pixel data for each window is located.

Steps 1, 2, and 3 in FIG. 12 involve assembling or updating a display refresh list, i.e., the background display refresh list. Steps 4 and 5 involve executing the assembled display refresh list, which begins on the VSYNC or screen refresh when the assembled background display refresh list becomes the foreground display refresh list for execution.

2. Display Refresh List Assembly Flowchart

Figure 14:
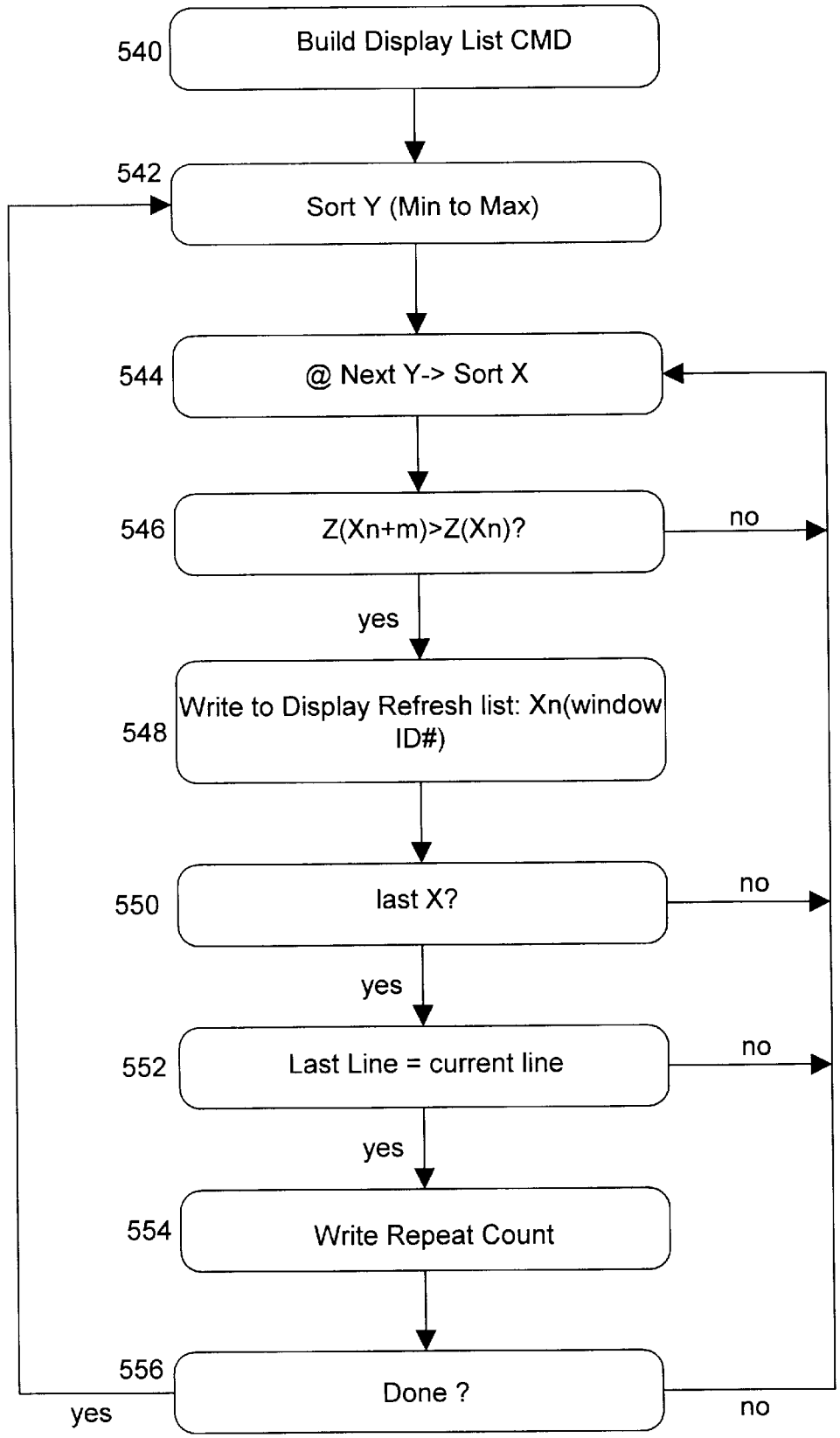
FIG. 14 is a flowchart diagram illustrating operations performed by the Execution Engine in building a display refresh list.

FIG. 14 is a flowchart diagram illustrating operations performed by the Execution Engine 210 in the graphics controller or IMC 140 in assembling a display refresh list in main memory 110. When an Assemble Display Refresh List command is received in step 540, the method is performed. In the preferred embodiment, the Assemble Display Refresh List command is only executed once for each screen change. In an alternate embodiment, the Assemble Display Refresh List command may be executed a plurality of times before the start of the subsequent screen refresh for respective windows or objects that are updated or changed. Alternatively, multiple changes may occur to the ID list and windows workspace areas (background lists) before issuing an Assemble Display Refresh command.

The background display refresh list is required to be completely assembled or completed before a switch to foreground on VSYNC start occurs. If the background display refresh list is not completed by the start of VSYNC, the IMC 140 waits until the next VSYNC to execute the display refresh list. It is noted that an Assemble Display Refresh List command is issued and a new display refresh list is assembled only after a screen change occurs, which generally will not occur on every frame.

The IMC 140 first reads the Windows Workspace X,Y pointers in each of the windows workspace areas and in step 542 sorts through the Y values to determine the starting and ending Y values in the Windows Workspace pointers, i.e., to determine the minimum Y and maximum Y positions of the respective windows. In one embodiment of the invention, the Assemble Display Refresh List command can be issued on a per object or per window basis where the command specifies and minimum and maximum Y bounds corresponding to the object that has changed on the screen. In this event, the method only sorts the Y values between the minimum and maximum Y bounds.

After the Y values have been sorted, the IMC 140 then uses the minimum Y value, referred to as @nextY, and in step 544 begins sorting through the X values for the respective span line. The Windows Assembler 240 begins with the first or top span line. The X values are read from the Windows Workspace buffer and sorted to determine the minimum X, i.e., to determine the position of the leftmost window on that respective span line.

In addition to the sort performed in step 544, the Z or depth information of the windows, i.e., the position relative to the other windows, is also read from the windows workspace memory area for the window whose X value is determined to be the minimum X. In step 546, if the Z depth value for the next X is less than the Z depth value for the last X, then the sort of X values continues in step 544. In this instance, the next window encountered on this span line is "underneath" or "behind" the window already being drawn, and thus there is no need to obtain video data for this window on this span line. If the Z depth value for the next X is greater than the Z depth for the last X, then there is a window context switch, i.e., the new window encountered is over or in front of the window that was being drawn on the respective span line.

In step 548, an entry comprising various information for the new window is then written to the display refresh list. Each entry in the display refresh list is preferably a 32-bit or 64-bit value. The information written to the display refresh list in step 548 includes the Xcount of the window (the pitch count or width of the window on the span line), a binary field referencing a repeat line, secondary window, or end of window, and a pointer to the dynamic pointer which references the video data of the window. During execution of the display refresh list, the IMC's video data serializer reconfigures according to the Attributes field of the windows workspace area for the window being drawn. It is noted that the binary field is set only if one or more attributes change for the new window and if one of the following conditions is true: (1) The next Y span has identical pointers to the current Y span pointed to by the dynamic refresh address pointer in the windows workspace; (2) The window is a secondary overlay window, which indicates that the IMC must read from multiple sources during screen refresh; and (3) The end of window is set such that the part of a displayable or nondisplayable window has reached the end for that respective Y span.

It is noted that, for the minimum X which is the leftmost X value on the respective span line, this X will by default have a lesser depth than any prior X value, and the information for this X value is written to the display refresh list in step 548. If two windows are aligned on the same X boundary for a span line, then the depth compare in step 546 determines which should be drawn.

Once data has been written to the display refresh list in step 548, in step 550 the Window Assembler 240 determines if this is the last X in the sort, i.e., if the sort performed in step 544 has reached the rightmost part of the screen for the respective span line. If the current X is not the last X in the line, i.e., if there is another window present on that particular scan line, then the method returns to step 544 and repeats steps 544–550.

As shown in FIG. 15, the pointers written to the display refresh list in step 548 actually point to the dynamic pointer values in the Windows Workspace areas. Thus for each span line starting at the top of the screen, the X values are sorted left to right to determine which window's pixel data should be drawn on the respective horizontal span line.

When the method reaches the last X on the span line in step 550, in step 552 the method determines whether the last line of data assembled in the display refresh list is equal to the current line. In other words, in step 552 the method performs a memory comparison of the last assembled line in the display refresh list with the current line. If the current line is not equal to the last assembled line in step 552, then operation returns to step 544, and the data written to the display refresh list for the current line remains. If the current line is equal to the last assembled line, then in step 554 a Repeat Count value is written into the last assembled line. The Repeat Count value overwrites the entries written to the display refresh list in step 548 for that line. The Repeat Count value indicates that the same entries should be used in the display refresh list for the respective span line as the line before. Thus the Repeat Count value minimizes the amount of data contained in the display refresh list, and therefore allows for less memory to be used for the display refresh list. For each line assembled by the IMC 140 in the display refresh list that is the same as the last assembled line, the Repeat Count is incremented. When the IMC 140 assembles a line which has different parameters or a new object, the new entries are written to the display refresh list instead of incrementing the Repeat Count. The assembly process is complete when the last Y line and last X position within that line have been processed.

If more lines are required to be processed as determined in step 556, then the method returns to step 544 to sort the X values for the next line, pointed to by @nextY. In steps 544–550 the sort of X values is performed on that line to determine respective pointer values that are written into the display refresh list as before. This method repeats until the number of lines is complete according to a counter register inside the IMC 140. When all lines have been processed, operation returns to step 542, and method is performed again to assemble a new display refresh list when a screen change occurs.

Therefore the Execution Engine 210 reads the window positions located in the windows workspace and sorts these positions according to the method of FIG. 14. First, the windows workspace areas are read for minimum Y address values. A sort continues for the minimum X values within the identified minimum Y value. All X values are sorted with respect to the depth value which is identified by the address position of the particular window within the Windows ID list. This operation continues, and the IMC 140 builds a display refresh list in system memory 110 based on the results of the sorting and comparisons.

The display refresh list Assembly method eliminates conventional prior art window clipping. Graphical data need not be separately processed to clip to X/Y regions.

Video Refresh Method—Display Refresh List Execution

FIG. 15 illustrates how the display refresh list is used to reference video data for display on the display screen during screen refresh. Here it is assumed that the display refresh list has been assembled into system memory 110 as described above in FIG. 14. As discussed above, the IMC 140 includes foreground and background display refresh pointer registers each storing a display refresh pointer which points to the top of the respective display refresh list. An assembled display refresh list includes a plurality of entries and pointers which indicate how video data is to be presented on the screen during screen refresh. Each entry includes available access to the X start address of the window, the pitch count or width of the window on the span line and other special attributes. Each entry may also possibly include a binary field which references a microcode instruction for dynamic configuration of the Refresh logic 404 depending on the object being drawn.

Each entry in the display refresh list also includes pointers to the respective windows workspace area dynamic pointers corresponding to the window pixel data being drawn for each respective span line. As discussed above, the dynamic pointers then select the actual display data in system memory 110, i.e., the actual video data in system memory that will be seen on the monitor. As discussed above, the dynamic pointer for each window in each workspace area is updated for each new span line to point to the new pixel data for the respective span line. The data from the display is then read into the IMC graphics engine 212 and display refresh logic at the proper time in order to be output to the monitor 142.

Display refresh is preferably performed in advance of the actual display output to compensate for the delay caused by the mode and refresh context switching delays. The display refresh list enables the software window managers or drivers to have independent control of each application's color, positional depth, and blending functions as well as individual control of indexed color as defined in the windows workspace buffer.

At the first vertical retrace period, the IMC 140 copies the static address pointers into the dynamic address pointers. The IMC 140 then reads the first value of the display refresh list. As mentioned above, this value includes a dynamic pointer start address, a pitch count value, and possibly a binary field referencing a microcode instruction or opcode for the various attributes of the object or window. The microcode instruction is preferably configured during an Assemble Display Refresh command and is executed here to configure the IMC 140 for the correct number of repeated lines and secondary overlay functions as well as the last assembled window span line segment before the end of window or object is reached. The display refresh list value also contains the address pointer to the dynamic address pointers within the windows workspace area. The address is then read from the dynamic address pointer which allows the IMC 140 to begin fetching the actual video data for the respective object on that particular line. The display refresh list contains the pitch value (i.e., width of X2–X1) such that the IMC 140 can determine the address to be loaded to adjust the next dynamic pointer within the windows workspace area for the next window or object on the respective span line.

As mentioned above, during refresh context switch (i.e., a new window boundary on a span line during screen refresh), the IMC 140 dynamically re-configures the display output data path to compensate for the type of data which is transferred through the video pipeline. This reconfiguration of the video display path allows the dynamic reconfiguration of the color depth on a per window or object basis. The Graphics Engine 212 and the Display Refresh List Engine 270 use the information from the windows workspace areas to dynamically adjust the number of bits per pixel depending on what is being drawn for that window. The internal Graphics Engine 212 and the Display Refresh List Engine 270 also uses other information, such as alpha-blending information and slope information, from the windows workspace area during screen refresh. In one embodiment of the invention, one or more of the windows workspace areas include pointers to a color composition matrix or color table for dynamic reloading of indexed color.

The Graphics Engine 212 uses storage registers to hold the state of the previous engine configuration or set-up during video refresh of the display data. Once the display FIFO is full, or the end of window is encountered, the saved state is loaded back into the graphics engine 212 for completion of the stalled display list instruction. Therefore, the invention uses the same reconfigurable graphics engine address and data path to read the video refresh data into the display FIFO 244 for output onto the video monitor 142.

When a new window is to be displayed on the screen, the Display Refresh List Engine 270 uses the display refresh list to determine where in the linear or xy memory space the data resides as well as how many bits per pixel the window requires, how to map the color space, whether the window is a secondary overlay window, and the necessary xy rectangle extents and window priority. This information is used during the screen refresh to display the window on the screen very quickly and efficiently. Thus, the video display can be updated with new video data without requiring any system bus data transfers, which were required in prior art computer system architectures.

Figure 16:
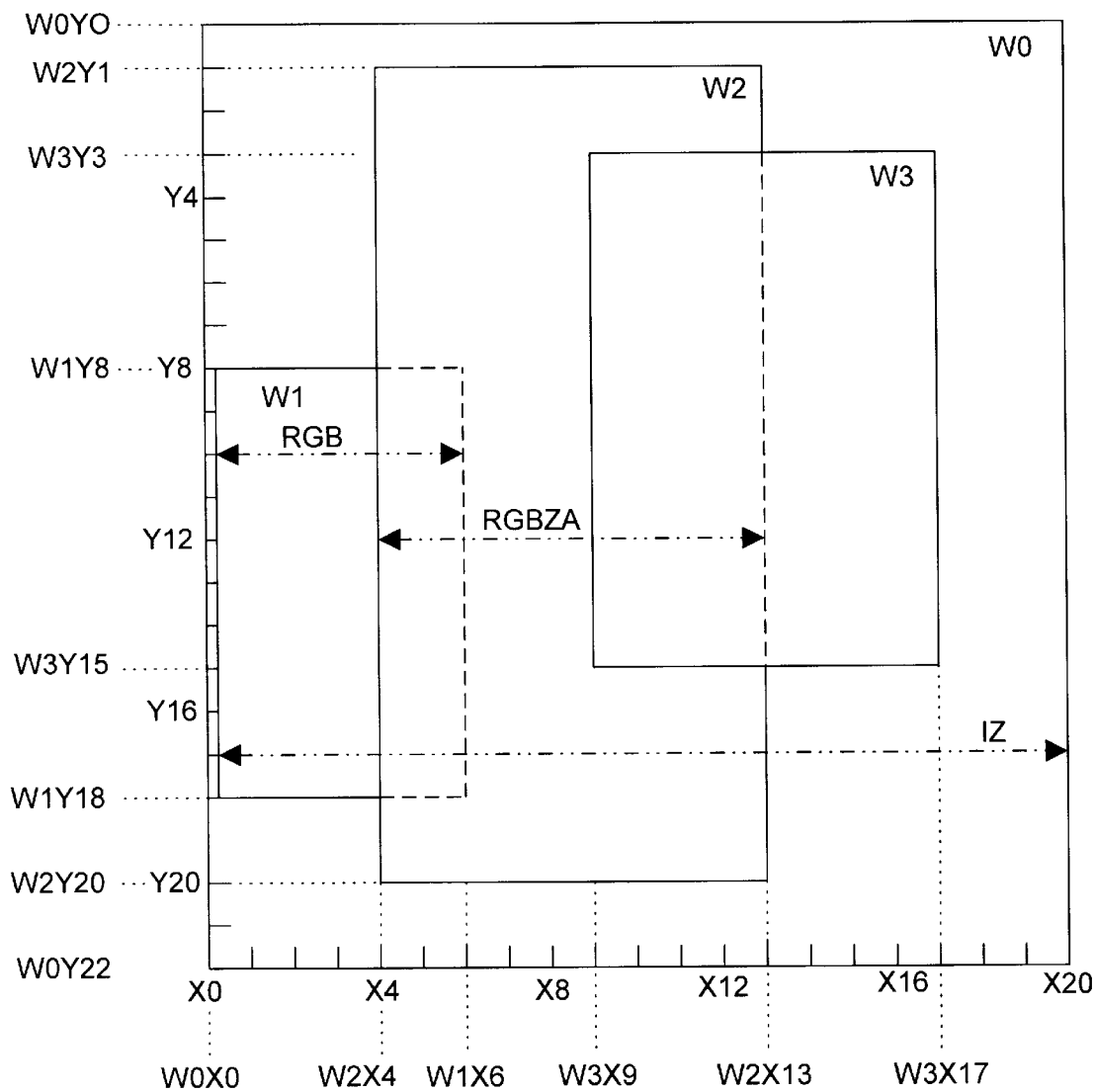
FIG. 16 illustrates a display screen including multiple windows and their relative positions and color depths.

FIG. 16 illustrates the display screen 142 including multiple windows and their relative positions. In this example, W0 or window 0, is the matt or the background window, and W1, W2 and W3 are windows which overlap each other within the base window W0. The corners of the windows are indicated by the positions. W0Y0, for example, is the first line of W0 and W2Y20 at the bottom is the last line of window W2, which is at Y position 20. The same positions are true with the X coordinates. This information is programmed by the driver software into the Windows Workspace area of the system memory 110.

Figure 17:
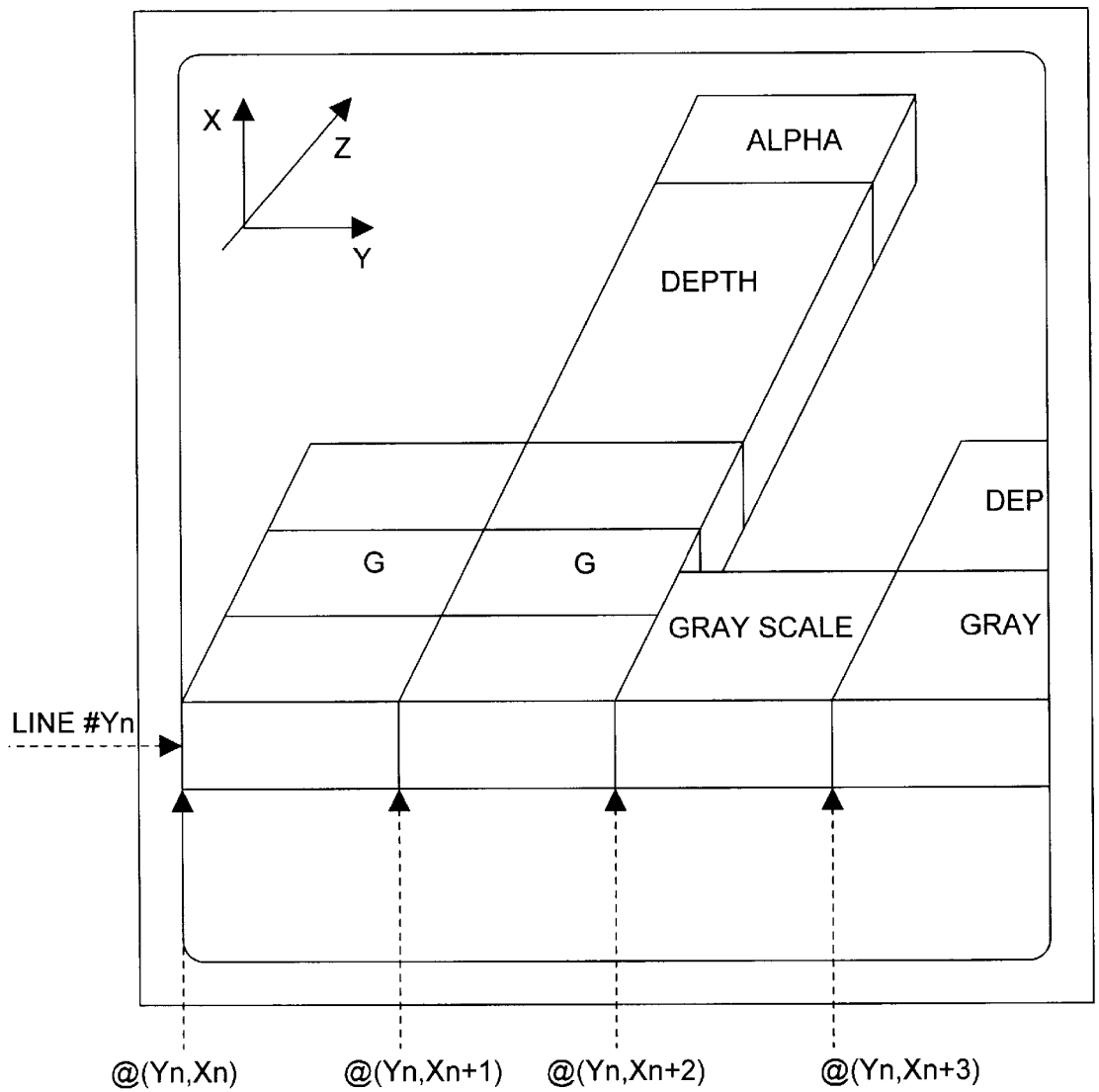
FIG. 17 illustrates a single raster scan line of the display screen of FIG. 32 in a system including the IMC and using the display list refresh method of the present invention.

FIG. 17 illustrates a single raster scan line roughly corresponding to the display screen 142 of FIG. 16 and the result when the display refresh list method is used. The display refresh list method of the present invention allows the software window managers or drivers to have independent control of each application's color, position depth, and blending functions as well as individual control of indexed color. FIG. 17 presumes that there are four different process windows pointed to by Xn through Xn+3. Each of the four window workspaces contains the starting X/Y position of the window, the color depth, the Z depth, and the alpha value pointers. As shown, the first window is a single RGB direct color. The second window shows direct RGB color along with a depth buffer and an alpha buffer. The third window shows only a simple gray scale window while the fourth buffer shows gray scale with a depth buffer.

1. Display Refresh List Execution Example

The operation of the Display Refresh List Engine 270 in executing a display refresh list is described below. Here it is assumed that a display refresh list has been assembled to present video data on the screen as shown in FIG. 16. The Display Refresh List Engine 270 preferably reads in the entries in the display refresh list for an entire span line of the current window. The Display Refresh List Engine 270 reads all of the entries for a window or object span line and examines the entries to determine where windows or objects begin and end relative to other windows or objects on that span line.

Execution of the first entry in the display refresh list configures the Display Refresh List Engine 270 according to the attributes of window W0. Thus if window W0 has a color depth of 8 bits per pixel, the data path of the Graphics Engine 212 is configured to draw 8 bits per pixel. The X start address indicates that the video data should begin at X0, and the pitch count in the first entry indicates that window W0 occupies an entire span line. The pointer value in the first entry references the dynamic pointer in the window workspace area of window W0, which in turn references the video data for the top span line of window W0. The current graphics draw instruction is suspended and the data path control state is stored in Temporary Storage Register 665 (FIG. 20) of the Graphics Engine 212. The video data is obtained from system memory 110 and passes through source FIFO 605, Barrel Shifter 625, and the remaining logic of the Graphics Engine 212, as well as the Display Storage Buffer or FIFO 244 and Display Memory Shifter 246 to the DACs 250, 252, and 254. The video data is converted to analog video signals for output on the display monitor 142. Upon completion of the top span line or a full indication from the display storage FIFO 244, the Graphics Engine 212 is reconfigured to continue operations (if any), and the dynamic pointer in the window workspace area of window W0 is incremented to point to the video data for the next span line.

Having completed assembly of the top span line into the internal display memory shifter 246 and as output to the external display monitor begins, the Display Refresh List Engine 270 reads the entries in the display refresh list for the next span line. As noted above, the Display Refresh List Engine 270 examines these entries to determine where windows or objects begin and end on the respective span line. The next entry in the display refresh list corresponds to drawing window W0 on the second span line. This second entry does not reference a microcode instruction for reconfiguration of the Display Storage FIFO 244 since the same window is being drawn as before. The X start address indicates that the video data should start at x0, and the pitch count value indicates that the video data for window W0 occupies the entire span line. The pointer value in this entry references the dynamic pointer in the window workspace area of window W0, which in turn references the video data for the second span line of window W0. The video data is obtained from system memory 110 and converted to analog video signals for display as described above.

When the video data corresponding to window W0 at pixel locations x0y1 to x3y1 has been retrieved for display, the next entry in the display refresh list is read for execution. This entry signifies a window context change, i.e., a new window, window W2, appears on the span line. If this entry in the display refresh list, which corresponds to window W2, references a microcode instruction for an attribute change, then the Graphics Engine 212 and Display Refresh FIFO 244 are reconfigured according to the attributes of window W2. Thus if window W2 has a color depth of 4 bits per pixel, the data path of the Display Refresh List Engine 270 is configured for 4 bits per pixel. The X start address indicates that the video data should begin at x4, and the pitch count in this entry indicates that the video data for window W2 should occupy the next 9 pixels, or up to x12. The pointer value in this entry references the dynamic pointer in the window workspace area of window W2, which in turn references the video data for the top of window W2. The video data for window W2 is obtained from system memory 110 and converted to analog video signals for display as described above.

When a window context change occurs and the end of window bit for the prior window, in this case W0, indicates that the entire window has not been drawn on that span line, then the Display Refresh List Engine 270 reads another value from the Display Refresh List to indicate the start address to continue with another W0 pitch count. Alternatively, the Display Refresh List Engine 270 begins a counter referred to as a pitch counter to count the remaining pitch count of window W0. This is used to determine if any of the window remains to be drawn on the span line. This count also provides an indication of where to begin redrawing the window on that span line after other window(s) have been drawn. Also, in the preferred embodiment, the dynamic pointer is updated in the window workspace area when either the entire window has been drawn or the pitch counter indicates that the window has ended on the span line. Thus the dynamic pointer is updated in the window workspace of window W2 after the video data for window W2 has been retrieved.

After the video data corresponding to window W2 at pixel locations x4y1 to x12y1 has been retrieved for display, and the dynamic pointer for window W2 has been updated, the next entry in the display refresh list is read for execution. This entry again signifies a window context change, i.e., a change from window W2 to window W0. If the entry in the display refresh list references a microcode instruction for an attribute change, then the Display Refresh List Engine 270 is reconfigured according to the attributes of window W0. This is only required if window W0 and window W2 have different attributes and thus an attribute change was required in the change from window W0 to window W2 earlier in the span line. The X start address of this entry indicates that the video data should begin at x13. In addition, the Display Refresh list indicates where the video data for window W0 resumes on the span line. As noted above, the pitch count for the remaining window W0 indicates that the video data for window W0 occupies all of the pixels on this entire span line. The pointer value in this entry references the dynamic pointer for the remaining line in the window workspace area of window W0.

The Display Refresh list engine 270 is instructed by the previously assembled Display Refresh list to reconfigure the Graphics Engine 212 and video display FIFO to assume and continue display of window W0 beginning at x13. The video data for window W0 is obtained from system memory 110 and converted to analog video signals for display as described above. Upon completion of this span line, the dynamic pointer in the window workspace area of window W0 is incremented to point to the video data for the next span line.

For the next span line at y2, the display refresh list includes a Repeat Count value directing that the entries for the prior span line should be used for this span line. As shown in FIG. 16, the second and third span lines corresponding to y1 and y2 have identical window arrangements. The same display refresh list entries are used for the span line even if the video data differs for the various windows from one span line to the next. If the subsequent span line has the same window arrangement but requires different video data, the updated dynamic pointers for each window references the correct video data for the span line. In other words, since the entries in the display refresh list reference dynamic pointers which in turn reference the video data, the entries in the display refresh list are independent of the video data and thus can be re-executed for a subsequent span line while referencing different video data. Execution of the remaining span lines is similar to that described above.

Display Refresh List—Preferred Embodiment

Figure 18:
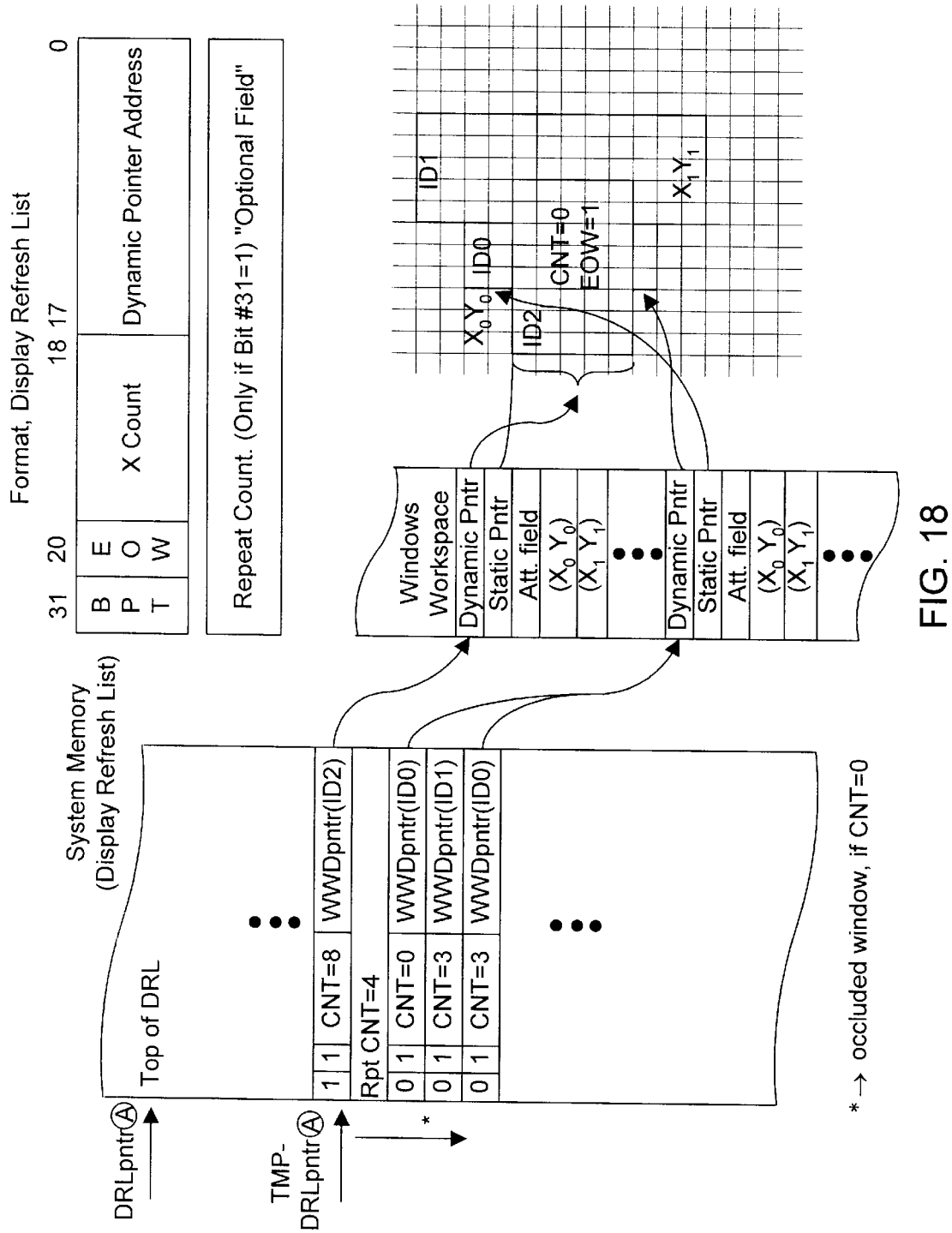
FIG. 18 illustrates organization of a display refresh list, windows workspace, and display memory according to the preferred embodiment.

Referring now to FIG. 18 a diagram illustrating use of the display refresh list and Windows Workspace buffer according to an alternate and preferred embodiment of the invention is shown. As shown in the embodiment of FIG. 18, the Windows Workspace area stores data in a different format or position for increased efficiency and to reduce the number of logic gates in the design. In this embodiment, for each window or object, the dynamic pointer and static pointer are stored first followed by the attribute field and then the x,y coordinates of the window or object. This embodiment does not change the function of the Workspace area, but rather this preferred embodiment reduces the number of transistors required.

The display memory in FIG. 18 includes windows referred to as window ID0, window ID1, and window ID2. As discussed above, in the windows workspace, the static pointer points to the top left corner of each window, which in this representation is an XY memory space. The memory may also be a linear space, as described below. The dynamic pointers reference video data corresponding to individual scan lines of an image. The dynamic pointers are pointed to by the dynamic pointer address located in the display refresh list. The dynamic pointer address changes as the window progresses in Y down the screen. This dynamic pointer is updated each time the span line of a window is completed during the display refresh in order to point to the next line.

As shown, the display refresh list is located in system memory 110 and is pointed to by the display refresh list pointer. As noted above, two pointers referred to as A and B are used to reference respective display refresh lists. One pointer is used for the current front buffer while the other is used for the current back buffer.

FIG. 18 also illustrates an enlarged view of a single display refresh list entry which illustrates the format of a single entry in the display refresh list. As shown, each entry in the display refresh list includes a dynamic pointer address, referred to as the WWD pointer, which references the dynamic pointer in a windows workspace area corresponding to the window to be displayed. Thus the display refresh list includes pointers which reference the Windows Workspace Areas in the Windows Workspace buffer. Each one of the WWD pointers points to a dynamic pointer in the windows workspace which references the video data for a window or the continuation of a window on the display, i.e., the video data for a window in the display memory.

Each entry in the display refresh list block also contains an Xcount value. The Xcount value is the number of pixels that will be drawn in that window before occlusion for the respective scan line. In addition, each entry in the display refresh list includes an end of window (EOW) indicator field which indicates that this particular Xcount will be the end of window for this particular scan line. The end of window indicator informs the Display Refresh List Engine 270 that it is time to increment the particular window by its pitch value, which effectively increments this window to the next Y span and adjusts the Dynamic Pointer Address Value.

As discussed further below, the pitch is added to the dynamic pointer to update the dynamic pointer for the next line when EOW =1 and the pixel counter has decremented to zero. This is performed when a window is occluded and still has draw space in a later y span line. The equation for the next Y is:

$$Y = Bpp \ast [(x/y \text{ pitch}) \text{ or linear adjust})]$$

The term "[(x/y pitch) or linear adjust)]" corresponds to the total window pitch. Also, the Bpp (bits per pixel) value is from the attribute field of the windows workspace. It is also noted that the total window pitch varies depending on the x/y or linear format of display memory and the number of bits per pixel (Bpp).

The repeat count entry indicates the number of times that any particular scan line is repeated among the windows at the following or next scan line. The first word of the DRL contains an attribute bit which, when set equal to 1, indicates a repeat count is present in the next word of the DRL. When RPT =1, the second word in the display refresh list entry, bits 32–63, is the repeat count. The repeat count is an optional field which always follows a word in memory that has the repeat count bit 31 set. In other words, when the repeat count bit is set, the subsequent word is always a repeat count value. In an alternate embodiment, the repeat count field and bit 31 indicator are also used to indicate a secondary overlay enable. In this case, the second word may also contain the windows workspace address for the underlaid window.

Thus, the dynamic pointer address or WWD pointer in the display refresh list for a particular window points to a different address located in the windows work space which comprises a dynamic pointer, and the dynamic pointer actually contains the address in system memory 110 of the video or pixel data of that particular window for the scan line which is being drawn.

Windows Workspace Example

Figure 19:
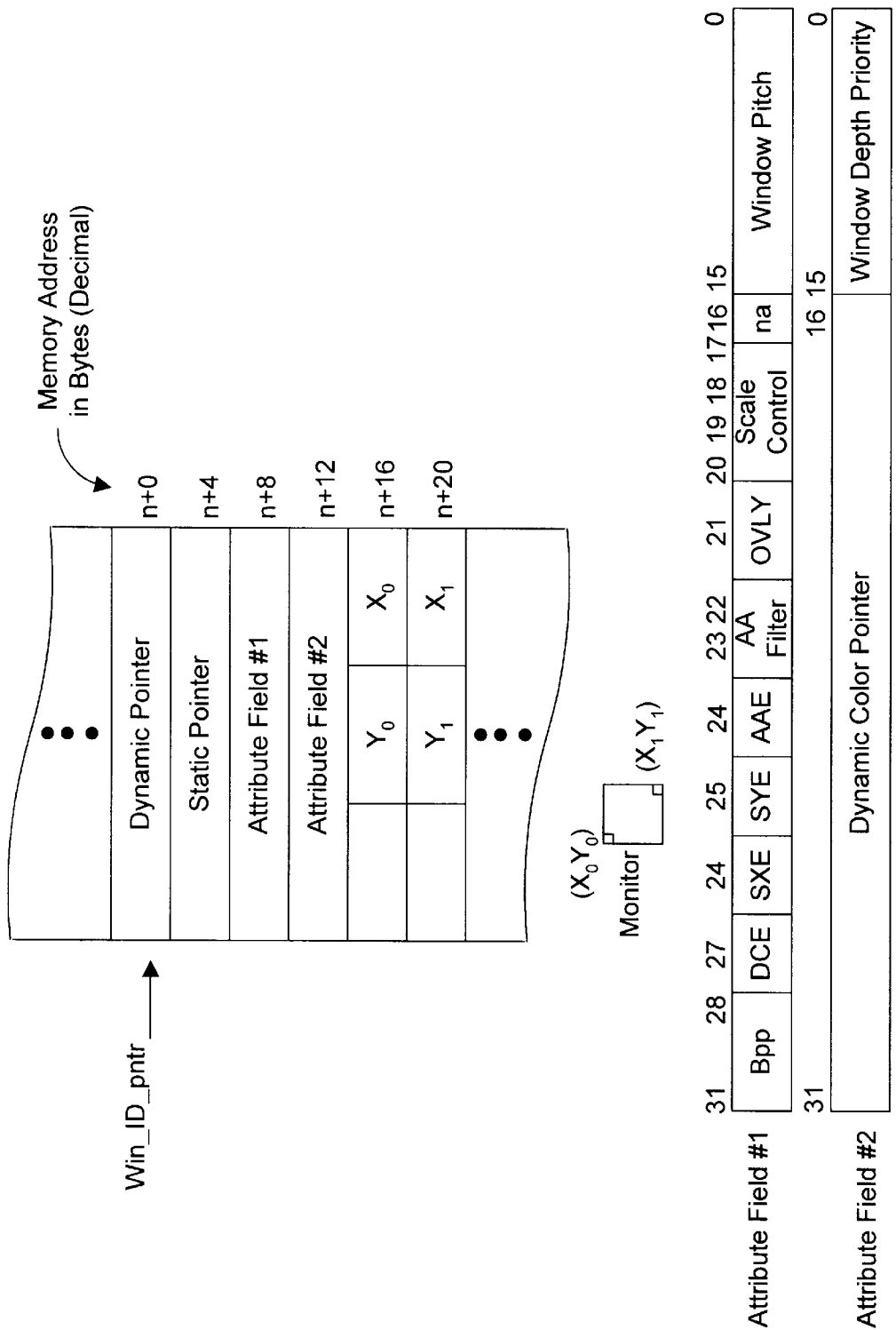
FIG. 19 illustrates the organization of a windows workspace area.

Referring now to Figure page 19, a descriptive example of the windows workspace registers is shown. FIG. 19 illustrates the windows workspace entry for a respective window. As shown, the windows workspace entry includes a dynamic pointer. The dynamic pointer is a 32 bit word which actually points to the display memory area or location where the data for the window is located. The dynamic pointer value dynamically changes with every line as the Display Refresh Engine increments through the span lines. Thus the dynamic pointer is the address of display memory of a window or object for each line to be displayed. The windows workspace entry also includes a static pointer which indicates the top left corner or the starting position of the window or object in display memory.

The windows workspace entry also includes one or more attribute fields which contain specific information about each window or object. Each attribute field is shown in more detail at the bottom of the figure. Each attribute field includes a number of bits referred to as attribute bits.

As shown, bits 28–31 of attribute field 1 comprise a bits per pixel (BPP) value which indicate the number of bits per pixel for this particular window. This BPP field thus indicates the number of bits per pixel for this particular window which is indicated in this window's work space. In the preferred embodiment, the number of bits per pixel may be 1, 2, 4, 8, 12, 16, 24, or 32, and the respective value is encoded into a 4 bit field.

Bit 27 is a dynamic color exchange (DCE) bit. When the DCE bit is set to a 1, this indicates a dynamic color change. The DCE bit set to 1 forces the display refresh logic to fetch a color value to be loaded into the color look-up table or color register file for this particular window. Thus, according to the present invention, the color palate is allocated for a particular window on a per window basis. Since most applications execute on a window by window basis, each application can have a full set of palate colors which are dynamically loaded when that window is refreshed into the RAM DAC on board. Thus the present invention allows dynamic color application or allocation per window.

The next two bits, bits 26 and 25, are referred to as scale x up or down (SXE) and scale y up or down (SYE), and these bits operate in conjunction with the XY scale control field, which is bits 17–20. The SXE and SYE bits in conjunction with the scale factor bits (17–20) direct the Execution Engine 210, when the Assemble Display Refresh List command is executed, to construct the display refresh list with scaled data. The scale enable bits SXE and SYE instruct the DRL Engine 270 to scale a window either up or down, and the window is scaled by the values present in bits 17–21.

In the preferred embodiment, the SXE and SXY bits operate as follows:

| SXE | SXY | |
|-----|-----|---|
| 1 | 1 | Scale both x and y up by scale factor bits (17–20) |
| 1 | 0 | Scale x up and y down by scale factor bits (17–20) |
| 1 | 1 | Scale x down and y up by scale factor bits (17–20) |
| 1 | 0 | Scale both x and y down by scale factor bits (17–20) |

Bits 19 and 20 determine the scale factor in the x direction and bit 17 and 18 determine the scale factor in the y direction. Bits 17–20 operate as follows:

| Bits 20,19 | Scale | Bits 18,17 | Scale |
|---|---|---|---|
| 0,0 | scale by 1.0x (unchanged) | 0,0 | scale by 1.0y (unchanged) |
| 0,1 | scale by 1.5x or .75x | 0,1 | scale by 1.5y or .75y |
| 1,0 | scale by 2.0x or .5x | 1,0 | scale by 2.0y or .5y |
| 1,1 | scale by 2.5x or .25x | 1,1 | scale by 2.5y or .25y |

Thus, according to the present invention, the scaling set-up actually occurs when the refresh list is built and not when the window is actually blit or transferred to the screen. The scaling bits are examined during the display refresh fetch of data. As that data is loaded into the FIFO, the data is automatically scaled according to this information in the x and y positions. In the preferred embodiment, the scaling mechanism is located within the anti-alias block 685.

Bit 24 stores the screen anti-alias enable bit which enables or disables anti-aliasing. Bits 23 and 22 store an anti-alias filter value. The preferred embodiment includes four levels of anti-aliasing.

| Anti-alias filter bits | Anti-alias level |
|---|---|
| 0,0 | Average at 2 points |
| 0,1 | Average at 3 points |
| 1,0 | Average at 4 points |
| 1,1 | Average at 5 points |

Bit 16 is preferably reserved and not used.

Bit 21 is the overlay enable for secondary window operation when bit 21 is set to one and the DCE bit=1. The color compare registers for window overlays are loaded from the Dynamic Color Pointer Address (Attribute Field #2, Bits 31:16). In this case, the Dynamic Color Pointer address references data for both the overlay color compare circuit and the new color values for the color look up table as follows:

| Bit 27 DCE | Bit 21 OVLY | Function |
|---|---|---|
| 0 | 0 | No Operations |
| 1 | 0 | A. LOAD From Dynamic Color Pointer |
| | | First: # of Registers to Load for Color Pallette |
| | | Second: Color Lookup Base Address (Start Load Address) |

-continued

| Bit 27 DCE | Bit 21 OVLY | Function | |
|---|---|---|---|
| | | Third: | Color Value 1 |
| | | . | . |
| | | . | . |
| | | . | . |
| | | Nth | Color Value N |
| 0 | 1 | B. LOAD From Dynamic Color Pointer | |
| | | First: | # of Registers for Color Compare Values |
| | | Second: | Address of Color Compare Register (Start Load Address) |
| | | Third | Color Compare Value 1 |
| | | . | . |
| | | . | . |
| | | . | . |
| | | Nth | Color Compare Value N |
| 1 | 1 | First Do B Then A from above. This loads both overlay color compare and the color look up table. | |

Referring again to the attribute field, bits 0–15 store a window pitch value. The window pitch indicates the amount of data, or the number of pixels, that must be added to the start of the window where the dynamic pointer is located. Thus the window pitch is the amount added to the dynamic pointer for the dynamic pointer to point to the appropriate data for the window in the next line, or the next y position. This value is either a large pitch which as added to point to the window in display memory in XY addressing format, or maybe a small value which is added to the dynamic pointer to give the pointer more of a linear value in display memory. In order to obtain the address, the window pitch is multiplied by the number of bits per pixel, and this value is then added to the dynamic pointer to produce the dynamic pointer address for the next line.

The second attribute field or word contains two fields. As shown, bits 16–31 store a dynamic color pointer value. The dynamic color pointer value is used when the DCE bit (bit 27) or the OVLY bit (bit 21) is 1, indicating that dynamic color exchange operations are enabled. The dynamic color pointer points to an address within the system memory. As shown, the dynamic color pointer is actually only a 16 bit value, and it is noted that the display memory can be much longer and require more addressing than 16 bits. In one embodiment, a fixed mask is used as the most significant bits to point to an area within the system memory 110.

The dynamic color pointer points to a data structure which includes information regarding the color palate used for the window. The data structure includes the number of entries to load into the color palate table, the address at which the entries are located, as well as the actual color values themselves. This information is used to dynamically change the color palate on a per window basis during the display refresh list execution. The dynamic color pointer allows independent color on a per window or per object basis according to the present invention.

The dynamic color pointer also points to an alternate data structure regarding the color compare range for the secondary overlay enable functions. This data structure includes the number of entries in the color compare register file as well as the address at which the entries are loaded and the actual compare values themselves. This information is used to dynamically compare the overlaid window colors to the background window colors during display list execution phase of refresh. When a color in the overlay window compares to the programmed range (enabled by the OVLY Bit 21), the background window data is supplied to the output FIFO instead of the overlay window. Thus, by use of the secondary overlay enable functions, overlayed objects may freely move over background windows.

Bits 0–15 of the second field store the window depth priority. The window depth priority value is a priority value which indicates whether the window is pushed or popped relative to other windows. In other words, the window depth priority value is essentially a z-buffer for each window. A window with a zero depth priority is the most prevalent window on the screen, i.e., is in front of everything else. The window with the depth priority of all 1's is the furthest window back in the screen. The depth priority is used during assembly of the display refresh list to indicate relative priority of windows or objects on the screen. For secondary overlay windows, the window depth priority field is not used. As shown, the Y0, X0, Y1 and X1 values are the line (y) and pixel position (x) of the window as the window is displayed on the monitor 142. The values Y0 and X0 correspond to the upper left corner of the window, and the values Y1 and X1 correspond to the lower right corner of the window.

Multi-Buffering

The prior art for graphics animation uses the concept of "double buffering" where there are two memory buffers in graphical display memory. Double buffering allows for smooth animation of moving objects on the screen. Prior art also uses software drivers to offset the write address between both buffers for each object written into the display buffer. While one buffer is being written to for the next frame to display, the second buffer is used to output to the monitor via the DAC. This technique adds additional computation time to the application software. In addition, the display adapter must support a buffer switch mechanism which switches between buffers during the vertical sync time. As discussed above, the Window Assembler 240 in the IMC 140 performs double buffering or even multiple buffering using a novel method.

The IMC 140 continuously reads data for the display in a manner somewhat similar to a conventional television. The IMC 140 reads the video display data in system memory 110 continuously as the beam sweeps across the screen. When a change in window position or depth occurs, the IMC 140 switches in the new display refresh list at "VSYNC" or the beginning of a frame without interruption of the beam. The new display refresh list is required to be completely assembled before execution to draw a new frame. Also, the Assemble Display Refresh List command is "asynchronous" to the beam. Therefore, the IMC 140 includes foreground and background memory lists, i.e., foreground and background display refresh lists and foreground and background Window ID Lists, as well as foreground and background Window ID Pointer registers, Windows Count registers, and Display Refresh List Pointer registers. The driver sets up foreground and background queues in memory at initialization. While the Refresh Logic 404 in the IMC 140 is executing the foreground display refresh list, the Execution Engine 210 may be building the background display refresh list queue. Once the Execution Engine 210 finishes building the new background display refresh list and the next vertical blank or VSYNC occurs, the IMC 140 switches the foreground and background registers and buffers such that the next active line is read indirectly with use of the new foreground display refresh list. This same technique is used for position changes and depth adjustments. When a position change or change in depth occurs, the modification is made in the background Windows ID list or background Windows Workspace area. On VSYNC after the Assemble Display Refresh command has completed, the switch between background and foreground registers and buffers occurs. As part of this switch, the address at the top of Window ID list is programmed into the IMC's background Window ID list pointer.

Therefore, double buffering is performed by maintaining two copies of the registers and buffers used for assembling and executing display refresh lists. The windows workspace is copied to a secondary workspace location in the system memory 110 and only the values of the static address pointers are changed to point to the second display memory buffer in system memory 110. A secondary Windows ID list is also copied into system memory 110, and the values of the secondary Windows ID list are changed to point to the new updated values in the windows workspace. As discussed above, the IMC 140 contains secondary registers for the window count register, the Windows ID List pointer registers, and the Display Refresh Pointer register. When the IMC command "switch buffers" is executed at each vertical sync period, the ID pointer registers are switched. This allows dynamic reordering of window parameters and priorities.

In addition to double buffering, the pointer-based display refresh list method has benefits for other animation techniques. Graphical data can be moved on the display monitor as objects which are attached to IDs in the Windows ID list. In this manner, multiple frames of an object are stored as display memory and the IMC 140 assembles the object on a span line basis. In effect, the IMC 140 provides multiple buffering capability which in turn provides higher overall performance. This mechanism allows for animation sequences by multiple distributions of different window workspace pointers. It is noted that, unlike the prior art, a bit map image or graphical data is not required to be transferred from system memory 110 to the graphics adapter. Rather, the animation is performed by adjusting pointers to the data that is already in system memory 110.

Thus the display refresh list of pointers allows for dynamic movement of data across the screen, which eliminates costly double-buffer techniques. A timed sequence of events or animation is based on the updates of pointers to different memory addresses in the system memory 110. Therefore, double buffering is performed by changing only the values of the static linear address pointers. The display memory buffer pixel data is read from each address location as indicated by the respective static pointers.

Color Resolution on a Per Object Basis

Prior art computer systems required all data on the display screen to have the same color depth and hence all video data stored in video memory to have the same number of bits per pixel. According to the video display refresh list system and method of the present invention, only the memory required per user application is required to be allocated to store graphical data. This eliminates display memory waste. Some applications may only require two colors (monochrome) while other may require full color, etc. The windows workspace areas contain flags for enabling and disabling of various graphics operations. The depth, dither, alpha and index color load enable bits are located in the attribute field of the windows workspace and are also used to adjust for application specific windows. Therefore, unlike the prior art, the system of the present invention does not have color resolution limitations because of insufficient graphics adapter memory. Also, the system of the present invention provides color resolution on a per window or per object basis, thus requiring the minimum amount of memory for pixel color data.

Object-Based Display Refresh List Assembly

The IMC 140 comprises an object-oriented nature wherein each of the windows workspace areas are manipulated as objects. In one embodiment, the display refresh list comprises a plurality of display refresh list objects, each corresponding to the respective windows or objects on the display screen 142. In this manner, when one window or object on the screen changes from one frame to the next, only the display refresh list object(s) corresponding to the object(s) which changed on the screen are required to be updated. The display refresh lists for those windows and objects that have not changed on the display screen 142 are not required to be updated, and thus these display refresh list objects remain the same. This allows an object oriented assembly where only objects and windows that have changed from one screen refresh to the next require updating. Thus, the Assemble Display Refresh Command only assembles the objects that have changed. This considerably reduces the workload of the window assembly.

In one embodiment, the master display refresh list comprises a plurality of sub-display refresh list objects which are linked together. Only the sub-display refresh lists corresponding to objects that have changed need to be updated. For example, if a plurality of windows or objects are on the display screen and one object is being animated, the assemble command is not necessary for the objects or windows that have not changed, but is only necessary for the object being animated. Accordingly, the Assemble Display Refresh List command is directed to only assemble span lines between certain X and Y bounds. In addition, only the areas of the screen which have animation require two buffers, and thus the present invention uses less memory than the prior art. In the prior art, to page flip for double buffering the entire screen is required to have a secondary buffer even if only a small part of the screen is displaying animation. In prior art, in order to double buffer a window when a plurality of windows occupy the display, a bit-blit (bit block transfer) is performed to the on-screen surface. Using the DRL method of the present invention, no bit blits or pixel block transfers are required to double buffer in a windowed environment.

Graphics Engine Block—Preferred Embodiment

Figure 20:
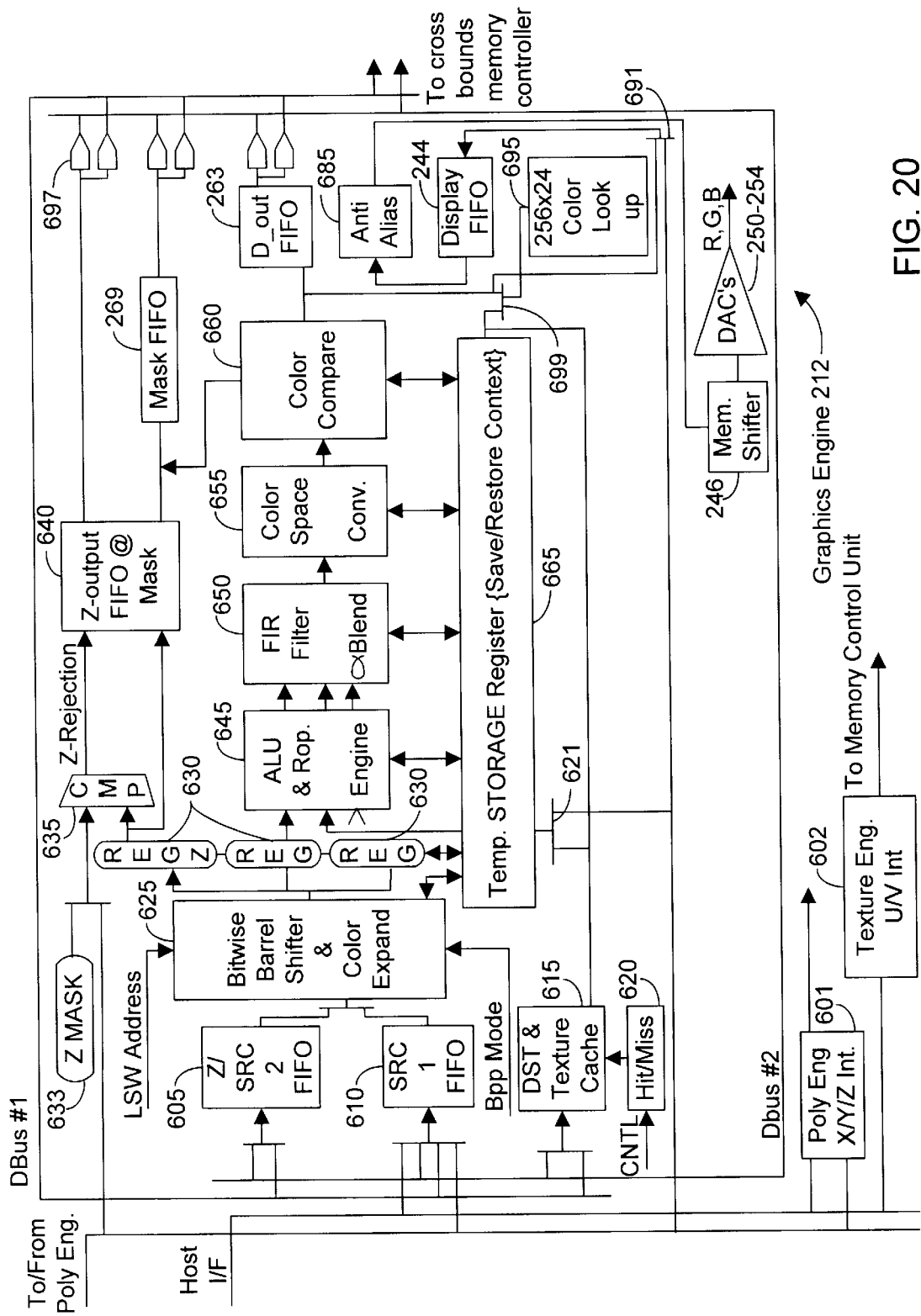
FIG. 20 is a more detailed block diagram of the graphics engine in the IMC of FIG. 6.

Referring now to FIG. 20, the IMC Graphics Engine block 212 as well as other logic in the IMC 140 is shown. As shown, the Graphics Engine 212 includes the two 64-bit data buses Dbus #1 and Dbus #2. The host interface bus is provided from the host interface unit through the command FIFO 200. The host interface bus is used to load various registers in the Graphics Engine 212 with control data, and this control data is used to run the Graphics Engine block 212.

A Poly Engine 601 is coupled to the host interface bus and is also coupled to the memory control unit 220 comprising units 221 and 222. In addition, a Texture Engine 602 is coupled to the host interface bus and is also coupled to the memory control unit 220.

The Poly Engine 601 performs interpolation for three dimensional graphics for x, y and z position and for the RGB color. The address is provided to the cross-bounds memory control units 221 and 222 for provision to system memory 110. The output of the Poly Engine 601 is provided to a Poly Engine bus which is coupled to a number of blocks. The output of the Poly Engine 601 is provided to a source FIFO 610. The output of the Poly Engine 601 is also provided to a mux 621 which then provides an output to an ALU & ROP Engine 645 (ROP unit). The output of the ROP unit 645 is provided to an FIR Filter unit 650, whose output is provided to a Color Space Converter unit 655, and is adjusted on its way through the engine. Thus the Poly Engine 601 outputs R,G, B, signals that are provided to the ROP engine 645. The Poly Engine 601 also produces XY positional data indicating the location of triangles that will be drawn into the system memory 110 which are then displayed onto the screen.

The Texture Engine 602 also functions as an address generator. The Texture Engine 602 generates a lookup address value into the texture map in system memory 110, referred to as the UV address.

Both the Poly Engine 601 and the Texture Engine 602 receive data, including parameters, instructions, and data, from the host interface bus and the Executive Engine 210, and in response generate addresses to the memory control unit 220. Those addresses in turn fetch data which are then loaded into Source 2 FIFO 605, Source 1 block 610, or the Destination and Texture Cache block 615.

A Z/Source 2 FIFO 605 is coupled to the two data buses, i.e., the Dbus#1 and the Dbus#2. The Z/source 2 FIFO stores Z data as well as display or fetched destination data. Also, Source #1 FIFO 610 is coupled to the two data buses Dbus#1 and Dbus#2. The Source #1 FIFO receives graphical data from either of the data buses.

Destination and Texture Cache memory 615 is also coupled to Dbus#1 and Dbus#2. The Cache memory 615 preferably comprises SRAM. Hit/Miss control logic block 620 is coupled to the Destination and Texture Cache memory 615 and controls the Texture Cache 615. The Hit/Miss logic block 620 determines whether texture data from the Texture Engine 602 resides in the Cache 615. If the Cache Hit/Miss block 620 determines that the texture address is not located in the cache 615, then the Hit/Miss block 620 initiates a memory control unit fetch to load the texture data from the main memory 110 into the cache 615.

The Source 1 and 2 FIFOs 605 and 610 are coupled to a Bitwise Barrel Shifter 625. The Barrel Shifter 625 also receives a least significant address which indicates pixel position within memory word boundaries, and a bit per pixel (bpp) mode signal indicating the number of bits per pixel for each windows or object area. As noted above, the IMC 140 can operate at any number of bits per pixels during a single screen refresh or screen rendering, including a single bit per pixel up to 32 bits per pixel. Therefore, the IMC 140 operates on a bit addressable control. The Bitwise Barrel Shifter and Color Expand block 625 aligns data from one source address to a destination address, and the data can be aligned again on any single bit boundary.

A plurality of temporary registers 630 are coupled to the Bit-wise Barrel Shifter 625, and these registers 630 receive outputs from the Barrel Shifter 625. The temporary registers 630 hold data which has been shifted through the Barrel Shifter 625 in order to perform alignment between different sources. The registers 630 include a Z data register referred to as Reg Z, as shown.

The Poly Engine 601 provides a Z value, and the Z Mask unit 633 performs Z comparisons with the Z value. The comparison output of the Z Mask unit 633 is provided to a Z Comparator 635 which performs Z-Rejection operations. An output of the Z register 630 is also provided to the Z Comparator 635. Thus z-value data is provided from the Poly Engine 601 through a 2-way mux, and the output is provided to the Z depth comparator block 635. In addition, Z-buffer memory data is fetched into source FIFO #2 605 and through the Bitwise Barrel Shifter 625, and fed into the Z register 630A. The Z Comparator block 635 compares the Z buffer data in the Z register 630A with the Poly Engine value or the Z Mask value and generates a Z-rejection output. This Z-rejection output is then provided to a Z-output FIFO 640, and this value is used to either mask or unmask the respective pixel. The Z-output FIFO 640 stores the Z-value from the Poly Engine 601, assuming that the pixel is going to be drawn and not masked.

The Z Output FIFO 640 provides an output to Mask FIFO 269 and also provides outputs to buffers 697. This value then is used and the mask value, if unmasked, is not loaded into the mask FIFO 269. However, if the mask is loaded into the mask FIFO 269, the output of the mask FIFO 269 then is used to control data that is strobed out into the display memory. Data is strobed out through a series of buffers onto either Dbus 1 or Dbus 2 via the buffers 697. This path is used by the depth rejection logic in order to show one object in front of another or reject an object which is behind one on the screen. Since the operation of Z depth rejection logic is well known to those skilled in the art, details of its operation are omitted for simplicity.

The registers 630 are coupled to provide outputs to ALU and ROP Engine 645 which performs arithmetic logic unit and common windowing operations required for a windowing system. Thus, data from the bitwise barrel shifter and color expander 625 is provided to the ALU/ROP Engine 645. The data is provided according to a timing sequence. A finite impulse response (FIR) Filter and alpha blending unit 650 is coupled to the ALU and ROP Engine 645 and receives data from the Engine 645. The FIR filter/alpha blender 650 receives data from the ALU/ROP Engine 645 and averages the data as it passes through. The FIR filter 650 filters interpolated data which can be fetched and addressed from the Texture Engine block 602. The Texture Engine block 602 creates the address which then allows the data to be scaled one way or another. The Filter 650 filters the data in order to remove aliasing effects due to the averaging of the XY positions. In addition, the FIR filter 650 is preferably used for texture map adjustment and pre-filtering in order to obtain the best possible texture map, and this texture map is stored in the system memory 110. The FIR filter block 650 is also an alpha blending unit, wherein the multipliers used in the alpha blend operation are also used in the filter.

A Color Space Conversion block 655 is coupled to the FIR Filter 650 and receives data from the Filter 650. The Color Space Converter block 655 converts data between color spaces, for example from a YUV format to an RGB format, or vice versa. Thus the data is output from the Color Space Converter 655 in an RGB format. A Color Comparator 660 is coupled to the Color Space Converter 655 and compares data receives from the Color Space Converter block 655 and compares the data to a range of color. This provides the ability to generate a data value with transparency. The Color Comparator 660 preferably comprises a set of registers with a high and a low bounds set to compare each of the R,G, and B components.

The Color Comparator 660 provides an output to the Mask FIFO 269. The output to the Mask FIFO 269 allows a transparency to occur whenever a color is within a certain bounds or whenever a color is outside a certain bounds as detected by the Color Comparator 660. Data provided from the Color Comparator 660 is also provided to the Data Out FIFO 263. The Data Out FIFO 263 receives data from the Comparator 660 and provides data through buffers to the memory control units 221 and 222. It is noted that the Mask FIFO 269 and the Data Out FIFO 263 is shown in FIG. 6 and is not comprised in the Graphics 212.

Data provided from the Color Comparator 660 is also provided to an input of a mux 699 and an input of a mux 691, as shown. The mux 699 also receives an input from the Destination and Texture Cache memory 615. The output of the mux 699 is provided to the Color Look-up Table 695. The Color Look-up Table 695 is also coupled to the Poly Engine 601. The output of the Color Look-up Table 695 is provided to the second input of the mux 691. The output of the mux 691 is provided to the Display FIFO 244.

The Display FIFO 244 is coupled to Anti-Alias block 685, and the output of the Display FIFO 244 is provided to the Anti-Alias block 685. The Display FIFO 244 is capable of receiving data having a different number of bits per pixel, and the Display FIFO 244 provides these bits through the Anti-Alias block 685 to the memory shifter 246.

The Anti-Alias unit 685 examines edges for change in intensity in pixel data, i.e., high frequency edges, and then smoothes those edges out over a number of pixels. Thus the Anti-Alias unit 685 essentially operates as a high frequency edge filter. the anti alias block 685, and this data becomes display refresh data. The Anti-Alias unit 685 may be comprised in the Graphics Engine 212 or may be external to the Graphics Engine 212, as desired.

The output of the Anti-Alias unit 685 is provided to a memory shifter 246, which provides outputs to digital to analog converter's (DACs) 250–254. The DACs 250–254 provide the RGB signals which drive the video monitor 142.

The color provided to the color lookup table 695 during refresh is preferably either 1, 2, 4 or 8 bits per pixel. Those bits index into the color lookup table 695, and the output is provided through the mux 691, Display FIFO 690, Anti-Alias unit 685 and the memory shifter 696 and out through the DACS 698. When data passes through the color lookup table 695, the data is converted from an 8 bit address into a 24 bit red, green, and blue value. Those values are then shifted into the memory shifter 696 for a higher speed transition into the DACs 698.

An alternate path to the Display FIFO 244 is a 24 bit red, green and blue path which bypasses the color lookup table 695 and runs directly into the multiplexer 691, the memory shifter 246, and the output DAC 250–254. In this case, the color lookup table 695 is idle and not used. In an alternate embodiment, the color lookup table 695 is used for texture color space conversion or for color space conversion according to a novel aspect of the invention.

Therefore, the Display FIFO 244 includes special addressing modes to allow data having a different number of bits per pixel to be shifted out into the color lookup table 695. When the bits per pixel are 8, 4, 2 or 1, the color lookup table 695 expands the data to true color to run the DACS 250–254. When the bit per pixel mode coming from the display FIFO 244 is at 12, 16, 24 or 32, the color lookup RAM 695 is not used, and the data is provided directly from the Display FIFO 244 into the DACS 250–254 through the memory shifter 246.

As the data traverses through the blocks 645, 650, 655, and 660, some of the operations on the data are only valid if the data has a certain number of bits per pixel. Some data, for example, data that is only one bit per pixel, is preferably multiplexed through the engine. The determination of the type of data, i.e., the number of bits per pixel, and how the data flows through the engines, is partially controlled by a control logic block, shown in FIG. 5 as the instruction storage and decode block 230.

A Temporary Storage Register Set 665 is coupled to each of the Barrel Shifter 625, the ALU & ROP Engine 645, the FIR Filter 650, the Color Space Converter 655, and the Color Comparator 660. The Temporary Storage Register Set 665 is used to save and restore the context of the Graphics Engine 212. This is necessary because the data for the video refresh flows through the same ROP engine which performs polygon rendering operations, and thus context changes and restores are necessary. The Temporary Storage Register Set 665 allows the data for the display monitor to flow through the same engine. Once the Display FIFO 244 is full, or an EOW condition is present, the temporary storage register 665 restores the context of the engine 212, such that the instruction that was running previous to the display refresh interruption resumes execution.

Therefore, according to the present invention, the Graphics Engine 212 performs both graphics manipulations such as polygon rendering and also perform screen refresh operations. Thus, for example, when the Graphics Engine 212 is performing operations in response to a draw function, such as drawing a triangle, deleting a window or performing text manipulation, and data is passing through the engine 212, when a screen refresh is needed, this operation is temporarily stopped and the data in process is stored into the set of storage registers 665. During a screen refresh, data is fetched from the memory 110 and received by the Display FIFO 244. The data is then provided from the Display FIFO 244 to the Color Lookup table 695 and then to the DACS 250–254. The screen refresh operation occurs in order to keep the data present on the monitor 142.

In an alternate embodiment, storage registers are not required if the data in process is shifted through to the output FIFOs. During this operation, the input data is suspended such that the data in process completes before the Graphics Engine 212 is required to manipulate the screen refresh data.

Thus, the Graphics Engine 212 performs both graphical operations and screen refresh operations according to a novel aspect of the present invention. It is noted that the novel display refresh operations of the present invention can be performed in any graphics or DSP engine. Also, the novel graphical operations can be performed in any of various types of graphical engines, regardless of whether the display refresh method is used. Thus, one novelty is the ability to use the graphics bit blit engine or ROP engine to transfer the display data during screen refresh. This is particularly useful because, in the preferred embodiment, the display data can be any number of bits per pixel. Thus it is not necessary to duplicate all of the bitwise barrel shifting logic located in block 625 just to refresh the screen. Instead, the Graphics Engine blocks are halted and the state of the machine is stored in the Temporary Registers 665. The refresh data, which could be any number of bits per pixel, is then shifted and property aligned for data into the display FIFO 244. Once the display FIFO 244 is full and ready for the refresh operation to occur out to the DACS, then the temporary storage registers 665 restore the prior context back into the engine, and the instruction which was suspended in the drawing procedure continues. Data traverses out of the color comparator block 660 and into the data out FIFO 263. The data out FIFO 263 is used to store information which is going to be written into a display memory areas in the system memory 110.

It is assumed here that the operation invoked by the driver software was to update video or graphical data in one of the windows which resides in system memory 110. The driver includes information regarding the respective windows as well as which application is running and the respective number of bits per pixel. In any event, the data that traverses through the Graphics Engine 212 is controlled by one or more units, including the Poly Engine 601. The Poly Engine 601 generates the x, y and z coordinates for triangles, or the x,y coordinates for lines, or the x,y coordinate for a point, and the Poly Engine 601 also generates color space for R,G, B.

Therefore, the novel architecture of the present invention allows display information to pass through the Graphics Engine 212 or "blit engine", and the video data or display data is not fetched on a separate path to the display FIFO, as in prior art devices.

Poly Engine

Figure 22:
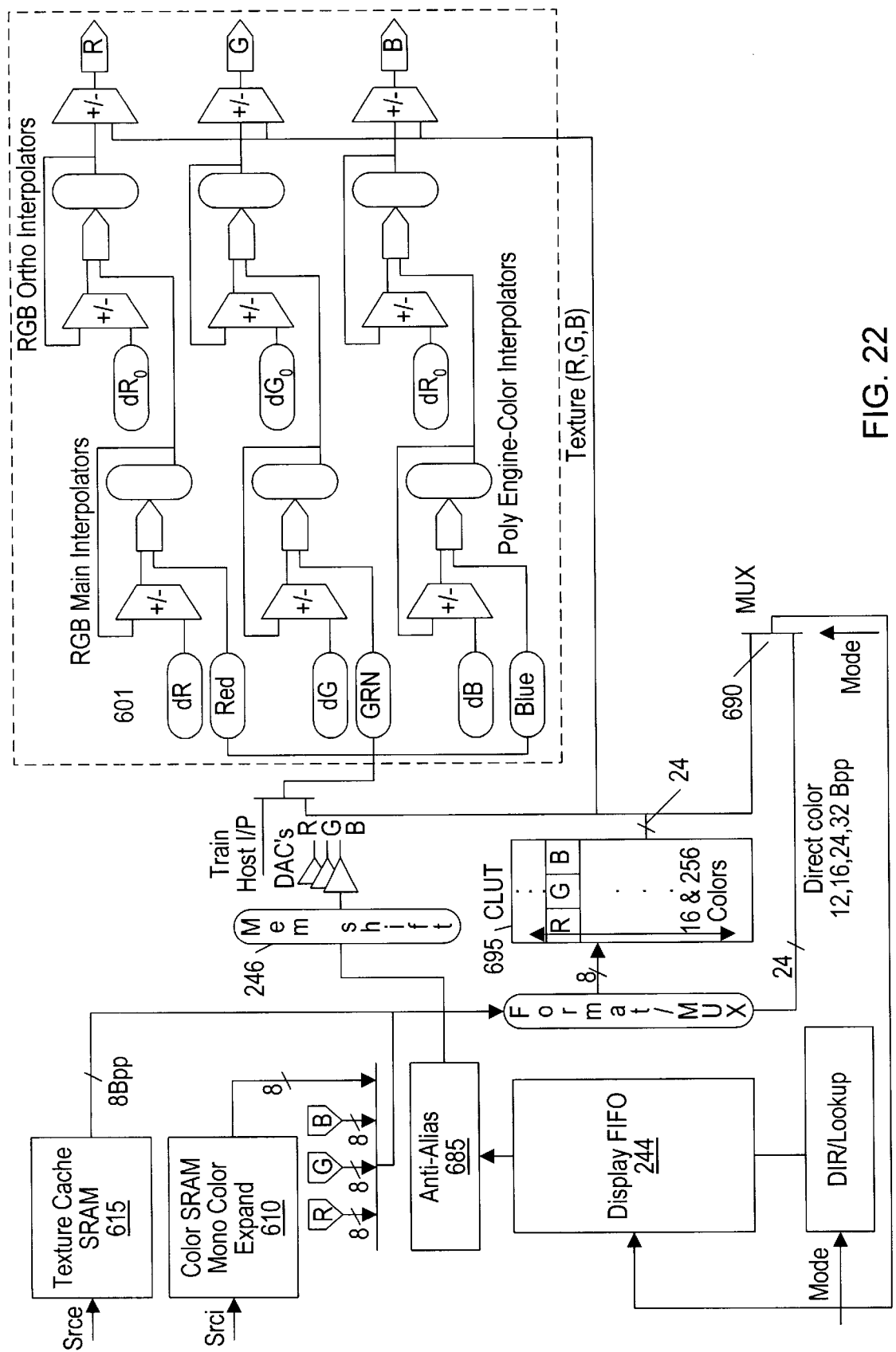
FIG. 22 is a more detailed block diagram of the Poly Engine in the graphics engine of FIG. 20.

Referring now to FIG. 22, a portion of the Graphics Engine block 212, including the Poly Engine 601, is shown in greater detail. As shown, the Graphics Engine 212 includes a Color SRAM 611 which performs monomap to color expand operations. The Color SRAM 611 provides an 8 bit input address to retrieve Red, Green, and Blue signals, each of which are 8 bits in value. The RGB output signals are provided to format mux 699.

The format mux 699 receives an 8 Bpp value from a Texture Cache SRAM 615 which operates as a select input for the mux 699. The format mux 699 provides an 8 bit output to the Color Look-up table (CLUT) 695. The format mux 699 also provides a 24 bit output to one input of the mux 691. The CLUT 695 outputs a 24 bit value to the Poly Engine 601 and to the other input of the mux 691. The output of the mux 691 is provided to the Display FIFO 244. A DIR/Lookup register receives a mode select signal and provides an output to the Display FIFO 244. The Display FIFO 244 provides an output to the anti-alias block 685. The anti-alias block 685 provides an output to the Memory Shifter 246, which then provides the data to RGB D/A converters 250–254.

As shown, the Poly Engine 601 includes color interpolators for red, green and blue. The Poly Engine 601 includes two stages referred to as the RGB main interpolator and the RGB orthointerpolaters. The RGB main interpolators calculate the main triangle slopes of the color, while the RGB orthointerpolaters calculate the inner span of the triangle in order to shade the color from one gradient to another. The interpolators perform texture shading and other object shading. One example of the use of the interpolators is to show one dark area of a triangle, and as the span continues across the triangle, render the triangle to appear lighter and lighter.

Color Look-up Table

Figure 21:
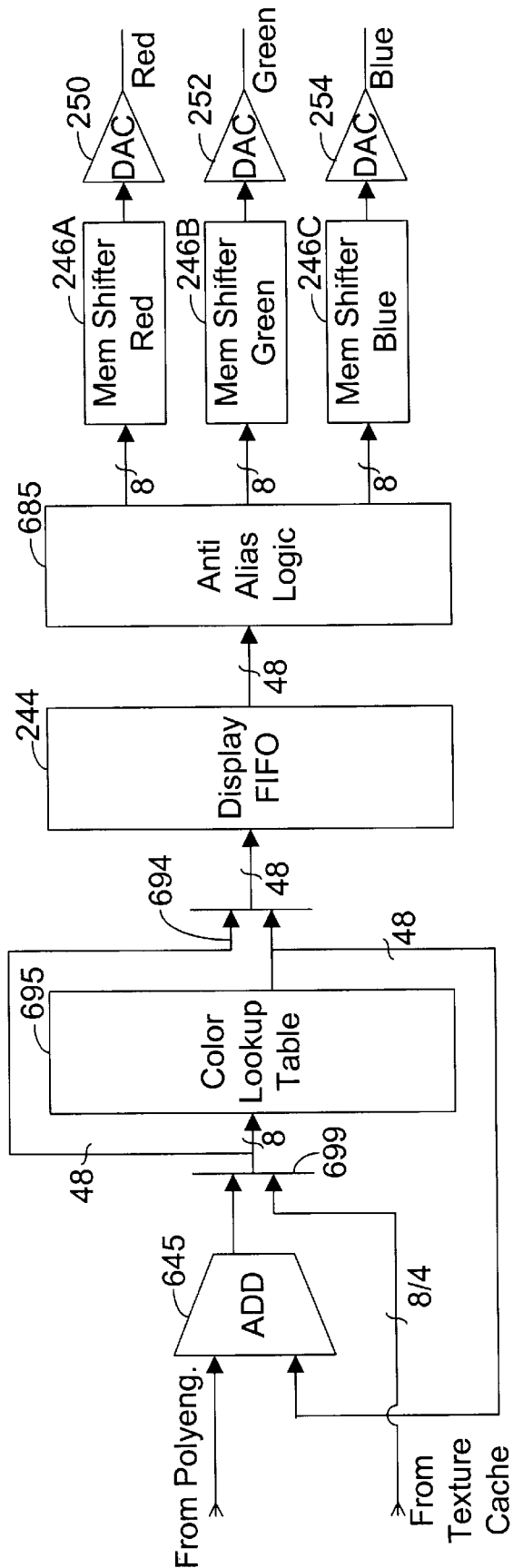
FIG. 21 is a more detailed block diagram of the color look-up table in the graphics engine of FIG. 20.

Referring now to FIG. 21, the color lookup table 695 includes a novel architecture according to the present invention which provides a better display resolution for shaded textures. One novel aspect of the color lookup table 695 is that the color look-up table 695 is used as a secondary storage element in certain modes. Prior art devices don't use the color lookup table as a secondary storage element. According to the present invention, the color lookup table 695 is used for display refresh when the number of bits per pixel are 1, 2, 4 and 8 in order to deliver a 24 bit red, green and blue output to the DACS 250–254. During modes such as 12, 16, 24 and 32 bits per pixel, the color lookup table in normal systems is not used at all, because the data coming from the display FIFO is routed directly into the DACS.

FIG. 21 is a pictorial representation of true color lighting with indexed texture. Adder block 645 receives color RGB inputs from the Poly Engine 601 and also receives inputs from the Color Look-up Table 695. The Adder block 645 adds the output of Color Look-up Table 695 in 24 bits to the data from the Poly Engine 601. Here it is assumed that the color output from the Color Look-up Table 695 is a true color texture map. However, Color Look-up Table 695 receives an input address comprising an 8 bit texture value. Thus the 8 bit value indexes into the lookup table 695 and produces a true color texture value. The true color texture value is added to the true color RGB value from the Poly Engine 601. The true color RGB value from the Poly Engine 601 typically acts as a lighting source to shade lighting on the texture from a high intensity to a low intensity. Adding the RGB color to the texture produces a lighted or shaded texture which is then loaded into the Display FIFO 244.

The output of the Adder 645 is provided to mux 699. The other input of the mux receives data from the Texture Cache. The output of the mux 699 is an 8 bit value which is provided to the Color Look-up Table 695.

The output of the Color Look-up Table 695 is provided to a mux 694. The other input of the mux 694 receives the output of the mux 699, i.e., the second input of the mux 694 receives data which bypasses the Color Look-up Table 695. The output of the mux 694 is provided to the Display FIFO 244. The output of the display FIFO 244 is provided to the Anti-Alias block 685 and then into the memory shifters 246, and then out to the RGB DACS 250–254.

Thus the Graphics Engine 212 includes a mode where the data bypasses the Color Look-up Table 695. It is noted that this mode is only valid at 12, 16, 24, and 32 bits per pixel, because in those modes the color lookup table 695 is not used. Therefore, according to the present invention, the color lookup table 695 is used to convert an 8 bit texture memory value into a 24 bit texture value and that 24 bit lighted texture value is then used to display video data during the refresh mechanism.

In prior art systems, in order to obtain a 24 bit texture map, the texture map would have to be stored in memory using 24 bits. This consumes additional memory and reduces performance since 3 times as much data is required to be manipulated. In the architecture of the present invention, the texture maps are stored as 8 bit values fetched into the texture cache 615, and these 8 bit values are used to index into the lookup table to deliver 24 bit textures internally to the system. Thus, instead of using external memory to store 3 times the amount of data, the color look-up technique of the present invention requires only 8 bits of storage for each texture map.

The output of the color look-up table 695 comprises data in an RGB format, and this RGB formatted data is added to the RGB data from the Poly Engine 601. The RGB data from the Poly Engine 601 is a shade gradient which makes the texture appear as though a light source was applied to the texture. Thus, prior art methods would require 24 bit texture maps stored in memory in order to achieve the same effect as the present invention, which stores only 8 bit texture maps in memory. The present invention is valid when the device runs in a higher color resolution mode or higher color resolution window, since each window of the IMC is a variable bit depth, i.e., a variable number of bits per pixel. This mode of the present invention is valid for 12, 16, 24 and 32 bit per pixel modes where the color lookup table is not used for color lookup but could be used for texture lookup.

Another use of the color lookup table 695 according to an alternate embodiment of the present invention is that, when the colors are in 12, 16, 24 and 32 bits per pixel, the output of the color engine 695 is used as input to the true color interpolator block, indicated in 601. The input is only 8 bits per pixel, and thus the source bit maps are provided in 8 bit per pixel format. Thus the vertex input from the driver only uses 8 bits to describe the vertex colors. The 8 bit per pixel source bit maps are provided to the color lookup table 695 and are expanded, and thus the interpolator operates with a higher shade of gradient and thus more precision. Thus the method of the present invention can be used in texture map conversion to expand 8 bit textures, and can also be used to expand 8 bit source maps to provide better color resolution for 8-bit bit maps.

Again, as described above, prior art systems do not use the color lookup table for 12, 16, 24, and 32 bit per pixel modes. However, according to the present invention, the color lookup table 695 is used in these modes to help create a better color content from less input data.

Figure 23:
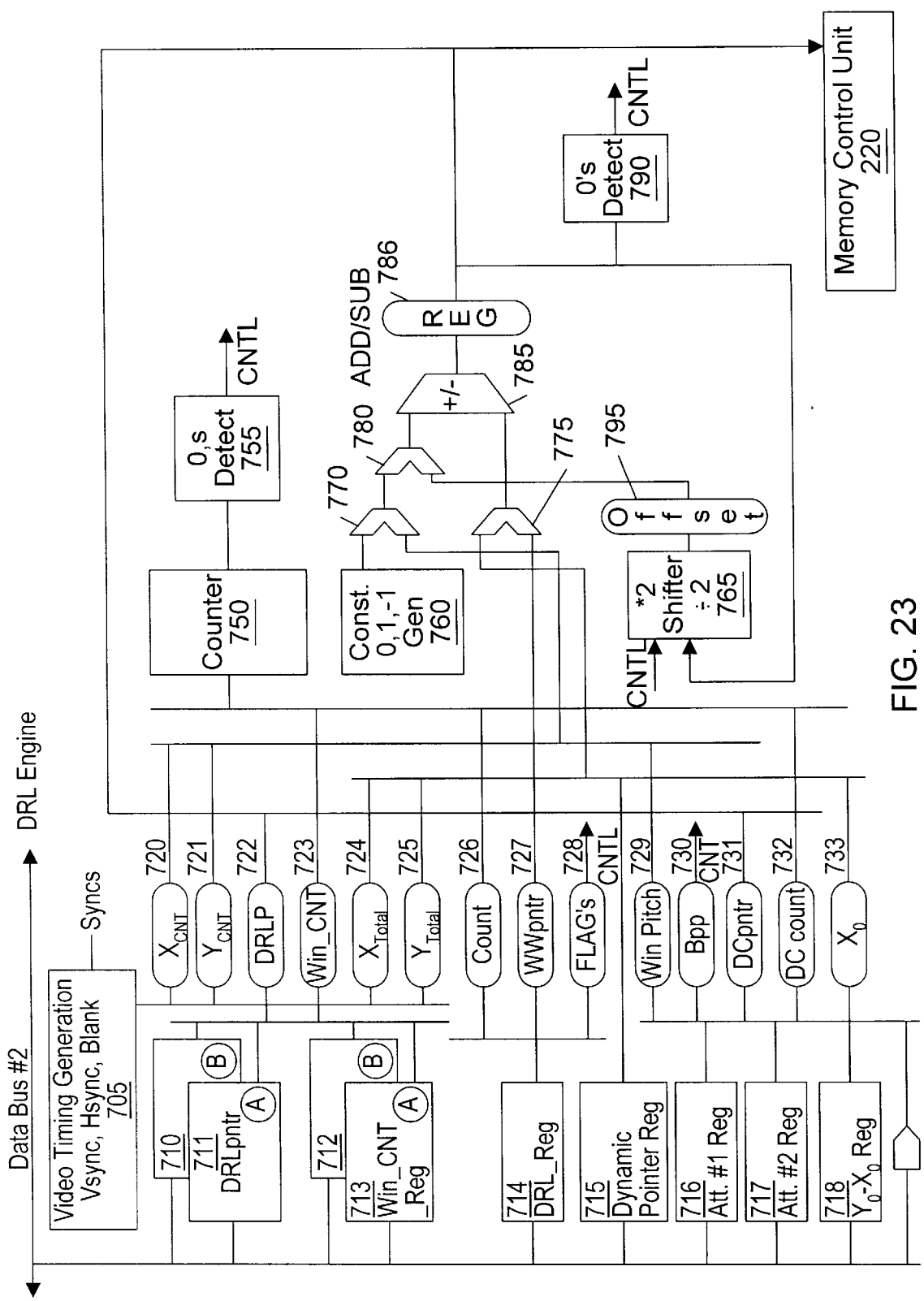
FIG. 23 is a more detailed block diagram of the Display Refresh List engine in the IMC of FIG. 6.

FIG. 23—Display Refresh List Engine

Referring now to FIG. 23, a schematic diagram is shown illustrating one embodiment of the Display Refresh List Engine 270. As shown, the DRL Engine 270 includes two sets of A and B registers. Registers 711 and 710 store DRL pointers which point to respective display refresh lists. Register 711 stores the display refresh list pointer for buffer A, and register 710 stores another display refresh list pointer for buffer B. Registers 712 and 713 store Window Count register values. Register 713 stores the window count value for buffer A, and register 712 stores another window count value for buffer B. The registers 710, 711 and 712, 713 alternate outputs through respective multiplexers (not shown) when display refresh list switches are required. As noted above, buffers A and B are actually respective memory areas in the system memory 110.

When the display refresh list register 714 is loaded with the actual DRL data (pointed to by Register 711 and 710) values of various attributes, including the window count and the windows workspace dynamic pointer address, are divided into a count field, a pointer field and a flag field. The count field, pointer field and flag field are stored in registers 726, 727, and 728, respectively. The flags are actually the two most significant bits of the display refresh words. One bit of the flag is the repeat field, bit 31, and the other is the end of window field, bit 30. These flag bits are held in temporary register 728. It is noted that additional storage registers are required for the secondary window overlay process.

Thus, a count field is stored in temporary register 726 and the work space windows dynamic pointer value is held in the temporary register 727. When these registers are loaded, this completes the data fetch for that particular window. These values are then manipulated as described below and are used to read the display memory and obtain the correct video data. The video data is provided to the display FIFO 244 and is shifted out to the DACs 250–254.

When the windows workspace for a window is first accessed, values are read from the windows workspace, including the actual dynamic pointer address, the attribute fields 1 and 2 and the Y0/X0 field. These values from the windows work space memory are stored in registers 715, 716, 717, and 718 as shown in FIG. 23. Values from those registers are extracted from respective fields and are stored into temporary registers 729, 730, 731, 732, 733. As shown in FIG. 23, the registers 729, 730, 731, 732, 733 store values for Window pitch, bpp (bits per pixel), DCptr, DC cnt, and X0, respectively. These values are then used during subsequent portions of the display refresh list operation.

The DRL Engine 270 includes a constant generator 760 which generates either a 0, 1, or −1 value. The output of the constant generator 760 is provided to an input of mux 770. The other input of mux 770 receives values from either Xcnt register 720, Ycnt register 721, or the Win Pitch register 729. The output of the mux 770 is provided to an input of mux 780.

The DRL Engine 270 includes a shifter 765 connected to provide an output to an offset register 795. Depending on the number of bits per pixel, the shifter block 765 shifts right or left and that value is then stored in the offset register 795. The offset register 795 provides an output to the mux 780. The output of the mux 780 is provided to an input of adder/subtracter 785.

The DRL Engine 270 includes a mux 775 which receives an input from either the Dynamic Pointer register 715, the Xtotal register 724, or the Ytotal register 725. The other input of the mux 775 receives an input from WWptr register 727. The output from the mux 775 is provided to the other input of the adder/subtracter 785. The output of the adder/subtracter 785 is provided to register 786, whose output is fed back to the shifter 765. The output of the register 786 is also provided to Zero's detector 790, which generates a control signal that is provided to the shifter 765. The output of the register 786 is also provided to memory control units 221 and 222. In the preferred embodiment, additional storage registers not indicated in FIG. 23 may be used for temporary results.

Figure 29:
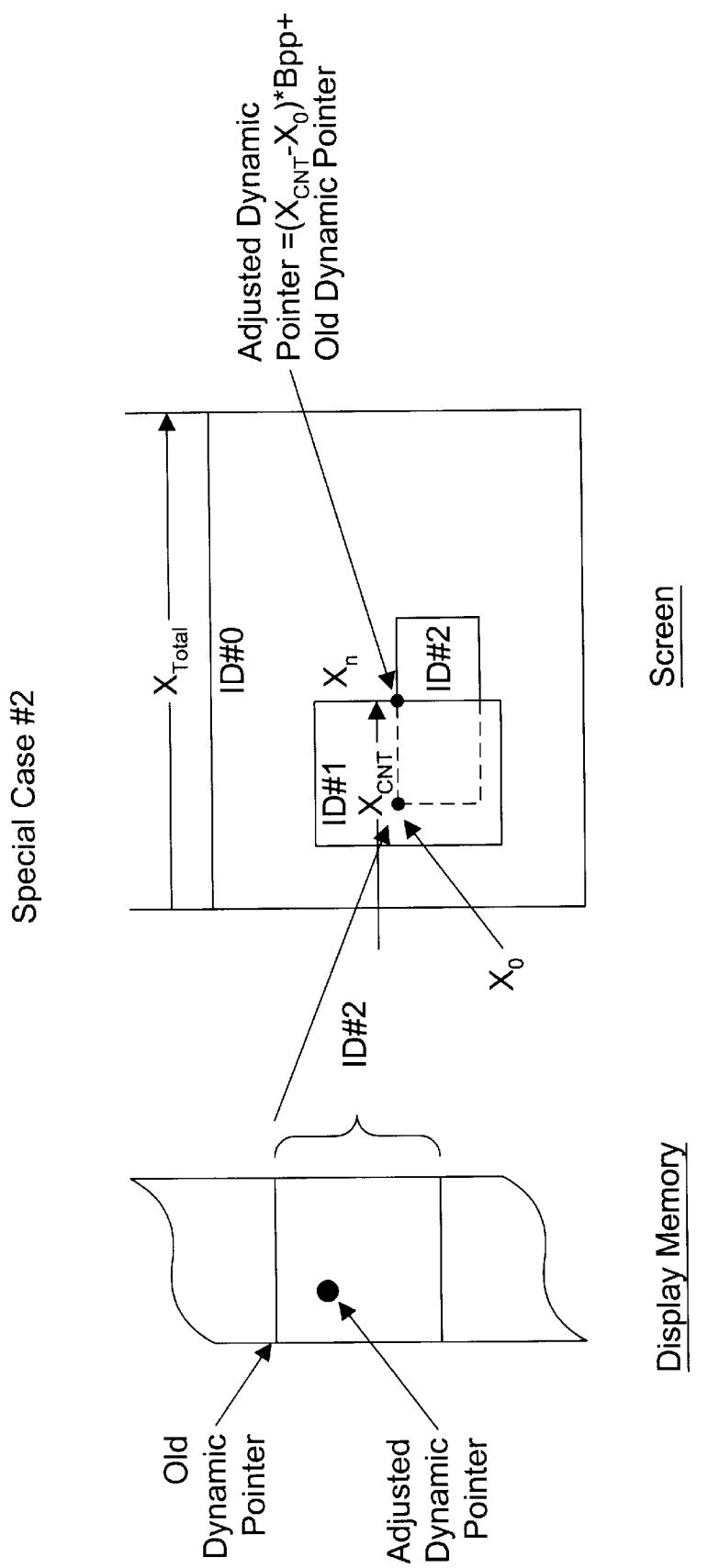
FIG. 29 illustrates a second example of occluded windows.

The adder/subtracter 785 receives the actual dynamic pointer value from register 715. Thus the dynamic pointer value can be offset by a number of pixels as required by the DRL special case #1. This offset is the number of pixels in the range between the X0 and the X count values. The current X position, minus the window start (X0) times the Bpp field gives the actual adjusted dynamic pointer address. This new adjusted value of the dynamic priority is then stored in the offset register 795 to adjust the dynamic pointer with the correct address. The difference of X count 720 and X0 733 is then produced. This value is then multiplied by Bpp 732 or the number of bits per pixel to give the window start address required for adjustment of the dynamic pointer. The shifter block 765 multiplies the differences of Xcount 720 minus X0 733 by two for each new value of Bpp. In other words, if the Bpp field is 8-bits per pixel, then data is stored in the offset register after three individual shift cycles. This adjusted value of the dynamic pointer is depicted in FIG. 29 as special case #2. In this example, window ID #2 is hidden by window ID #1. The dynamic pointer address to display memory (old dynamic pointer) points to the pixel data located at X0 and must be adjusted to pixel data located at $X_n$ position. The DRL engine looks for X count value stored in Register 720 which is greater than the current windows workspace $X_0$ value. If true, then the adjustment to the old dynamic pointer must be made. This adjustment is made for every line of the occluded window before the display memory is refreshed to the display monitor.

The Xcount value stored in register 720 is provided to the mux 770 and through mux 780 into the add/subtract block 785. The X0 register 733 provides an output through mux 775 which is provided to the other input of the subtracter 785. The output of the subtracter 785 is stored in the register 786. This forms the delta between the Xcount–X0 value, which is loaded into the shifter 765 and properly shifted for the number of bits per pixel. The value of the dynamic pointer which resides in register 715 may then may be added to the offset value. The offset value 795 is sent through mux 780 to the adder/subtracter 785. This addition then adds the adjustment to the dynamic pointer address and the result is stored in register 786. This value is then used at the mcu #1 or mcu #2 to read display memory to the monitor.

The DRL Engine 270 also includes a counter 750 which determines when a read for a respective scan line of a window has completed. Register 715 contains the dynamic pointer, pointing to the display memory for the particular window that is being dynamically refreshed. That value is provided to mux 775, and if there is an offset value, an offset flag is set, and mux 780 is set to that offset value. The offset value is added in the adder block 785. If there is no offset, then that register is 0, so the dynamic pointer register address passes directly through block 785 without alteration. The value is loaded into the output register 786, which is then provided to the memory control unit 220. The DRL Engine 270 then starts reading for a number of counts. Previous to this, the counter 750 is loaded with the counter value from count register 726. For every pixel read, the counter decrements until the zero's detector 755 indicates that the count is completed. When the count is done, indicated by zero detector 755, then the reads for this window on this scan line have completed.

The DRL Engine 270 includes an X total register within the video timing generation block 705. The X total register indicates the number of X pixels or width of the screen. When the count is equal to that total, this indicates that a horizontal line has been completed.

Figure 28:
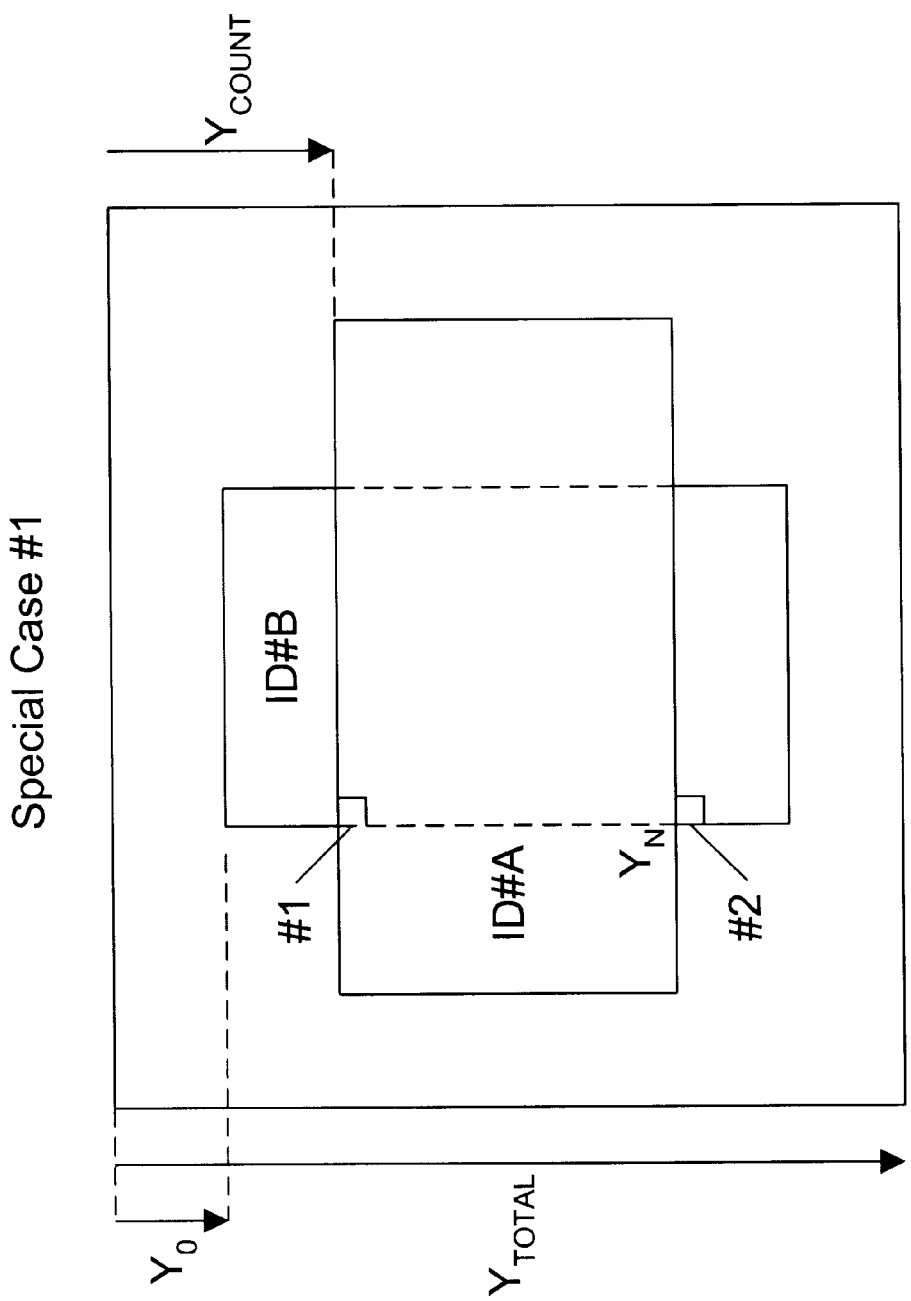
FIG. 28 illustrates a first example of occluded windows.

Referring now to FIG. 28, another special case, referred to as special case #1, occurs when a window is occluded behind another window and continues after some number of scan lines in "y" have occurred. This is indicated in FIG. 28 as window ID #1, where Ycount+1 is the first non-read line of window ID #1. As seen from FIG. 28, window ID#2 has a higher depth priority and therefor "covers" window ID #1. The DRL thus includes a process by which the line at $Y_n$ is displayed correctly. Thus the dynamic pointer for window ID#1 is updated for each occluded scan line until line $Y_n$ is reached. This is accomplished by a special entry in the display refresh list. When the display refresh list has a EOW Flag set to "one" and a count field of zero. The old dynamic pointer receives the window pitch value stored in register 729 added for each scan line in which video display data is not required to be read. Thus, when the line number reaches a displayable line, such as at line $Y_n$, the dynamic pointer is ready to point to the proper display memory location within the system memory 110.

FIG. 24—DRL Engine: Update Dynamic Pointers Logic

Referring now to page 24, logic which updates the dynamic pointers at Vsync is shown. FIG. 24 illustrates hardware for the initialization of dynamic pointers at the end of a frame. This logic performs the initialization at the end of frame when the beam scans to the end of the frame and the sync begins. At that time the IMC 140 updates all the display dynamic pointers with the respective static pointer values. The logic in FIG. 24 operates at point B of the flowchart shown in FIG. 27A to update the dynamic pointers with the static pointer values.

As shown, window ID base pointers are stored in registers 740 and 741 referred to as Win_ID_BP_A and Win_ID_BP_B, respectively. The output of these two registers 740 and 741 are provided as inputs to a multiplexer 745. The mux 745 receives a front/back toggle signal at its select input.

The output of the mux 745 is provided to a temporary register referred to as Tmp_Win_ID_BP, which is used to look up the window ID value in system memory 110. As described above, the window ID values stored in registers 740 and 741 point to the start of the particular window in the windows work space memory.

Two registers referred to as Win_Cnt_A and Win_Cnt_B store window count values which indicate the number of windows on the screen. The output of these registers are provided to inputs of a multiplexer 746. The mux 746 receives the front/back toggle signal at its select input. The output of the mux 746 is provided to a register referred to as Tmp_Win_Cnt 726. The output of the Tmp Win_Cnt register 726 is provided to a Zero comparator 747. The output of the Zero comparator 747 and the output of the Tmp_Win_ID_BP register 742 are provided to a multiplexer 748 whose output is provided to an adder/subtracter 785. The adder/subtracter 785 either adds 1, adds 0, or subtracts 1. The output of the adder/subtracter 785 is provided to an input of the mux 745 and is also provided to the memory control unit 221 or 222.

As shown in FIG. 24, the TMP_WIN_ID_BP register 742 holds the window ID base pointer address to point to the window ID list, which in turn points to the windows workspace. The value stored in the Window ID list register actually points to the first active window within the windows work space. That value is provided through mux 743, and the adder 785 adds one to the value, i.e. one word or four bytes are added to the value. The address is then provided to the memory control unit which then fetches the windows workspace pointer. The windows workspace pointer points to the static pointer, which is the word in the workspace memory following the dynamic pointer. That address is then provided to the memory control unit.

The mux 746 selects the appropriate window count register 713 or 712 dependent upon the toggle switch for front and back buffers. That value is loaded into temporary windows count register 726. Every time a window display is updated, i.e., the static pointer is written to the dynamic pointer in the windows workspace, the adder/subtracter 785 subtracts one from the window count value. The zeros detector 747 coupled to the temporary window count register 726 determines when the window count value decrements to zero. When this occurs, all the windows have completed updating the dynamic pointer with the static pointer values.

The static pointer value in the work space buffer (FIG. 19) is read from the workspace memory (main memory 110) and is strobed into an internal temporary buffer where it is written back out to the address of the dynamic pointer. The Temp register 472 outputs the value. The memory control unit 220 then performs a memory write of the just read static pointer which is stored back into the dynamic pointer. This completes the update for the first window in the work space memory. The same operations occur for all windows or objects, where the static pointer is read and then rewritten into the dynamic pointer. Thus at the V blank interval, this logic resets all the dynamic pointers to the start of their respective windows. It is noted that the TMP_WIN_ID register contains the address of the windows workspace dynamic pointer.

The following is pseudocode which describes operation of the logic shown in FIG. 24. This describes the sequence for pointer initialization which happens at every Vsync for each active window which will be displayed during the next frame.

```
If Vsync,
; start
; select, front/back toggle
    If"Arm" A = true
        WIN_ID_BP_A --> TMP_WIN_ID_BP
        WIN_CNT_A --> TMP_WIN_CNT
    Else
        WIN_ID_BP_B --> TMP_WIN_ID_BP
        WIN_CNT_B --> TMP_WIN_CNT
If TMP_WIN_CNT != 0
READ WW pointer from window ID list
; read static pointer from windows workspace (@ window_ID + 1)
; write to dynamic pointer in windows workspace (@window - ID)
    *( TMP_WIN_ID_BP + 1)--> *( TMP_WIN_ID_BP + 0)
    TMP_WIN_CNT = (TMP_WIN_CNT) - 1
Else
; Done with static -> dynamic pointer init routine
```

As noted above, the dynamic pointer update logic performs pointer initialization which happens at every Vsync for each active window which will be displayed during the next frame. In an alternate embodiment, the static pointer to dynamic pointer update occurs after the completion of the "$Y_1$" (last line) position. This value may be encoded into the DRL during the assemble display refresh command.

FIG. 25

Figure 25:
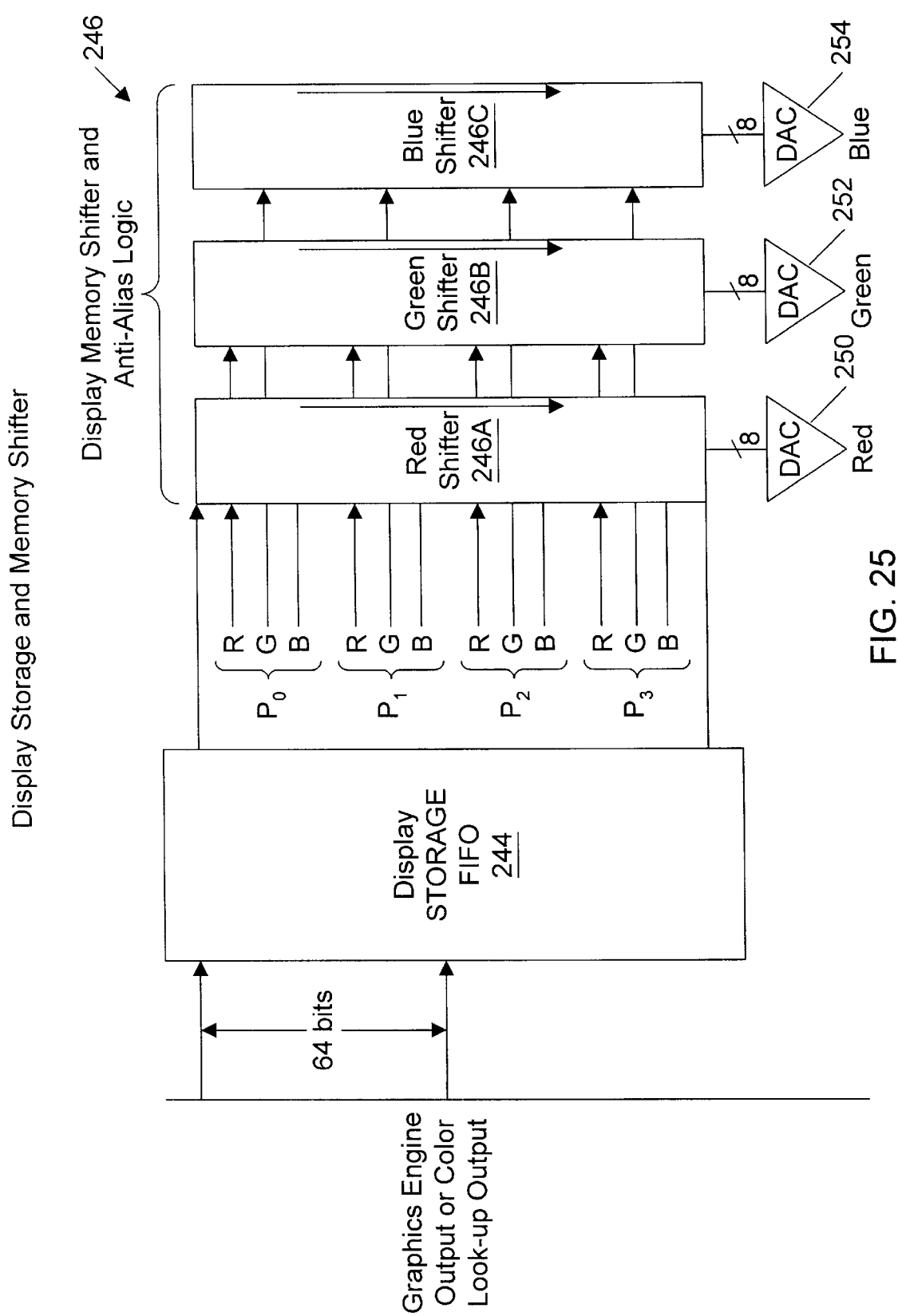
FIG. 25 illustrates the Display Storage and Memory Shifter logic in the graphics engine of FIG. 6.

FIG. 25 illustrates the Display Storage and Memory Shifter logic. As shown, the Display Storage FIFO 244 receives a 64 bit input from the Graphics Engine 212, which may be pixel data output or color look-up table output. The Display Storage FIFO 244 provides outputs to the Display Memory Shifter 246, which here includes the anti-alias logic. As shown, the Display Memory Shifter 246 comprises a red shifter 246A, a blue shifter 246B, and a green shifter 246C. Each of the Display Memory Shifters receive respective four RGB values labeled P0, P1, P2, and P3, as shown. The shifters 246A–246C provide respective 8 bit outputs to DACs 250, 252, and 254.

FIG. 26—Example

Figure 26:
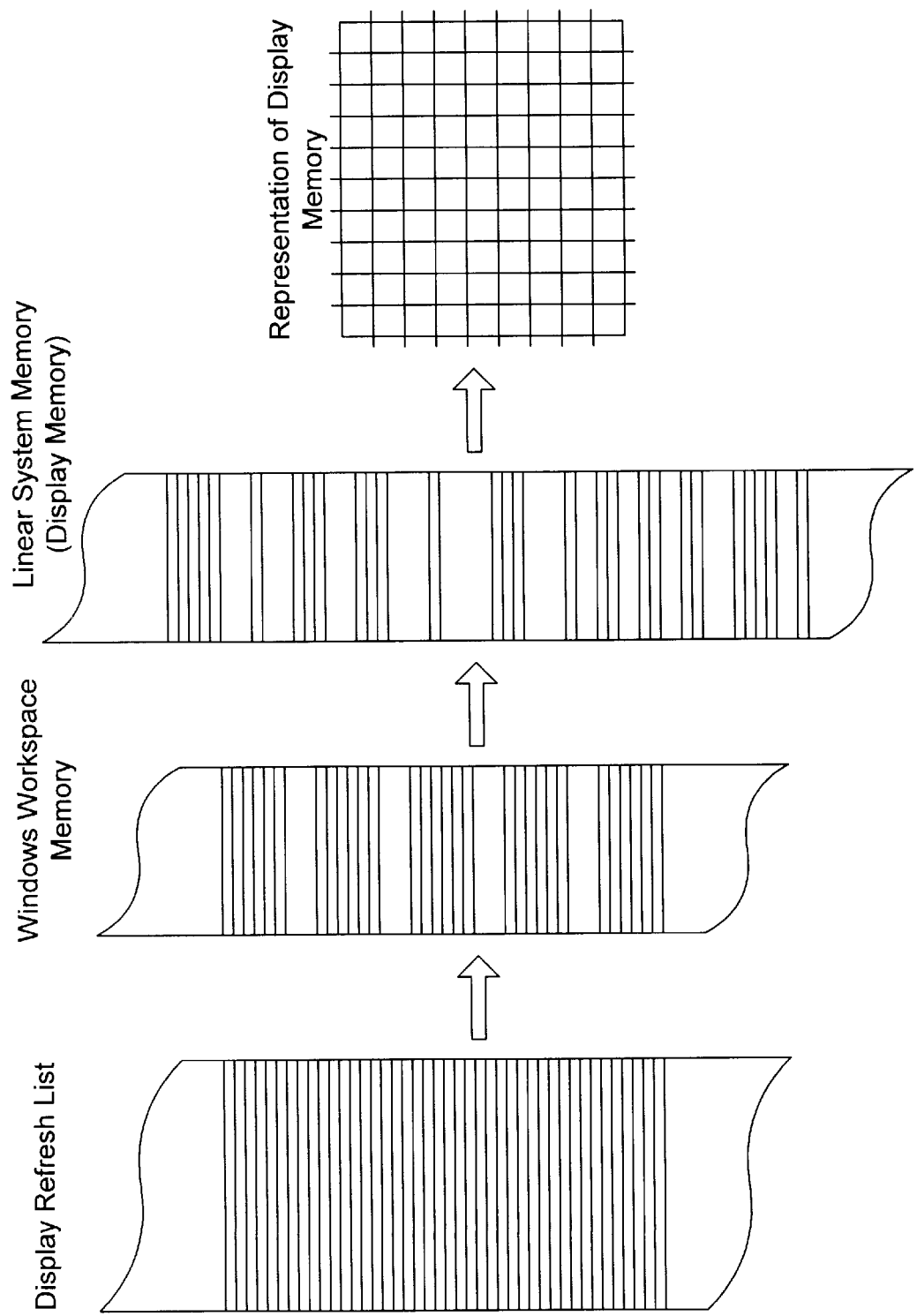

FIG. 26 illustrates an example of the operation of the present invention, including a portion of a display refresh list, a section of windows work space memory, display memory areas, and a 2-dimensional representation of the monitor display. As shown, the display refresh list is shown separately in FIG. 26A, the section of windows work space memory is shown separately in FIG. 26B, the display memory areas are shown separately in FIG. 26C, and the 2-dimensional representation of the monitor display is shown separately in FIG. 26D. FIG. 26E includes a chart explaining the different types of windows.

As shown, the representation of display memory includes windows ID0, ID1, ID2, ID3, and ID4. The display refresh list includes windows workspace dynamic pointer (WWDPntr) values which reference windows workspace areas that in turn include dynamic pointers. The dynamic pointers reference or point to areas in display memory addressed as linear or XY which store data for the respective window or object. As discussed above, the dynamic pointers reference data on a scan line basis for the respective window.

Flowchart—Display Refresh List Execution

Figure 27A:
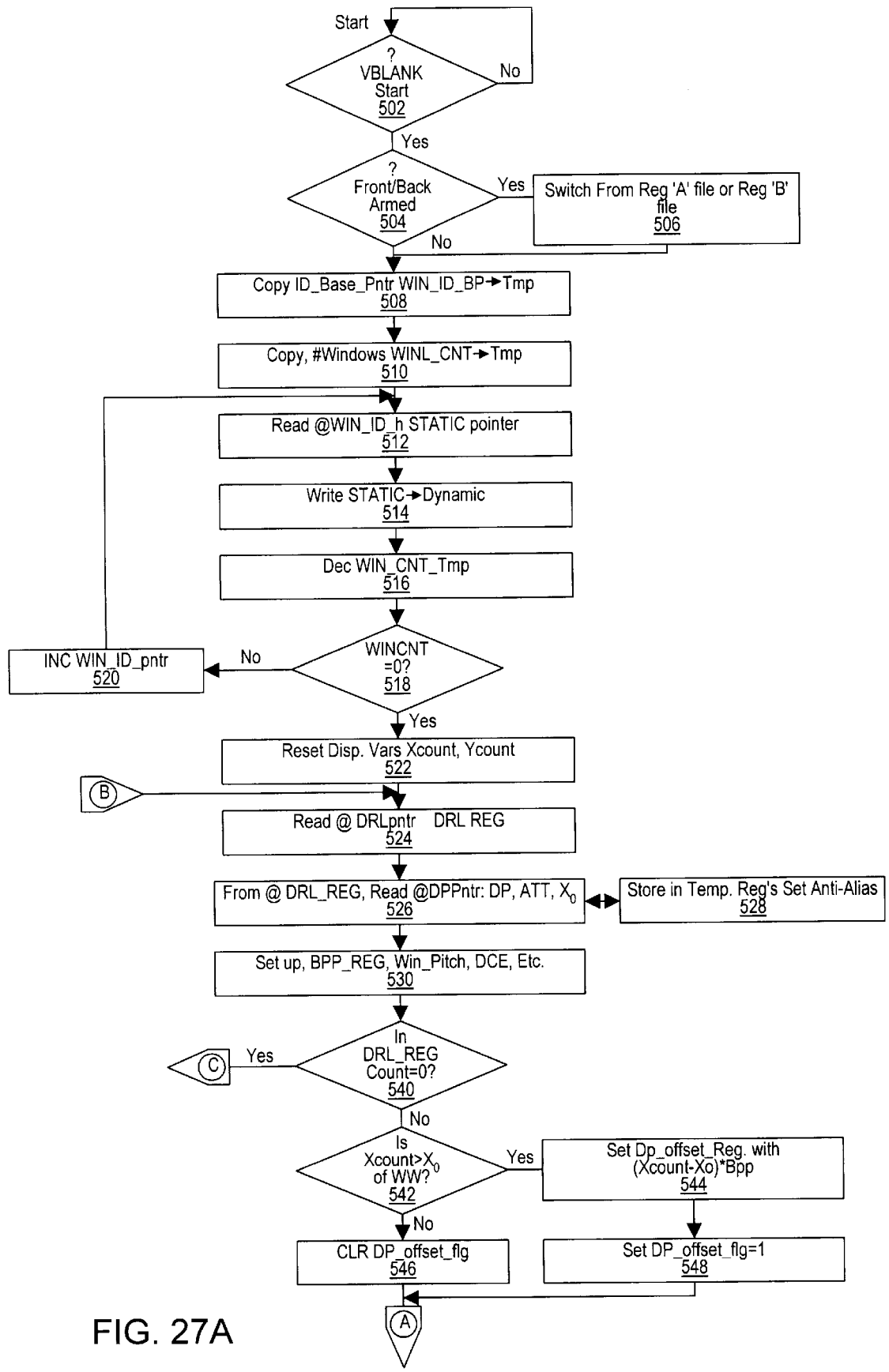
FIGS. 27A and 27B are a flowchart diagram illustrating operation of the Display Refresh List engine of FIG. 23.
Figure 27B:
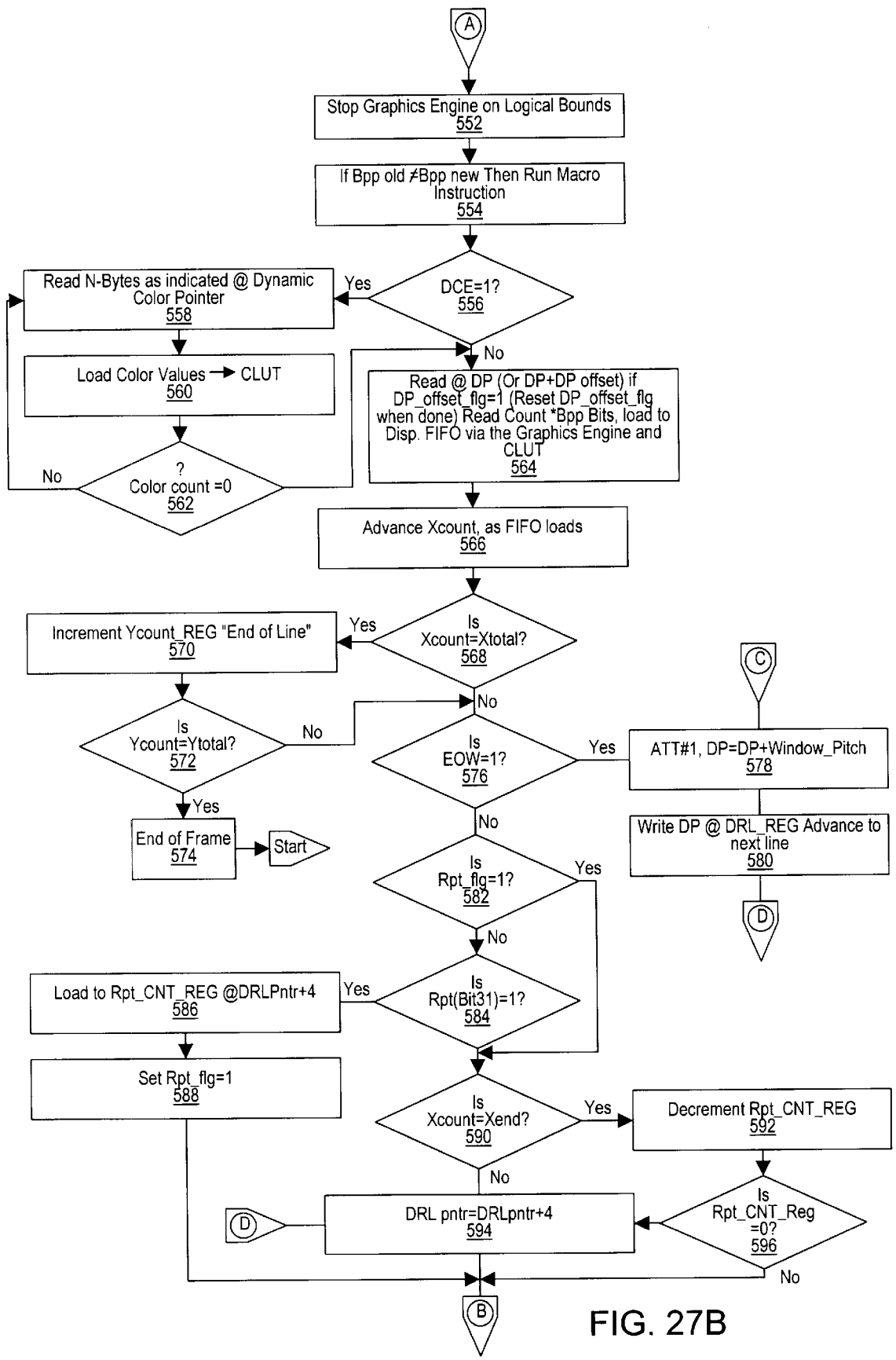

Referring now to FIGS. 27A–27B, a flowchart diagram is shown which illustrates operation of the Display Refresh List engine 270 executing a display refresh list to display a new frame of data. The IMC 140 or DRL Engine 270 executes the operations in the flowchart to read the display refresh list from system memory 110 and retrieve the data from system memory 110 for display on the video monitor 142. The video data is retrieved from system memory 110, is provided to the display FIFO 244 and out through the D to A converters 250–254, thus forming the analog voltages which drive the video monitor 142.

Thus the flowchart diagram shown in FIGS. 27A and 27B illustrates operation of the display list engine executing a display refresh list to present data on the screen. Thus this diagram does not illustrate the assembly operation where a display refresh list is assembled (which is shown in FIG. 14), but rather illustrates the operations that occur during screen refresh to display data on the screen, i.e. to refresh the windows on the screen independently of one another.

This flowchart illustrates a method which is executed by the Display Refresh List Engine 270 shown in FIG. 6. An example which illustrates display of multiple windows is shown in FIG. 26. FIGS. 28 and 29 show two special cases which are accounted for within the flowchart during the refresh operation.

As shown in FIG. 27A, in step 502 the DRL Engine 270 determines if V blank is active, i.e., has the beam scanned the end of the frame and is the blanking term active. If Vblank is active, this indicates that the screen is blank, and that the IMC 140 is required to update all the dynamic pointers which were adjusted during the last refresh period. Logic which updates all the dynamic pointers during the V blank period is shown in FIG. 24. If the screen is not at its blanking interval, then no operations are performed, assuming that all the windows have been refreshed during the active frame.

If the blanking period is beginning, then in step 504 the DRL Engine 270 determines whether the front buffers or back buffers are armed, i.e. a switch from front to back display refresh list should occur.

If a new display list has not been assembled, and this is the same display list that was used for the last frame, and there is no switch signal that indicates a switch from A to B buffers or from B to A buffers, then a front/back switch is not armed, and operation advances from step 504 to step 508. If step 504 indicates that this is time to switch to a new display refresh list, this is performed in step 506 at the V blank period.

The V blank period and the V sync period are basically the same. As is well known in cathode ray tube (CRT) or television technology, two signals are used to synchronize video frames on a screen. The blank signal occurs first and the screen goes black, and the synch signal then occurs to inform the television beam to return to the top of the screen and begin scanning.

If the Armed signal indicates that a switch is necessary between front and back buffers in step 504, then the DRL Engine 270 switches from REG File A to REG File B in step 506. This involves switching the front and back buffer registers 710, 711, 712 and 713 shown in FIG. 23.

In step 508 the window ID base pointer from A or B is copied into a temporary window ID base pointer register. The ID base register pointer is shown in FIG. 24. Thus, if the Armed bit is negative, or after the switch occurs in step 506, in step 508 the DRL Engine 270 copies the ID base pointer to a temporary register, i.e. the TMP_WIN_ID_BP register 742. In step 510 the DRL Engine 270 copies the number of windows required to be refreshed from the window count register to a temporary register, i.e. the TMP_WIN_CNT register 726. In step 512 the DRL Engine 270 reads the window ID value which points to the dynamic pointer of the WW buffer which is stored in the temporary register 742. The value obtained is the dynamic pointer. The desired value is this dynamic pointer plus one word. In step 514 the static pointer value is written to the dynamic pointer. Thus the address contained in the TMP_WIN_ID_BP register is the address pointing to the dynamic pointer, which is where the static pointer has just been written. In step 516 the DRL Engine 270 decrements the windows counter which holds the total number of windows being refreshed.

Therefore, steps 508–516 operate to refresh the dynamic pointer values to the static values, i.e., return the dynamic pointer values to the top of the respective windows. This initializes the dynamic pointers for another active frame.

In step 518 the DRL Engine 270 determines if the Win_Cnt value is zero, indicating that all the windows have been completed. If the windows haven't been completed, then in step 520 the window ID counter is incremented to point to the next pointer in the windows ID space, which then points to the next window in the windows work space. Thus one is added to the value, and the value is reloaded into the register. Operation then returns to step 512. Steps 512–518 repeat until the window count value is equal to zero.

When the window count value is equal to zero, all of the windows are located in the ID list as pointers and all of the values in the windows work space, static pointers and dynamic pointers are equal. In other words, for every static and dynamic pointer, all the dynamic pointers in the windows work space are now equal to the value that was programmed to the static pointer. This resets the refresh mechanism for the next active frame.

In step 522 the DRL Engine 270 resets display values, including values such as X count and Y count. In a typical electronic circuit for creating the vertical and horizontal synch circuitry, every time a V synch pulse occurs, the counters are reset for the next frame, and this occurs in step 522.

Beginning at step 524, the DRL Engine 270 begins the process of executing the display refresh list. This involves traversing the display refresh list, reading the display memory and transferring the data into the output FIFO. Therefore, steps 502–522 perform the process of initialization of the dynamic pointers at the V blank period. This logic is illustrated in FIG. 24, and pseudocode for this logic is included above with reference to FIG. 24.

In step 524 the DRL Engine 270 reads data from the location pointed to by the display refresh list pointer and places it into an internal register referred to as the Display Refresh List register (DRL_REG), which is shown as register 714 in FIG. 23. The value in the DRL_REG 714, or the display refresh list register, is actually the first word of the display refresh list. The display refresh list includes all the information to direct the IMC to display the appropriate data, i.e., drive the appropriate signals, as output to the screen in a very efficient manner.

Figures 26A, 26B:
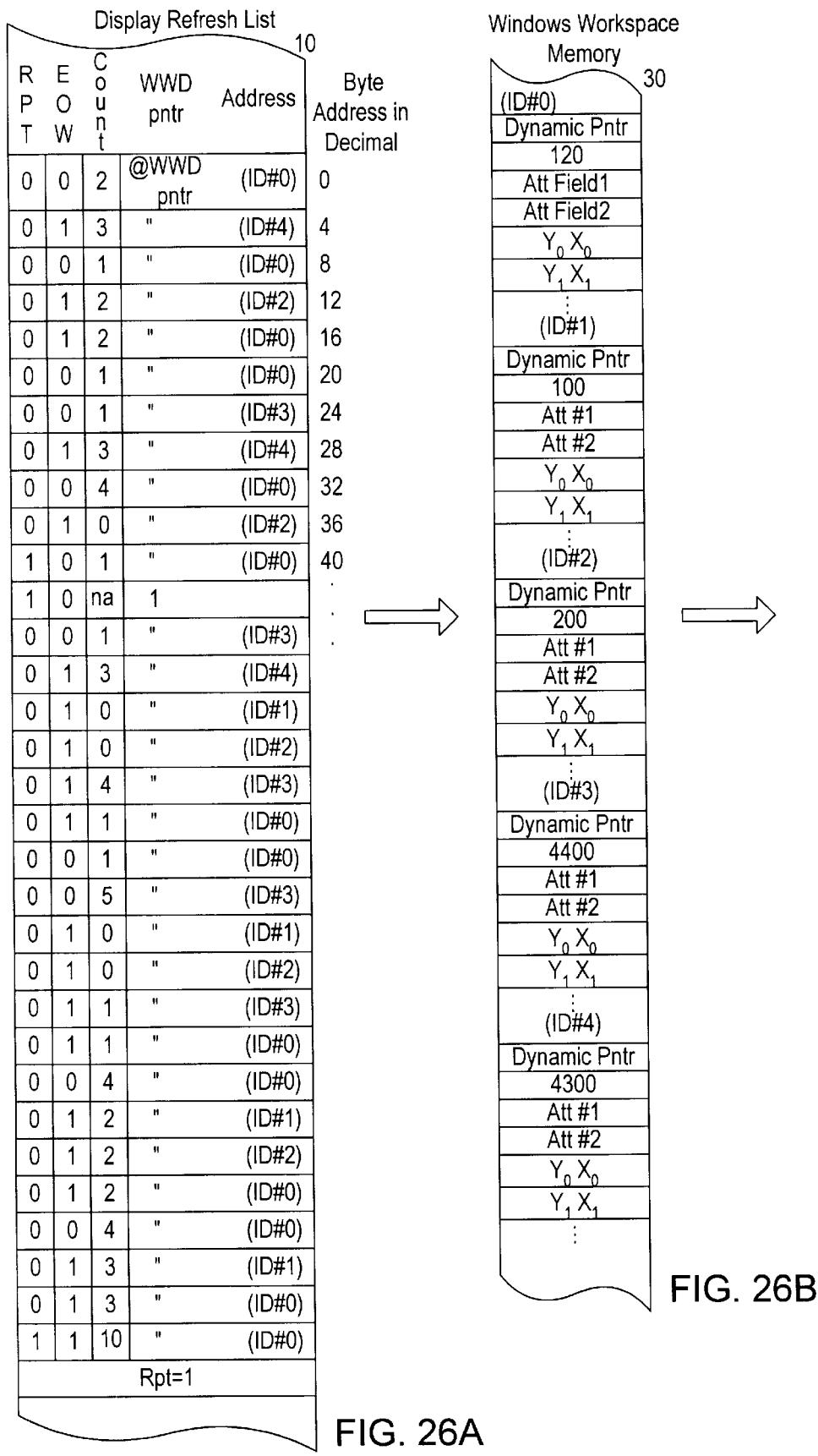

In step 526 the DRL Engine 270 reads the values which are located in the windows work space memory pointed to by the WW pointer 727 from the display refresh list register 714. First, the display refresh list register contains the address of the first word in the windows workspace buffer. This word is the windows work space dynamic pointer address and was read in step 524. The word read in step 524 is the first word in the display refresh list as shown in FIG. 26A, which is the actual DP pointer. This value references to the windows work space memory.

In step 526 a number of values are read from the windows workspace, including the actual dynamic pointer address, the attribute fields 1 and 2 and the Y0/X0 field. These values from the windows work space memory are stored in registers 715, 716, 717, and 718 as shown in FIG. 23. Values from those registers are extracted from respective fields and are stored into temporary registers 729, 730, 731, 732, 733, as discussed above with reference to FIG. 23. As shown in FIG. 23, the registers 729, 730, 731, 732, 733 store values for Window pitch, Bpp (bits per pixel), Dcptr (Dynamic Color Pointer), DC cnt (count), and X0, respectively. These values are then used during subsequent portions of the method.

As discussed with reference to FIG. 23, attributes from the windows work space are split out into a count field, a pointer field and a flag field, and these values are stored in registers 726–728. This completes the data fetch for that particular window. This information is manipulated as described below to read the correct video data from display memory for each scan line. The video data is provided to the device's display FIFO and is eventually shifted out to the DACs.

Referring again to FIG. 27A, in step 540 the DRL Engine 270 determines if a count value stored in the temporary count register 726 is equal to zero. This count value is provided through a bus to counter 750, without being altered, and the value is examined in the zeros detector, block 755. If the count value is equal to zero, then a special case arises, and the DRL Engine 270 branches at point C to FIG. 27B, as shown. This occurrence is a special case and occurs where a window is totally occluded by another window. In other words, the address of the window where the next draw is to begin is occluded by another window.

FIG. 28 illustrates an example of this special case and shows a diagram with window A and window B. Reference numeral 1 indicates where the dynamic pointer is currently pointing to. Here it is assumed that window B is behind window A. As shown, window B is not visible until it comes out from beneath window A. Unless the special case were taken into account, then the DRL Engine 270 would scan down the lines until the end of window A and the start of the visible window B, indicated by 2, and the dynamic pointer would still reside up at the address defined by number 1.

Thus, in the special case, which occurs if the decision in step 540 is true, and which is indicated by the flowchart on FIG. 27A, entry point C, the DRL Engine 270 adds a value referred to as the window pitch value. The window pitch value is added to the dynamic pointer of window B for every line to get to position #2 in FIG. 28 with the correct dynamic pointer in the display buffer. The DRL Engine 270 also accounts for whether the windows are in XY addressing format or are in linear addressing format.

As mentioned above, the present invention can use linear addressed or XY addressed memory. It is noted that, in linear mode, the window pitch is the amount of memory that needs to be added to the current position, i.e., a memory address in bits until the next line of display is reached. The memory address is for the next line of that particular window and not the next line of the start of screen. Thus, in the linear case, each line is compressed back to back. The small amount of dead space between the end of one linear addressed line and start of another is ignored. The pitch value is part of the driver software initialization of the windows work space. The pitch value is equal to the number of X pixels times the number of bits per pixel.

If XY formatting is used, the window pitch value, or the address offset, is actually a much larger value which is dependent on where the XY positioning is in memory at the time when the graphical data from the graphics or execution engines data is drawn. As shown, in order to get from the start of L0, which is where the dynamic pointer actually starts pointing, to the start of line 1, the window pitch is a fairly large number of pixels. Again, the window pitch is an offset value and is calculated again by the windows driver during initialization of the windows workspace buffer.

In short, when a window is occluded by another window, the dynamic pointer of the occluded window (the one hidden) is updated on a line by line basis in such a way that if the window ever becomes visible on the screen, i.e., appears from behind the other window, the dynamic pointer points to the correct starting position of the window that is now being displayed. This is accomplished by the special case of putting the count register to zero, which disables drawing of any pixels. The window pitch value from the windows work space is added to the current display pointer to advance the display pointer to the next line. This is shown in steps 578 and 580 in FIG. 27B.

Thus the window pitch is added to the display pointer from the attribute #1 register in step 578, and then that value is written back to the dynamic pointer pointed to by the DRL register in step 580, which points to the first X0 position of the window within the windows work space. The DRL REG pointer points to the windows work space dynamic pointer. Thus, this in effect increments the dynamic pointer for a hidden window, and the flowchart then advances to point D at step 594. In step 594 the DRL Engine 270 updates or increments the display refresh pointer by 4 bytes, wherein the display refresh pointer now points to the next entry in the display refresh list. Operation then returns to point B at FIG. 27A.

Referring again to FIG. 27A at entry point B, in step 524 the DRL Engine 270 reads a new display refresh list register. In step 526 the DRL Engine 270 uses this information to set the temporary registers, including the dynamic pointer, the attribute field, and the X0 values. In step 526 the DRL Engine 270 also stores values for anti-alias and other information bits. In step 530 the DRL Engine 270 then stores values in various registers, including the bits per pixel register, the window pitch, the dynamic color enabler, etc. In step 540 the DRL Engine 270 again determines if the count field of the particular window is equal to zero. Here it is assumed that the particular window is not equal to zero.

Here the second special condition arises, as shown in FIG. 29. In step 542 the DRL Engine 270 determines if the current X count or the current position on the line is greater than the value of X0. The Xcount value represents the current X position of the display monitor and is incremented by the video timing 705. If the current X count value is greater than X0, then special case number two arises, as shown in FIG. 29.

FIG. 29 illustrates the case where two windows are displayed and part of the first window that is being drawn (which is pointed to by the DP pointer) is occluded behind another window, but will be visible after a few pixels, or after some period of time, on the same horizontal line. Thus, in this case, an offset address is created which is then added to the dynamic pointer. Since that window is not being displayed, it is desirable to start the refresh operation from a position that is the dynamic pointer plus the offset. This is indicated by the comparison between the present screen position counter and X count. When the Xcount value is greater than the X0 value of that particular window, the special case creates the offset to add to the dynamic pointer value. As noted above, Xcount is the current value of the scan line in the horizontal position, and X0 is the start of that particular window where the X coordinate for the dynamic pointer points to. Thus an offset register is created to accommodate this situation.

In step 544, the DRL Engine performs the calculation and stores the result in the offset register DP_Offset_REG and in step 548 sets a DP_Offset flag equal to one. The flag is set because this value actually gets loaded in at a later time, but there has to be an indicator that it needs to be loaded in. This is done to clear any pending flags from the previous operation. Operation then advances to FIG. 27B at step 552.

Referring now to FIG. 27B, in step 552 the DRL Engine 270 first stops the Graphics Engine 212 on a logical bound in order for the Graphics Engine 212 to begin fetching window pixels from the display memory 110 into the display FIFO 244 on board the IMC 140. The Graphics Engine 212 is stopped to enable the Graphics Engine 212 to perform the transfer of video data from the memory 110 to the video monitor 142, i.e. to actually fetch the display pixels, in addition to its bit blit duties. Thus the present invention uses the Graphics Engine 212 to actually load the display refresh mechanism. This is a novel use of the Graphics Engine 212 for both graphics and display refresh operations.

In step 554 the DRL Engine 270 determines if the number of bits per pixel is the same. If not, the DRL Engine 270 executes a macro instruction which involves reconfiguring the Bit-wise Barrel Shifter 625 (FIG. 20) to a different number of bits per pixel format. Other muxes within the system also change accordingly, as described above. Thus, if the number of bits per pixel currently being used by the Graphics Engine 212 and the number of bits per pixel required for the refresh operation is different, then the microcode load loop is executed to reconfigure to a new bpp (bits per pixel) format within the Graphics Engine 212.

The Graphics Engine 212 also preferably saves it current context. The DRL Engine 270 preferably stores the temporary control state of the Graphics Engine 212, i.e., the control state for an instruction or operation that is traversing through the pipe, such as a polygon draw command. It is not necessary to store all of the registers that reside within the Graphics Engine 212 if the number of bits per pixel (context) has not changed. As discussed above, Temporary Storage Registers 665 save the context of the Graphics Engine 212 in order for the Graphics Engine 212 to perform the display refresh of the pixels for that particular window.

Thus, if the number of bits per pixel from the prior loaded operation, i.e., the operation previously loaded for the Graphics Engine 212, is the same as the number of bits per pixel that is read from the attribute #1 field during the windows refresh, the process is simplified because the Graphics Engine 212 is not recalibrated or reconfigured for a different bit width. Thus, if the bits per pixel are the same, the macro instruction is not required to be executed in step 554 to reset the Graphics Engine 212.

In step 556 the DRL Engine 270 determines if the dynamic color enable (DCE) or secondary window overlay bit (OVLY) bit is set within the attribute field that was obtained as parameters from the windows work space buffer. As discussed above, and as shown in FIG. 19, the attribute field number 1 includes the dynamic color enable bit and the secondary window overlay bit. The DCE bit, when set, indicates that this window requires a special color palate code in order for proper function, for proper color set of the color palate. When the DCE bit is 1, then attribute field #2 is read to obtain the dynamic color pointer. The dynamic color pointer value points to an area in the system memory 110 storing two control values that are loaded into the engine. As shown in FIG. 23, the DC pointer and DC count values are read from system memory 110 and stored in registers 731, 732. Similarly, the window overlay bit indicates an overlay of a first window on top of a second window and references pointers to color compare values used in the overlay process.

As shown in FIG. 23, register 731 stores the dynamic color table pointer, which is the address of where the data is loaded. One of the first attributes of that is the dynamic color address for the palate and the count, which indicates the number of color palate registers to load, which data then is contained within that dynamic color section that is pointed to again by the dynamic color register.

Figure 30:
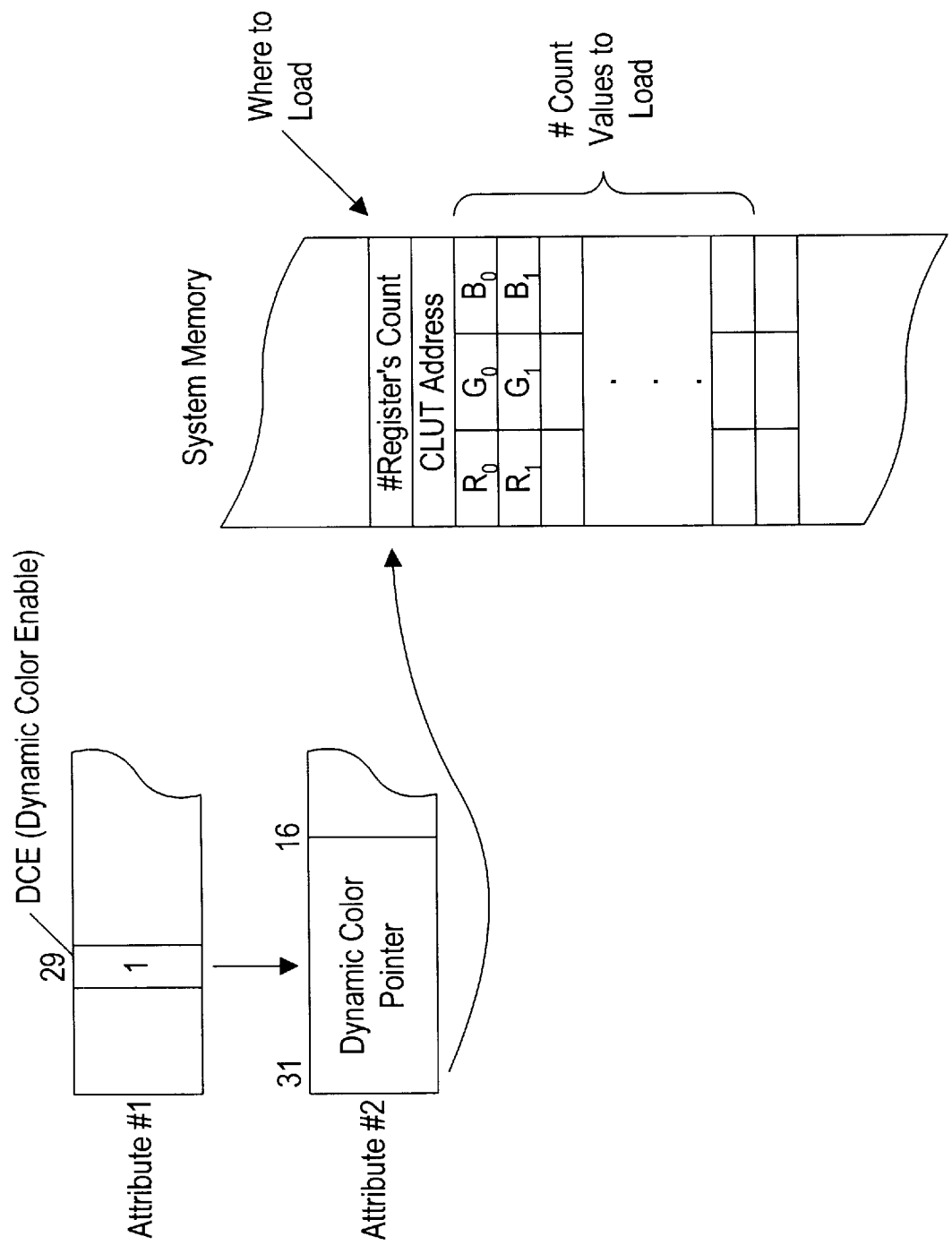
FIG. 30 illustrates operation of the dynamic color allocation method of the present invention.

FIG. 30 illustrates the dynamic color allocation method. As shown in the Attribute #1 field, the DCE (dynamic color enable) bit 27 is set. Thus the dynamic color pointer points to an area in system memory 110 where the color values are stored. These color values are loaded into the IMC at this time. The first value is the count, which indicates the number of color registers to load. The second value is the address of the internal IMC block, i.e., for the color palate. The remaining values are the RGB values which are loaded into the color look-up table. This allows a dynamic adjustment during refresh of the color register values which provide more flexible and improved operations.

Referring back to FIG. 27B, if the DCE bit is equal to 1 in step 556, the DRL Engine 270 reads N bytes indicated by the dynamic color pointer address, as described above. In step 560 the DRL Engine 270 loads the color values and decrements the count register. In step 562 the DRL Engine 270 determines if the count is equal to 0. When the count is zero, this indicates that the dynamic color enable is completed. The color palate has received new values in it for that particular window in which that window is about ready to be refreshed into a display FIFO. At this time, in step 564 the DRL Engine 270 finally loads the dynamic pointer, or uses the address at the dynamic pointer to actually start reading data into the display FIFO.

In this step 564, if the DP offset flag is set, then there is an additional add into the display pointer in order to provide the correct offset value to start loading pixels into the display FIFO. Here the Graphics Engine 212 reads the # count field, which is the number of x pixels times the bits per pixel into the display FIFO. This is the actual process of reading the display memory into the FIFO.

In step 564, the DRL Engine 260 reads the video data from display memory that is pointed to by the respective dynamic pointer. The counter 750 (FIG. 23) counts the reads and indicates when the read for this respective window and this respective scan line is complete. For every read that occurs, the counter counts until the zero's detector 755 indicates that the count is completed. When the count is done, indicated by block 755, the process then advances to step 566.

In step 566 the X count is advanced the correct number of pixels. The FIFOs have been loaded with X pixels and the actual X count then increments to the next window. In step 568 the DRL Engine 270 determines if the X count is equal to the X total value in register 705. As describe above with reference to FIG. 23, the X total register in the video timing generation block 705 indicates the number of X pixels or width of the screen. When the count is equal to that total, this indicates that a horizontal line has been completed. If the Xcount is equal to the X total in step 568, then in step 570 the DRL Engine 270 increments the Y count register to another line and indicates an end of line signal.

In step 572 the DRL Engine 270 determines whether the Y count has reached the Y total which is the number of lines on the screen. If so, then the DRL Engine 270 has reached the end of the frame, and the DRL Engine 270 returns to begin at the V sync operation, V blank operation, all over again. If Ycount is not equal to Ytotal, and the DRL Engine 270 has not reached the end of screen, then in step 576 the DRL Engine 270 determines if the end of a window has been reached by checking the value of an EOW bit. The EOW bit is a bit set in the actual display refresh list which indicates that a particular window is at its end.

This is explained further in the example of FIG. 26. Consider window ID #3, which starts at position X1, ends at position X2, starts again at position X5, and ends at position X8. Because ID number 2 is a hidden, occluded window, the refresh counter would actually indicate that it was necessary to increment ID #2, according to special case number 1, indicated earlier. The present invention includes a mechanism which indicates that that particular window has reached the end of count. This is necessary to increment the dynamic pointer to the next line of the window.

If the EOW bit is 1, then in step 578 the window pitch value is added to the dynamic pointer value to achieve the new dynamic pointer address for the next line. Once the new dynamic pointer address is obtained, in step 580 the DRL Engine 270 writes new dynamic pointer out at the address pointed to by the display refresh list register. Thus the next time the DRL Engine 270 reaches this line this window is activated again with the right dynamic pointer value.

If the EOW bit is not equal to one in step 576, then it is assumed that the window is not over yet and it is actually hidden by another window and will reappear before the end of the horizontal line. In step 582, the DRL engine 270 determines if the repeat flag has been set to a one. When the repeat flag is 1, this indicates that the next sequential line is to be processed with the same control parameter as the previous line. If step 582 shows a repeat flg =1, then states 584 and 586 are skipped and it is assumed that the previous line was also a repeat count line. If in state 582, the repeat flag is not set, this indicates the first line of a repeated line is to follow. In this instance, in step 584 the DRL Engine 270 determines if the repeat field (bit 31) in the display refresh list is set. This indicates that the next N lines, for example, have exactly the same display refresh list word per refresh as the previous lines. This is necessary because in many instances one window on the screen has a large number of repeated scan lines, and it is undesirable to use a large number of lines of display refresh memory for repeated lines. Thus the repeat count acts as a compression technique for the actual display refresh list.

If the repeat count is equal to one in step 584, then the next word after this word with the repeat count set to 1 is actually repeat count value. In step 586 the repeat count value then is used to load the counter to determine when the repeat count has exhausted to zero and when a new address in the display refresh needs to be fetched. In step 588 the repeat flag is set to a 1, and the display refresh pointer continues on fetching windows along that horizontal line until it reaches the end of the Xcount, where if the Xcount is equal to the X-end, the repeat count register 750, is decremented by 1 count to represent that it is now past 1 count, the repeat count, and the process begins again.

In step 582 the DRL Engine 270 determines if the repeat flag is already set, indicating that the DRL is already in a mode of repeating lines. If a repeat flag has not already been set, then in step 584 the DRL Engine 270 determines if the repeat count bit is equal to one, which indicates that the engine 270 is at the start of a horizontal line and there is a number of identical (i.e. pointers are the same) repeated lines within that horizontal scan line. It is noted that identical lines merely indicates that the pointers are the same, not that the video data referenced by those pointers is the same. If the repeat count bit is equal to one, then the count is loaded into the Rpt_cnt_REG for the number of lines that are duplicates, and a repeat count flag is set.

Once this is accomplished, the flowchart returns to B at step 524 and begins fetching other display refresh values for the span line. It is noted that the horizontal span line may have multiple windows. When the DRL Engine 270 again reaches step 584, if the repeat flag is equal to one, then operation advances to step 590. In step 590 the DRL Engine 270 determines if the Xcounter is at the end of a horizontal line. If so, then the repeat count value is decremented. Once the repeat count value reaches zero, the display refresh pointer is incremented by 1 word to point to another entirely new horizontal line which has different window positions from the previous ones where the repeat count value was set.

Window Assembly Example

Referring now to FIG. 26, the following is an example which illustrates how windows are actually assembled on the screen. FIG. 26 illustrates a display refresh list, a windows work space memory, display memory areas, and a 2-dimensional representation of the monitor display. As noted above, the display refresh list is shown separately in FIG. 26A, the section of windows work space memory is shown separately in FIG. 26B, the display memory areas are shown separately in FIG. 26C, and the 2-dimensional representation of the monitor display is shown separately in FIG. 26D. FIG. 26E illustrates a chart explaining the different types of windows in FIG. 26.

FIG. 26 includes 5 windows in the display memory which are refreshed out to the screen. Certain of the windows are in XY address format and other windows are in linear address format. Different formats may be used because some rendering engines or rendering software desire the ability to render triangles or other polygons in XY format instead of linear format, while other operations are more efficiently performed in linear mode.

As shown in the chart of FIG. 26E, window #0, which is the background window, has 1 bit per pixel and is XY addressable. Window #1, indicated on the display, is 32 bits per pixel with XY addressing. Window #2 is 8 bits per pixel and includes linear addressing. Window #4 is 16 bits per pixel and includes linear addressing. As shown, the screen pitch is assumed to be 4,096 pixels, which is not relevant for this diagram.

As shown, the linear system memory or display memory is designated as FIG. 26C. The right side of the linear system memory includes the byte address in decimal format. Referring now to ID0, which is the base window, and which again is in XY addressing mode, pixels 0–7 and pixels 8 and 9 start at decimal address 120, which indicates the first line of window #0. A pitch of 4,096 is added to this value. Thus the next line number, line #2 of window #0 is located at 4216 and 4217. Continuing down to the next line, another 4,096 is added, and so on. This is how the window is formatted in XY space.

In a similar manner, window #1, which is 32-bits per pixel, begins at decimal address 100. The first line of window #1 extends to decimal address 109. Window #1 is only three 32-bit pixels wide, so the first line does not consume very much memory space. When the memory pitch is added to this value, the next line, line 2, of window #1 is located at 4196 in decimal memory space. This line extends from 4196 to 4205.

Window #2 is an 8-bit per pixel linear address window and begins at address 200. The line for window #2 extends from address 200 to address 212. This window is a linear window and is 8-bits per pixel, and thus window #2 aligns without any gaps. As an example, the window pitch value for this particular window is 0, because the start of one line abuts directly to the start of another in that linear memory space.

Window #3 is similar to window #2 and begins at address 4400. Window #4 is a 16-bit per pixel linear window which starts at address 4300 and finishes at address 4324. Since these last windows are 8-bits per pixel and 16-bits per pixel, the windows align linearly without requiring any window pitch value associated with them. In contrast, the XY address windows require a window pitch of 4,096 decimal.

Referring now to FIG. 26A, a display refresh list is shown. The top of the display refresh list begins at the top left of the display screen. As shown the repeat count is 0 because the second line changes from the top line. The end of window field (EOW) is 0 because the window does not end until the window reaches the X-9 pixel position. The WWVDPntr for the first entry is ID#0 or window #0, which references the dynamic pointer in the windows workspace that actually points to the video data in system memory 110. The count for the first DRL entry is 2 pixels, and thus two pixels are read from the memory area pointed to by the dynamic pointer. The dynamic pointer in the windows work space memory for this entry is the top word of ID0. Thus the dynamic pointer points to the display memory address 120. The DRL Engine 270 reads pixel 0 and pixel 1 from this memory area and assembles those pixel values into the FIFO.

It is noted that as pixels are loaded into the FIFO for display, an accompanying tag is included which indicates the storage mechanism. Thus, when those pixels are output out of the FIFO, the color lookup table was correctly configured for delivery of RGB values for those pixels.

Therefore, after these two pixels are drawn, the next display refresh pointer points to the next word, which is at address byte decimal address 4 of the display refresh list. Here, the end of window bit is set and the count is 3. This indicates that this window ends on this particular load of the FIFO and that the dynamic pointer for this entry must be updated with a pitch. In this example, window #4 is a 16-bit per pixel linear window, and thus the WWD pointer is read and references the dynamic pointer value from the windows workspace memory, which then points to the display memory at address 4300. Thus here the DRL Engine 270 reads out pixel 0, pixel 1, and pixel 2 from that particular area of memory and provides those 16-bits per pixel values into the FIFO on board the IMC. Since the EOW bit is set for window #4, the dynamic pointer is then updated with the pitch in the windows workspace memory block to point to the first pixel in the line, i.e., the next horizontal span line, for window #4. Once the count value of 3 is decremented, the next value pointed to by the display refresh pointer is read.

The next display refresh entry is for window 0 or ID#0 and has a count of 1. The WWDPntr in Window #0 points to the dynamic pointer in the windows workspace of widow #0. This dynamic pointer has not been changed and still points to the same scan line of window #0 data. Here the count is used to indicate that the data should be retrieved beginning at X5. The X5 is an offset to the dynamic pointer which enables the DRL Engine 270 to read the correct video data or pixel data from the display memory into the input FIFO. Thus here the dynamic pointer still points to the first pixel in this window. The value of the offset is calculated to indicate the beginning memory address where the pixel data is retrieved for this location in the scan line. The DRL Engine 270 multiplies the offset value of 5 by the number of bits per pixel, which produces the address to begin reading video data or pixel values to load into the FIFO. Once this one pixel is loaded into the FIFO, the next display refresh list pointer entry is read.

The next display refresh list pointer entry includes a WWD pointer for window #2. The entry also includes an end of window (EOW) flag set to true and a count of two. The WWD pointer references or points to the dynamic pointer in the windows workspace of window #2, and the dynamic pointer points to a display memory area at address 200. Here the DRL Engine 270 loads 2 pixels from this memory area. This data is stored in a linear memory format, and since the EOW field is set, that window's pitch is added to the dynamic pointer. Here the pitch value is 0, since the data is in linear memory with 8-bits per pixel, and thus the data aligns to the memory pitch.

The next display refresh list entry is for the base window or window #0 (ID#0). This entry includes the end of window (EOW) flag set, and a count of 2, indicating two more pixels from window 0 are to be drawn. Note that in this example, the dynamic pointer for window ID#0 is still pointing to pixel position ($Y_0$, $X_2$). This is a case where the X value of $X_2$ is less than the X count value of $X_8$. The DRL engine 270 checks for such a case as indicated in the flow chart of FIG.

27. If true, the value of $(X_8-X_2) * Bpp$ is added to the dynamic pointer to adjust its position to point at the non-occluded portion of window #ID0 at pixel position $X_8$.

Window #0 is an XY window, and since the EOW flag is set, the display pitch of 4,096 is added. The display pitch brings the dynamic pointer address to point to the next horizontal span line, line Y1, in the display memory, which in this example is located at decimal address 120 within the display memory. At this point, the X traversal is equal to the Xtotal, which indicates the end of the scan line for the display. The line counter is incremented and the next refresh entry value is read.

The next refresh entry indicates one pixel from window 0. The next display refresh entry indicates one pixel from window #3 and so on. Thus, FIG. 26 illustrates how entries in the display refresh list reference video data stored in memory areas in the system memory 110. The display refresh list entries are used to obtain the correct data for each window or object on a span line basis during screen refresh.

Screen Refresh Rate Edge Anti-aliasing and Filter Method

As described above, data is read from the main memory 110 according to the Display Refresh List requirements described above. As the data traverses through the internal IMC 140 serial shift FIFO, the edge anti-aliasing method of the present invention occurs. This method is enabled by the attribute bits located for each window in the window workspace flags located in system memory 110. Each window workspace contains an enable flag for smoothing. If the flag is enabled, filtering is accomplished by the edge anti-aliasing and filter method of the present invention.

Figure 31:
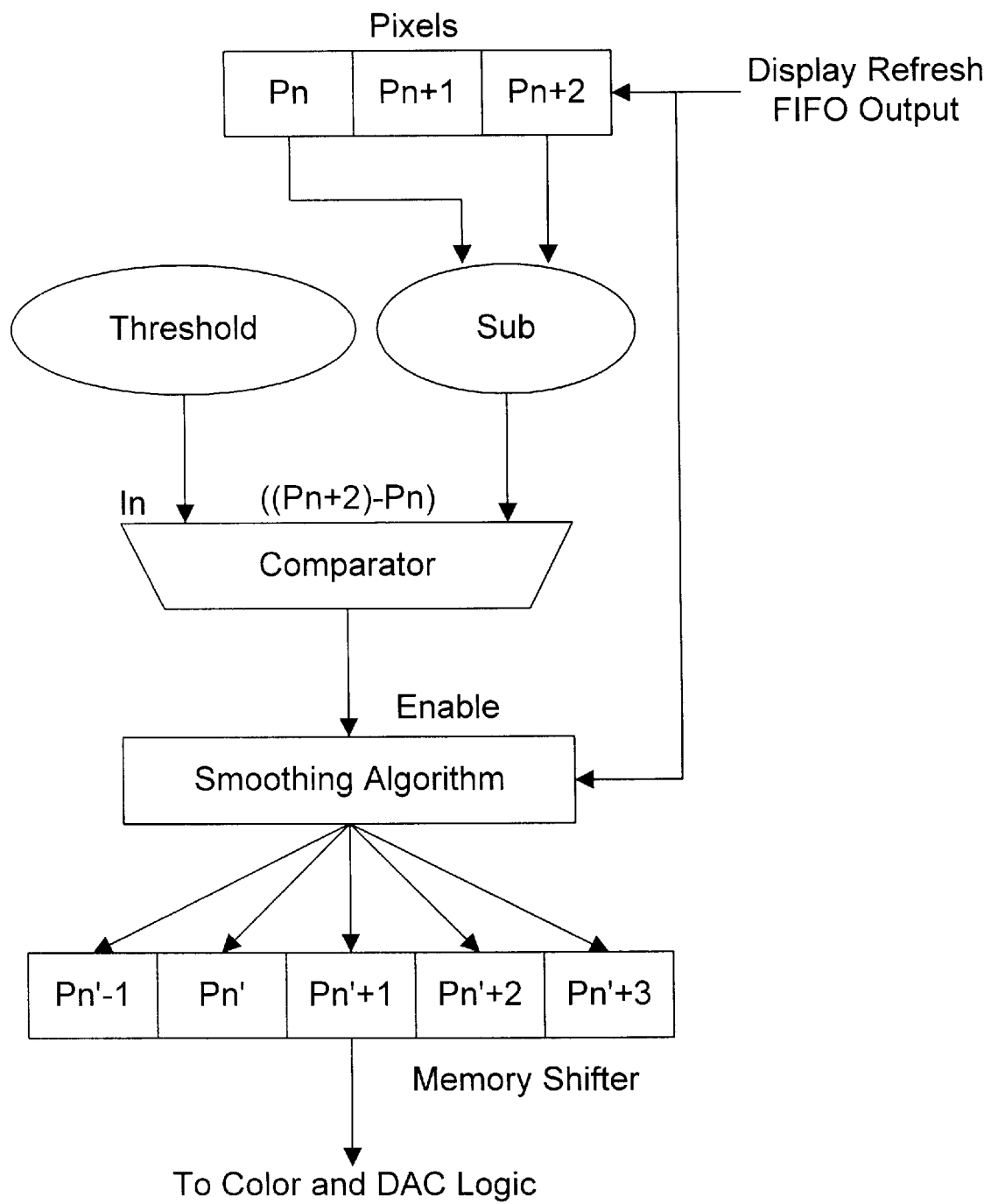
FIG. 31 illustrates a screen refresh rate edge anti-aliasing and filtering method according to the present invention.

The screen refresh display input data which is output from the display FIFO is compared against predetermined threshold values. Threshold values represent the delta change in intensity or color from the last samples taken. It is noted that, since the eye recognizes abrupt changes in intensity more than color, the effect only blends areas where the eye is more sensitive. The result of such a detection is the automatic blending and smoothing of the area around the abrupt change in intensity. This technique provides continuous filtering of image data for all graphical information displayed. FIG. 31 shows the data path for edge detection and anti-aliasing logic.

In the preferred embodiment, two modes of operation are available. The first is a continuous smoothing method where the intensities are set to always compare. This implies that each old pixel is blended with the last new pixel in the X dimension. Another method is to weight the blending depending on the degree of change of intensity.

As shown in FIG. 31, data enters the IMC 140 for assembly into the display memory shifter. Before such assembly occurs, the data is continuously monitored on a per window basis for a large delta change of intensity between a group of neighboring pixels. Each pixel is sampled and subtracted for a comparison to the threshold level stored as a constant value in an IMC register. If the threshold values are surpassed, then the smoothing method of the present invention begins. As data is moved from the input latches to the display FIFO an averaging of the intensities occurs. The method uses variables to adjust the degree of smoothing the area in which smoothing is to be done. Smoothing follows a Gaussian distribution curve around the area of highest threshold changes.

X Y, Z Compare Registers and Relative Z Addressing

The present invention includes a novel system and method which uses X, Y, Z compare registers and relative Z addressing to reduce the amount of Z-buffer memory required. The X, Y, Z space of an object is referred to as a bounding box. Thus, when two objects collide, collision detection is valuable, because most applications are required to know when two objects hit each other. For example, consider kinematics where two rubber balls come together. Here the application must reprogram the interface so that the two objects bounce away from each other, or have some elasticity. When the collision occurs, the host CPU is interrupted to inform the application. The present invention only compares the X, Y, Z space of a first object with the X, Y, Z space of a second object if the Z components of the two objects intersect. When the present invention compares the X, Y, Z space of a first object or window with the X, Y, Z space of a second object or window, if a collision occurs, then the Z comparator operates using a relative address to only a new X, Y, Z space encompassing both objects. In other words, the application only allocates enough depth memory equal to the depth memory required for both bounding boxes rather than requiring an entire Z-buffer corresponding to an entire screen memory area. This reduces the amount of Z-buffer memory band width required for 3D animation. Thus, the Z-buffer compare is only required for the union of the bounding boxes not the entire frame. The Z-buffer memory is dynamically allocated and the addresses are relocated based on where the union of the bounding boxes occurs. In one embodiment, this feature is extended to "N" XYZ registers for multiple bounding boxes.

Thus, the IMC 140 maintains an absolute Z-buffer origin address and relative screen addresses. When two objects or two bounding boxes collide, the Z-buffer compare is performed using a relative Z address that is offset from the X, Y position of the objects on the screen. The IMC 140 then allocates enough depth buffer for the totality of one larger bounding box encompassing both objects. The address is relative and offset to the X, Y address, and is used while the two bounding boxes intersect or have common X, Y, Z space.

Figure 32:
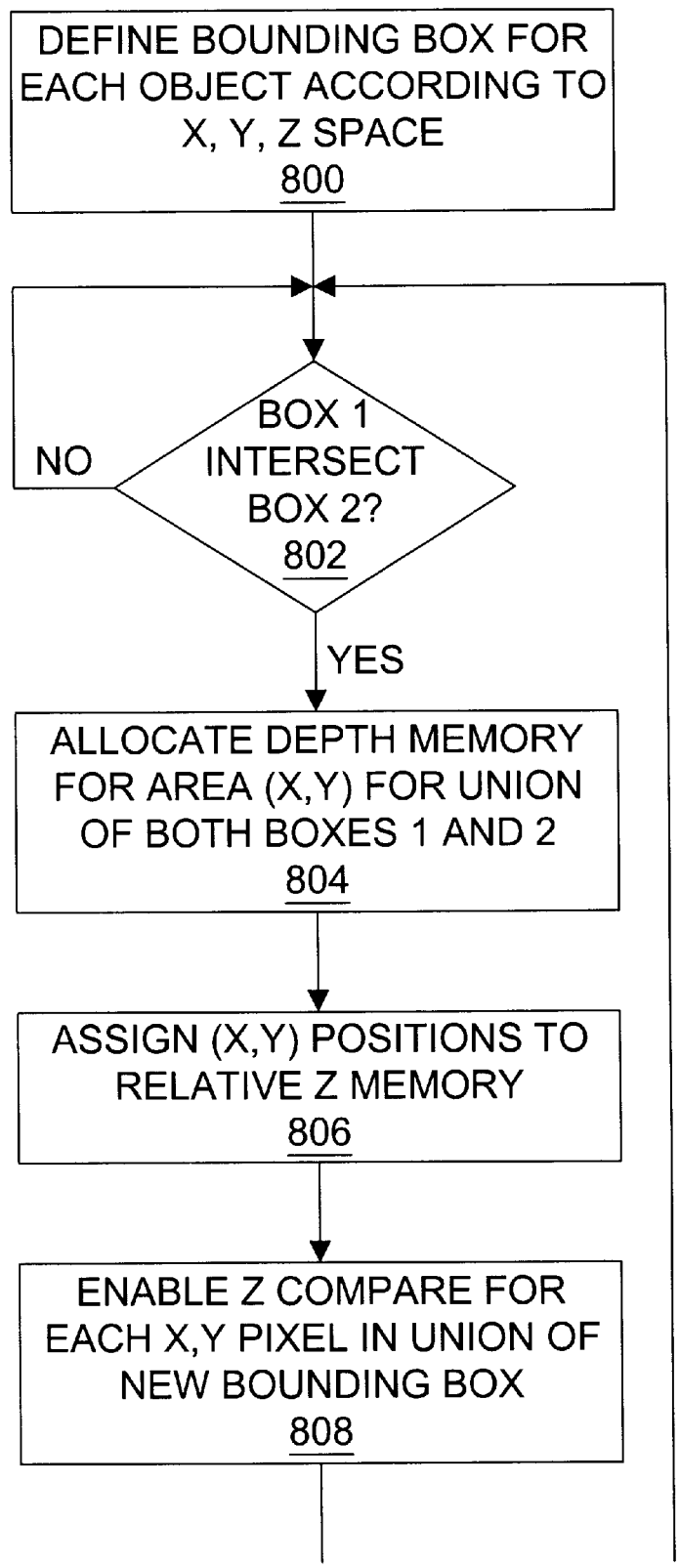
FIG. 32 is a flowchart diagram illustrating allocation of depth memory according to the present invention.

FIG. 32 shows a flowchart diagram illustrating Z-buffer use and allocation. In step 800 a bounding box is defined for each object in X, Y, Z space identifying the outer bounds of the object. In step 802 all of the boxes are compared for determining intersection, although the flowchart diagram illustrates intersection for two boxes, referred to as Box 1 and Box 2. The present invention compares X, Y, Z space of Box 1 with the X, Y, Z space of Box 2 to determine if Box 1 intersects Box 2. If not, intersection has not occurred and memory is not allocated for Z values. However, if intersection occurs, operation proceeds to step 804 where memory is allocated for the Z values for the X, Y area of a new larger box encompassing the areas of Box 1 and Box 2 combined. Only enough Z memory or depth memory is allocated for determining the union of bounding boxes, rather than the entire frame. The X, Y positions are then assigned relative to the Z memory in step 806, and in step 808 Z compare is enabled for each X, Y pixel in the union of the bounding boxes.

Using the Display Refresh List to Assemble Objects—2D and 3D Object Assembly

In one embodiment, the present invention further includes a novel method for assembling 2D and 3D objects. According to this embodiment, the update of the display refresh list is performed continuously with slopes on the bounds of the object. Thus, execution of the display refresh list renders triangles of texture without moving the texture maps.

Further, the present invention allows the Display List to be assembled on a per object basis using X and Y bounds, thus increasing efficiency.

In an embodiment where the display refresh list method is used for the manipulation of rectangular windows, the X boundary of the window or object remains constant since the window is rectangular and thus always begins at the same X coordinate for each span line. However, in one embodiment of the present invention as mentioned above, the Window Assembler 240 or IMC 140 manipulates objects of various shapes. For example, the Graphics Engine 212 includes polygon rendering logic which renders or draws large numbers of polygons or triangles very quickly in order to quickly render objects of any shape and size on the screen. For more information on this triangle rendering graphics engine, please see Foley et al. *Introduction to Computer Graphics* Addison-Wesley, 1994, which is hereby incorporated by reference.

In an embodiment where the Display Refresh List Engine 270 is used for rendering triangles and other non-rectangular objects, each Windows Workspace area includes a field which contains one or more slopes for the edges of the object being rendered. In one embodiment, each Windows Workspace area includes a ΔX value, a ΔY value, and an attribute indicating whether an interpolation refresh mode should be enabled. When the interpolation mode is enabled, then each time the display refresh list is used to fetch a new span line of data for the object with the dynamic pointer, the ΔX and ΔY values are used to manipulate the dynamic pointer for each new line using a slope calculator. Thus, the ΔX term is used to adjust the dynamic pointer according to the slope of the object to draw the non-rectangular object. Therefore, for non-rectangular windows or objects, the update of the dynamic pointer address preferably occurs using an interpolated slope. The previous dynamic address pointer value which is contained in the windows workspace memory is used in conjunction with the interpolated slope in the Windows Workspace area to derive the new dynamic address pointer for the next span line.

DirectDraw Operation

The pointer-based display list video system and method of the present invention is preferably used with the DirectDraw video memory management system from Microsoft Corp. For example, the graphics controller or IMC of the present invention is preferably used with the Windows 95 or Windows NT operating system, which uses DirectDraw as the display memory manager for mixing multiple displayable data types on the display surface or window. The present invention is also preferably used with game application programming interfaces (APIs) such as Reality Lab from Rendermorphics. DirectDraw specifications from Microsoft Corp. are hereby incorporated by reference.

DirectDraw may be referred to as a surface manager, wherein the term "surface" is similar to the term "window" used in the present disclosure. When a surface is allocated, various graphics interfaces can "talk" to that surface through DirectDraw. For example, the Microsoft Graphical Device Interface (GDI) and the Direct 3D interface can each "talk" to or perform operations on the surface. Each of these interfaces can allocate surfaces, including one primary or background surface and multiple other surfaces on top of that primary surface.

Current prior art techniques use a bit blit engine which performs bit block transfers to move the graphics or video data and thus manipulate windows or surfaces and move the surfaces on top of each other. This is performed according to the ordering of windows.

The state of the art uses a bit blit engine to glue the surfaces on top of each other. Thus, in the conventional art, if it is desired to place a first window on top of a second window and occlude part of the second window, current graphics controllers must break the base window up into pieces and blit each piece. It is also necessary to backstore the occluded portion of the second window in the system memory. This requires a large amount of bandwidth and large transfers of data. Thus in conventional prior art technology, the graphics subsystem is constantly backstoring data to the memory across the bus.

With the IMC 140 of the present invention, bit blitting or backstoring of data is not required. As described above, the IMC 140 maintains an array of pointers to all of the allocated windows or surfaces, and the surfaces are rendered or drawn on top of one another in the order indicated by the video driver without any bit blitting. In other words, when windows are moved or occluded, the data is not moved within memory and the data is not moved from a graphics subsystem to memory, i.e., there is no offscreening backstoring. Thus software applications can prepare applications for display without regard to other applications occupying the same display space.

As described above, the IMC 140 uses an object color allocation method which allows a number of bits per pixel per window. Thus the background can be one bit per pixel, another window may be 8 bits per pixel, etc. This also reduces the required amount of bandwidth because the graphics controller is not required to blit or transfer 8 bits (or more) to render an entire video screen. In the IMC 140, the video driver can indicate that an application is text and is one bit per pixel, as a color lookup, a second application is a game and requires 16 bits per pixel; etc. In prior art graphics controllers, if one window requires 16 bits per pixel, the whole screen must be allocated to 16 bits per pixel. Thus, color allocation on a per window basis requires less bandwidth to move data, and therefore system memory 110 operates well storing both application data and video/graphics data. The object color allocation method in the IMC 140 is also compatible with DirectDraw, since DirectDraw enables surfaces to be instantiated in memory with any number of bits per pixel.

As mentioned above, DirectDraw allocates surfaces, including one primary or background surface and multiple other surfaces on top of that primary surface. DirectDraw also uses a lock/unlock member for surfaces. In the IMC 140 of the present invention, the DirectDraw driver preferably uses the lock/unlock member to define the order of the display refresh list programming.

The IMC 140 also allows improved operation of panning in DirectDraw. Since the display refresh list method uses memory pointers for reading display refresh information, these pointers are simply modified as the primary surface is panned.

The IMC 140 of the present invention also manipulates overlaid surfaces without requiring any special hardware. As described above, the IMC 140 manipulates overlaid surfaces by reordering pointers in the video display refresh list. These overlays can be moved over an occluded surface easily by reprogramming the windows workspace memory pointers. The window or surface itself is typically not required to be moved from a fixed position in system memory 110. The windows workspace also preferably includes a secondary overlay bit. When the secondary overlay bit is set, one data display refresh workspace is linked with another workspace. During execution of the display refresh list, two or more different window workspace areas are read for display data and the display data or video data is read from two or more, i.e., a plurality, of areas of system memory 110. The IMC 140 then compares color values or color ranges for transparencies.

The IMC of the present invention is also preferably used for stretching display data. In this mode, the secondary windows workspace is offset by a number N of Y lines or scan lines. As the display refresh list engine 270 reads two Y lines, the vertical scaling is accomplished. The horizontal scaling is also performed as the data is read sequentially in the X direction.

The IMC 140 of the present invention also supports DCI or Video YUV displays. For example, assume that a software video CODEC places YUV data into system memory 110 for display, the video display refresh list defines where the video is to be assembled during the video refresh period. This saves time because the video can be placed into system memory 110 and no corresponding bit blit or video data transfer is required to position the video onto the display surface. YUV data can be read, converted to RGB format and scaled all in one video refresh operation. Because this happens in the IMC graphics engine 212, RGB data can be either output to the DACs for display or written back into the system memory 110 for future use.

The IMC 140 of the present invention also supports 3D Game APIs. With the used of the secondary overlay bit, 3D objects can be rendered to system memory 110 onto a color keyed background. With the rectangular extent (bounding box) of the 3D surface approximating the size of the 3D object, the video display refresh list (VDRL) reads the surface pointers from the windows workspace and blends only the desired 3D object over the other shared surface.

The IMC 140 of the present invention also provides improved support for clip lists. DirectDraw supports hardware level description of clip rectangles. The IMC receives this list and produces a video display refresh list (DRL) according to the invention. Thus the IMC 140 of the present invention naturally performs operations indicated by a clip list in an efficient manner. This allows overlaid windows as per the surface dependencies and depth order.

The IMC 140 of the present invention also provides improved support for palette animation. The IMC 140 defines a dynamic palette load during the video display refresh list operation. This palette load is preferably enabled within the definition of the surface within the windows workspace memory. Since the video display is refreshed on a per window or object basis, the palette is loaded dynamically for each surface.

As described above, the IMC single pass alpha blending method is used during refresh to blend the high contrast edges of the incoming video refresh information. When used with the secondary overlay bit enabled, objects are placed in the destination memory and edges are smoothed all in a single process. Overlays are also performed in a similar manner.

The IMC 140 also implements compression and decompression, which also reduces the amount of data required to be moved since the data is compressed.

Thus the present invention uses a unified memory or unified frame buffer approach, wherein video data is stored in main or system memory 110, but does not use conventional graphics adapter designs. Thus the IMC 140 of the present invention does not simply consolidate a video bit blit engine with a memory controller, but rather uses a novel display list approach which minimizes data transfers. Whereas current unified frame buffer controllers require too much memory bandwidth to move the graphics or video data and system or CPU data concurrently, the display refresh list method does not require data movement in many instances.
Conclusion Therefore, a graphics controller which includes a unique and novel method for displaying data on a display screen is shown and described. The graphics controller of the present invention provides numerous advances over the prior art. Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A system which displays video data from a plurality of memory areas, comprising:

a CPU;

a display device including one or more video inputs for receiving video signals and including a display screen for displaying video output, wherein the display device displays video output in response to video signals received at said one or more video inputs;

memory coupled to the CPU which stores video data, wherein the memory stores video data in a plurality of memory areas, wherein at least a plurality of said plurality of memory areas are non-contiguous; and a graphics controller coupled to said CPU, said memory, and said display device, wherein said graphics controller obtains at least a portion of said video data from said plurality of memory areas in said memory and in response provides video signals to said display device, wherein the graphics controller dynamically operates to selectively obtain portions of said video data in response to software executing on the CPU;

wherein the display device displays an image comprising video data from said plurality of said plurality of memory areas in response to said video signals provided by the graphics controller.

2. The system of claim 1, wherein the memory stores software which is executable by the CPU to dynamically control the graphics controller in obtaining said portions of said video data from said plurality of said plurality of memory areas in said memory.

3. The system of claim 1, wherein the CPU dynamically provides video display information to the graphics controller indicating desired changes to the video output of the display device;

wherein the graphics controller dynamically operates to selectively obtain portions of said video data in response to said received video display information.

4. The system of claim 3, wherein said graphics controller is operable to obtain a first portion of said video data from a first plurality of memory areas in said memory and in response provides first video signals to said display device;

wherein in response to received video display information, said graphics controller is operable to obtain a second portion of said video data from a second plurality of memory areas in said memory and in response provides second video signals to said display device.

5. The system of claim 3, wherein the CPU dynamically provides video display information to the graphics controller in response to a software application executing on the CPU.

6. The system of claim 3, wherein the video display information includes screen update information indicating a desired video output of the display device.

7. The system of claim 3, wherein the video display information includes graphics information indicating graphical data to be drawn into a memory area.

8. The system of claim 1, wherein the CPU repetitively provides video display information to the graphics controller indicating desired changes to the video output of the display device;

wherein the graphics controller repetitively operates to selectively obtain portions of said video data in response to said received video display information.

9. The system of claim 8, wherein said graphics controller is operable to obtain a first portion of said video data from a first plurality of memory areas in said memory and in response provides first video signals to said display device;

wherein in response to received video display information, said graphics controller is operable to obtain a second portion of said video data from a second plurality of memory areas in said memory and in response provides second video signals to said display device.

10. The system of claim 1, wherein the graphics controller operates to obtain at least a portion of said video data from a plurality of said plurality of memory areas in said memory and in response provide video signals to said display device during a screen refresh of said display device.

11. The system of claim 1, wherein the graphics controller operates to obtain at least a portion of said video data from a plurality of said plurality of memory areas in said memory and in response provide video signals to said display device during each screen refresh of said display device.

12. The system of claim 1, wherein the memory stores video data in a plurality of different non-contiguous memory areas.

13. The system of claim 1, wherein the memory stores video data corresponding to a plurality of video objects, wherein each of said memory areas stores video data corresponding to one of said video objects.

14. The system of claim 13, wherein said graphics controller obtains portions of said video data from at least a subset of said plurality of memory areas corresponding to at least a subset of said video objects;

wherein the display device displays said at least a subset of said video objects corresponding to said portions of said video data obtained by said graphics controller.

15. The system of claim 1, wherein said video data comprises pixel data.

16. The system of claim 1, wherein said memory comprises system memory which stores code and data used by said CPU for executing one or more applications.

17. The system of claim 1, wherein the CPU is operable to dynamically allocate different memory areas in said memory for storing video data.

18. The system of claim 1, wherein the graphics controller is operable to dynamically allocate different memory areas in said memory for storing video data.

19. The system of claim 1, wherein said memory includes a first memory area storing first video data corresponding to a first video object;

wherein said memory includes a second memory area storing second video data corresponding to a second video object;

wherein said graphics controller obtains at least a portion of said first video data from said first memory area, and said graphics controller obtains at least a portion of said second video data from said second memory area, and in response provides video signals to said display device;

wherein said display device displays at least a portion of said first video object and at least a portion of said second video object in response to said received video signals.

20. The system of claim 1, wherein said first memory area and said second memory area are non-contiguous.

21. The system of claim 1, wherein said system comprises a computer system.

22. The system of claim 1, wherein said display device comprises a computer video monitor.

23. The system of claim 1, wherein the graphics controller obtains said video data from a plurality of said plurality of memory areas in said memory on pixel span line segment boundaries.

24. The system of claim 1, wherein the graphics controller obtains only a portion of the video data from a plurality of said plurality of memory areas in said memory, wherein the graphics controller provides video signals to said display device in response to said portions of the video data.

25. A system which displays video data from a plurality of memory areas, comprising:

a CPU;

memory coupled to the CPU which stores video data, wherein the memory stores video data in a plurality of memory areas, wherein at least a plurality of said plurality of memory areas are non-contiguous; and a graphics controller coupled to said CPU and said memory, wherein the graphics controller includes at least one display output which is adapted to be coupled to a display device, wherein said graphics controller obtains at least a portion of said video data from said plurality of memory areas in said memory and in response provides video signals on said display output, wherein the graphics controller dynamically operates to selectively obtain portions of said video data in response to software executing on the CPU.

26. The system of claim 25, wherein the memory stores software which is executable by the CPU to dynamically control the graphics controller in obtaining said portions of said video data from said plurality of said plurality of memory areas in said memory.

27. The system of claim 25, wherein the CPU dynamically provides video display information to the graphics controller indicating desired changes to the video output of the display device;

wherein the graphics controller dynamically operates to selectively obtain portions of said video data in response to said received video display information.

28. The system of claim 27, wherein said graphics controller is operable to obtain a first portion of said video data from a first plurality of memory areas in said memory and in response provides first video signals to said display device;

wherein in response to received video display information, said graphics controller is operable to obtain a second portion of said video data from a second plurality of memory areas in said memory and in response provides second video signals to said display device.

29. The system of claim 25, further comprising a display device coupled to the display output of the graphics controller;

wherein the display device displays an image comprising video data from said plurality of said plurality of memory areas in response to said video signals provided by the graphics controller.

30. The system of claim 25, wherein the graphics controller obtains said video data from a plurality of said plurality of memory areas in said memory on pixel span line segment boundaries.

31. The system of claim 25, wherein the graphics controller obtains only a portion of the video data from a plurality of said plurality of memory areas in said memory, wherein the graphics controller provides video signals to said display device in response to said portions of the video data.

32. A method for displaying data on a display device, the method comprising:
   storing video data in a plurality of memory areas of a memory, wherein at least a plurality of said plurality of memory areas are non-contiguous;
   selectively obtaining at least a portion of said video data from said plurality of memory areas in said memory;
   providing video signals to the display device in response to said obtaining;
   the display device displaying video output in response to said video signals, wherein the display device displays an image comprising video data from said plurality of said plurality of memory areas;
   wherein said obtaining and said providing are dynamically performed a plurality of times in response to software executing on a CPU.

33. The method of claim 32, further comprising:
   executing a software application on a CPU;
   wherein said obtaining and said providing are dynamically performed in response to the software application executing on the CPU;
   wherein the software application executing on the CPU dynamically controls said selectively obtaining said portions of said video data from said plurality of said plurality of memory areas in said memory.

34. The method of claim 33, further comprising:
   dynamically generating video display information indicating desired changes to the video output of the display device in response to the software application executing;
   wherein said selectively obtaining is dynamically performed in response to said video display information.

35. The method of claim 34, the method comprising:
   selectively obtaining a first portion of said video data from a first plurality of memory areas in said memory and in response providing first video signals to the display device;
   wherein in response to received video display information, the method further comprises:
   selectively obtaining a second portion of said video data from a second plurality of memory areas in said memory and in response providing second video signals to the display device.

36. The method of claim 34, wherein the video display information includes screen update information indicating a desired video output of the display device.

37. The method of claim 34, wherein the video display information includes graphics information indicating graphical data to be drawn into a memory area.

38. The method of claim 32, further comprising:
   executing a software application on a CPU;
   wherein said obtaining and said providing are repetitively performed in response to the software application executing on the CPU;
   wherein the software application executing on the CPU dynamically controls said selectively obtaining said portions of said video data from said plurality of said plurality of memory areas in said memory.

39. The method of claim 38, further comprising:
   repetitively generating video display information indicating desired changes to the video output of the display device in response to the software application executing.

40. The method of claim 32, wherein the display device displays the video output on a screen refresh;
   wherein said obtaining and said providing video signals are performed during said screen refresh.

41. The method of claim 32, wherein the display device displays the video output on a screen refresh;
   wherein said obtaining and said providing video signals are performed during each screen refresh of the display device.

42. The method of claim 32, wherein said storing comprises storing the video data in a plurality of different non-contiguous memory areas.

43. The method of claim 32, wherein each of said memory areas stores video data corresponding to one of a plurality of video objects.

44. The method of claim 43, wherein said obtaining comprises obtaining portions of said video data from at least a subset of said plurality of memory areas corresponding to at least a subset of said video objects;
   wherein said displaying comprises displaying said at least a subset of said video objects corresponding to said portions of said video data.

45. The method of claim 32, wherein said video data comprises pixel data.

46. The method of claim 32, wherein said memory comprises system memory which stores code and data used by the CPU for executing one or more applications.

47. The method of claim 32, further comprising
   dynamically allocating different memory areas in said memory for storing video data.

48. The method of claim 32, wherein said selectively obtaining comprises obtaining said video data from a plurality of said plurality of memory areas in said memory on pixel span line segment boundaries.

49. The method of claim 32, wherein said selectively obtaining comprises obtaining only a portion of the video data from a plurality of said plurality of memory areas in said memory, wherein said providing provides video signals to said display device in response to said portions of the video data.

50. A system which displays video data from a plurality of memory areas, comprising:
   a CPU;
   a display device including one or more video inputs for receiving video signals and including a display screen for displaying video output, wherein the display device displays video output in response to video signals received at said one or more video inputs;
   memory coupled to the CPU which stores video data, wherein the memory stores video data in a plurality of memory areas, wherein a plurality of said plurality of memory areas are non-contiguous; and
   a graphics controller coupled to said CPU, said memory, and said display device, wherein said graphics controller obtains at least a portion of said video data from said plurality of memory areas in said memory and in response provides video signals to said display device, wherein the graphics controller dynamically operates to selectively obtain portions of said video data in response to software executing on the CPU;
   wherein the display device displays an image comprising video data from said plurality of said plurality of memory areas in response to said video signals provided by the graphics controller;
   wherein the graphics controller dynamically receives video display information indicating desired changes to the video output of the display device;

wherein the graphics controller dynamically operates to selectively obtain portions of said video data in response to said received video display information;

wherein said graphics controller is operable to obtain a first portion of said video data from a first plurality of memory areas in said memory and in response provides first video signals to said display device;

wherein in response to received video display information, said graphics controller is operable to obtain a second portion of said video data from a second different plurality of memory areas in said memory and in response provides second video signals to said display device.

51. The system of claim 50, wherein said plurality of memory areas are not organized in a frame buffer format.

52. The system of claim 50, wherein pixels comprised in the plurality of memory areas are not organized in a row/column manner which directly corresponds to rows/columns of the display device.

53. The system of claim 50, wherein the graphics controller obtains said video data from a plurality of said plurality of memory areas in said memory on pixel span line segment boundaries.

54. The system of claim 50, wherein the graphics controller obtains only a portion of the video data from a plurality of said plurality of memory areas in said memory, wherein the graphics controller provides video signals to said display device in response to said portions of the video data.

* * * * *